(12) United States Patent
Plattner et al.

(10) Patent No.: US 9,015,812 B2
(45) Date of Patent: Apr. 21, 2015

(54) TRANSPARENT CONTROL OF ACCESS INVOKING REAL-TIME ANALYSIS OF THE QUERY HISTORY

(71) Applicant: Hasso-Plattner-Institut für Softwaresystemtechnik GmbH, Potsdam (DE)

(72) Inventors: Hasso Plattner, Schriesheim (DE); Matthieu-Patrick Schapranow, Berlin (DE)

(73) Assignee: Hasso-Plattner-Institut fur Softwaresystemtechnik GmbH, Potsdam (DE)

( * ) Notice: Subject to any disclaimer, the term of this patent is extended or adjusted under 35 U.S.C. 154(b) by 197 days.

(21) Appl. No.: 13/899,874

(22) Filed: May 22, 2013

(65) Prior Publication Data

US 2014/0157370 A1    Jun. 5, 2014

Related U.S. Application Data

(60) Provisional application No. 61/649,946, filed on May 22, 2012.

(51) Int. Cl.
*H04L 29/06* (2006.01)
*G06F 21/62* (2013.01)
*G06Q 10/08* (2012.01)
*G06F 17/30* (2006.01)

(52) U.S. Cl.
CPC .......... *H04L 63/10* (2013.01); *G06F 17/30386* (2013.01); *G06F 21/6245* (2013.01); *G06Q 10/0833* (2013.01); *H04L 63/06* (2013.01); *H04L 63/1441* (2013.01)

(58) Field of Classification Search
CPC ................... G06F 17/30386; G06F 17/30589; H04L 63/10
USPC ........................ 726/4; 713/154, 176
See application file for complete search history.

(56) References Cited

U.S. PATENT DOCUMENTS 7,437,362 B1 * 10/2008 Ben-Natan ............................. 1/1
2005/0039033 A1 * 2/2005 Meyers et al. ................. 713/193
2007/0220116 A1 * 9/2007 Rose ............................. 709/219

OTHER PUBLICATIONS

Martin Abadi, et al.; Access Control Based on Execution History; in the Proceedings of the 10th Annual Network and Distributed System Security Symposium; 15 pages; 2003.
(Continued)

*Primary Examiner* — Harunur Rashid
*Assistant Examiner* — Dao Ho
(74) *Attorney, Agent, or Firm* — Fountainhead Law Group P.C.

(57) ABSTRACT

The invention relates to a method for granting an inquirer querying a repository access to the repository, a communication protocol between a client and a server, and a system for controlling access of at least one inquirer to a repository. The repository typically stores event data relating to traceable products. The aspects according to teaching disclosed herein may be for example implemented as security extensions for existing repositories providing a finer granularity of access rights and means to prevent an exposure of data sets considered sensitive. The security extensions disclosed herein may be implemented to protect access to any kind of client/server application wherein the server is exposing sensitive data.

19 Claims, 30 Drawing Sheets

(56) References Cited

OTHER PUBLICATIONS

Figure 1:
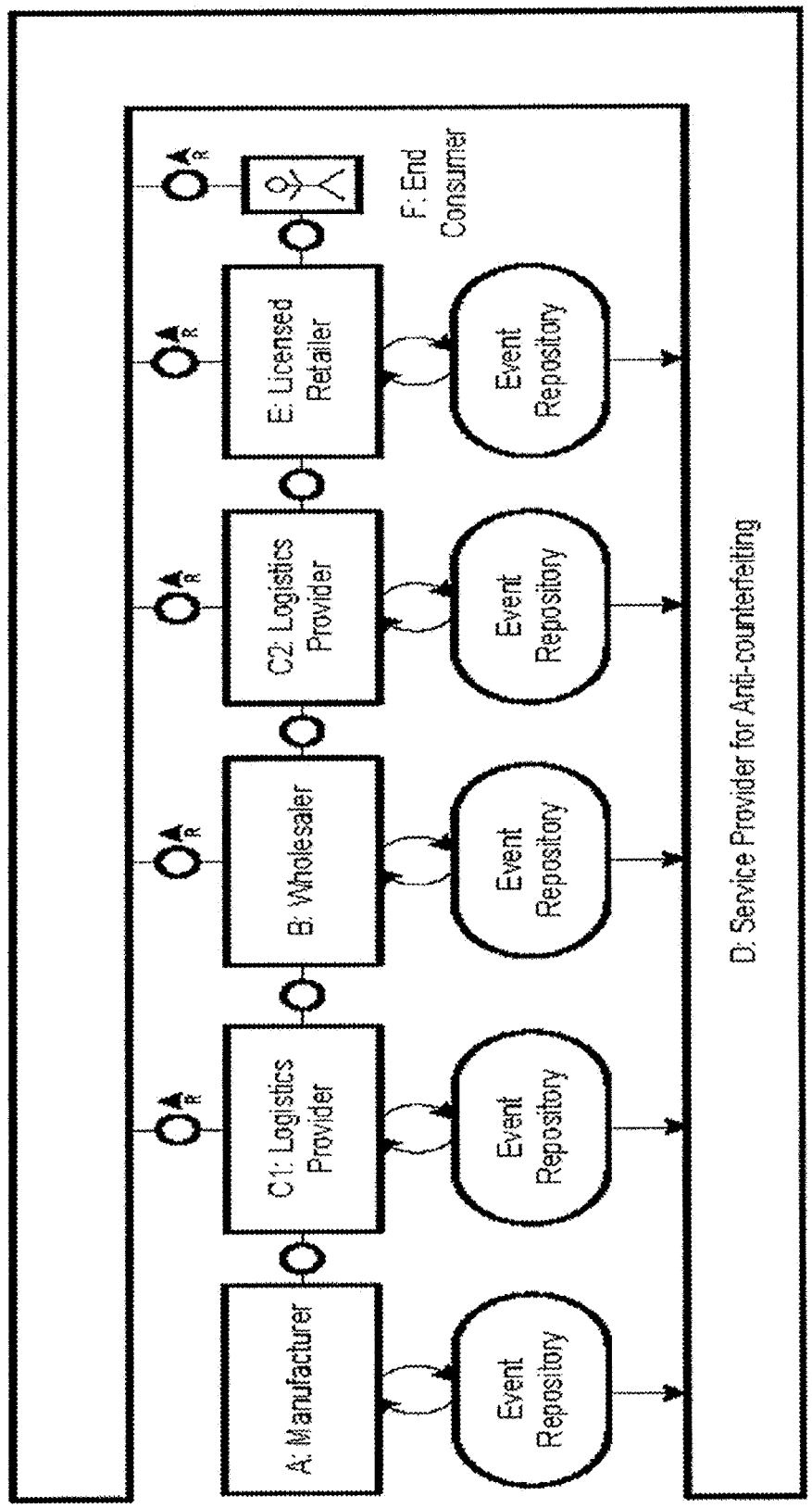

Bayer Technology Services; Sicher, schnell & einfach, Einmalige Zufallszahlen mit dem BayCoder; http://www.bayertechnology.com/uploads/media/Infoblatt_TTA_BayCoder_D_030811.pdf1; 1 page; 2011.

Elisa Bertino, et al.; TRBAC: A Temporal Role-Based Access Control Model; ACM Transactions on Information and System Security, vol. 4, No. 3, Aug. 2001, pp. 191-223.

Mokdong Chung, et al.; Context-Aware Security Services in DAA Security Model; in the Proceedings of the International Conference on Advanced Language Processing and Web Information Technology; IEEE Computer Society; pp. 424-429; 2008.

Bo Du, et al.; Access Control for OSGi-Based Reconfigurable RFID Middleware; in the Proceedings of the 4th International Conference on Computer Sciences and Convergence Information Technology; IEEE Computer Society; pp. 1010-1014; 2009.

Ernst & Young; Piraten des 21.; Jahrhunderts Angriff auf die Konsumgüterindustrie; http://www.markenverband.de/publikationen/studien/StudievonErnst-YoungPiratendes21.Jahrhunderts.pdf1; 51 pages; 2008.

European Commission; Delegated Act on the Detailed Rules for a Unique Identifier for Medicinal Products for Human Use, and its Verification; http://ec.europa.eu/health/files/counterf_par_trade/safety_2011-11; pdf1; 19 pages; Nov. 2011.

Simson L. Garfinkel, et al.; RFID Privacy: An Overview of Problems and Proposed Solutions; IEEE Security and Privacy; 19 pages; 2005.

Global Standards 1; EPCglobal Certificate Profile Specification, Version 2.0; http://www.gsl.org/gsmp/kc/epcglobal/cert/cert_2_0-standard-20100610.pdf1; 14 pages; Jun. 2010.

Christin Groba, et al; Context-Dependent Access Control for Contextual Information; in Proceedings of the 2nd International Conference on Availability, Reliability and Security; IEEE Computer Society; 7 pages; 2007.

Eberhard Grummt, et al.; Access Control: Challenges and Approaches in the Internet of Things; in the Proceedings of the International Conference on www/internet; pp. 89-93; 2007.

Vincent C. Hu, et al.; Assessment of Access Control Systems; Interagency Report 7316; National Institute of Standards and Technology; 60 pages; 2006.

Alexander Ilic, et al.; Increasing Supply-Chain Visibility with Rule-Based RFID Data Analysis; IEEE Computer Society; pp. 31-38; 2009.

Alexander Ilic, et al.; The Dual Ownership Model: Using Organizational Relationships for Access Control in Safety Supply Chains; in the Proceedings of the 21st International Conference on Advanced Information Networking and Applications Workshops; IEEE Computer Society; 18 pages; 2007.

Intel Corporation; An Introduction to the Intel® QuickPath Interconnect; http://www.intel.com/content/dam/doc/white-paper/quick-path-interconnect-introduction-paper.pdf1; 22 pages; 2009.

Taesung Kim, et al.; Access Control for Middleware in RFID Systems; in the Proceedings of the 8th International Conference on Advanced Communication Technologies; pp. 1020-1022; 2006.

Brian King, et al.; Securing the Pharmaceutical Supply Chain using RFID; in the Proceedings of the International Conference on Multimedia and Ubiquitous Engineering; IEEE Computer Society; pp. 23-28; 2007.

Butler W. Lampson; Protection; in the Proceedings of 5th Princeton Conference on Information Sciences and Systems; 10 pages; 1971.

Melanie R. Rieback, et al.; The Evolution of RFID Security; IEEE Pervasive Computing; pp. 62-69; 2006.

Quan Z. Sheng, et al.; Enabling Next-Generation RFID Applications: Solutions and Challenges; IEEE Computer Society; pp. 21-28; 2008.

Adesina S. Sodiya, et al.; Components-Based Access Control Architecture; Issues in Informing Science and Information Technology; vol. 6; pp. 699-706; 2009.

Sarah Spiekermann; Privacy Enhancing Technologies for RFID in Retail—An Empirical Investigation; in the Proceedings of the 9th International Conference on Ubiquitous Computing; pp. 56-72; 2007.

Jing Sun, et al.; Lightweight Public Key Infrastructure and Service Relation Model for Designing a Trustworthy ONS; in the Proceedings of the International Conference on Computer and Information Science; IEEE Computer Society; pp. 295-300; 2009.

Xian Yao Xia, et al.; A Privacy Protection Protocol for RFID-enabledSupply Chain System; in the Proceedings of the 6th International Conference on Services Systems and Services Management; IEEE Computer Society; pp. 305-308; 2009.

Mariemma I. Yague; Survey on XML-Based Policy Languages for Open Environments; Journal of Information Assurance and Security; pp. 11-20; 2006.

Jing Sun, et al.; A Study on the Design and Implementation of EPCIS Trust Model; in the Proceedings of the International Conference on Computer Science and Software Engineering; IEEE Computer Society; pp. 713-716; 2008.

Sabrina De Capitani Di Vimercati, et al.; Access Control in Federated Systems; pp. 87-99; 1997.

Joaquin Garcia-Alfaro, et al.; Analysis of Threats to the Security of EPC Networks; in the Proceedings of the Communication Networks and Services Research Conference; IEEE Computer Society; pp. 67-74; 2008.

Entwicklung einer Bibliothek von Ereignismustern zur Identifikation von Zusammenhängen in RFID—Ereignisdaten; von Volker Suschke Fakultät Informatik, Institut für Systemarchitektur, Lehrstuhl Rechnernetze; 96 pages; Jul. 31, 2009.

Alan R. Hevner, et al.; Design Science in Information Systems Research; MIS Quarterly vol. 28, No. 1; pp. 75-105; Mar. 2004.

Eric Freudenthal, et al.; dRBAC: Distributed Role-based Access Control for Dynamic Coalition Environments; New York University, Department of Computer Science; 10 pages; 2002.

Markus Lorch, et al; First Experiences Using XACML for Access Control in Distributed Systems; ACM Workshop on XML Security; 13 pages; Oct. 31, 2003.

Davide Zanetti, et al.; Protecting Sensitive Business Information while Sharing Serial—Level Data; ETH Zurich, Switzerland; 9 pages; 2008.

Gaurav Kapoor, et al.; RFID and Information Security in Supply Chains; in the Proceedings of the 4th International Conference on Mobile Ad-hoc and Sensor Networks; IEEE Computer Society; pp. 59-62; 2008.

David F. Ferraiolo, et al.; Role-Based Access Controls; in the Proceedings of the 15th International Computer Security Conference; pp. 554-563; 1992; Baltimore, MD.

Eberhard Grummt, et al.; Sicherheitsanalyse RFID-basierter Wertschöpfungsketten; SAP Research CEC Dresden; 11 pages; 2007.

Dr. David F.C. Brewer, et al.; The Chinese Wall Security Policy; Gamma Secure Systems Limited; published at the IEEE Symposium on Research in Security and Privacy; 1-3; pp. 206-214; 1989.

Bundesamt Fur Sicherheit in Der Informationstechnik; BSI-Technische Richtlinie TR-03128; EAC-PKI'n fur den elektronischen Personalausweis; V. 1.1; Oct. 8, 2010; 76 pages.

D. Cooper, et al.; Internet X.509 Public Key Infrastructure Certificate and Certificate Revocation List (CRL) Profile; Network Working Group; http://tools.ietf.org/html/rfc5280; May 2008; 152 pages.

Guy Edjlali, et al.; History-based Access Control for Mobile Code; In Proceedings of 5th Conference Computer and Communications Security; Nov. 1998; 19 pages.

European Commission; Report on EU Customs Enforcement of Intellectual Property Rights; Results at the European Border; http://ec.europa.eu/taxation_customs/resources/documents/customs/customs_controls/counterfeit_piracy/statistics/2009_statistics_for_2008_full_report_en.pdf; 2008; 25 pages.

Sergei Evdokimov, et al.; Practical Access Control Management for Outsourced EPC-Related Data in RFID-Enabled Supply Chain; In Proceedings of the IEEE International Conference on e-Business Engineering; 2006; 6 pages.

(56) References Cited

OTHER PUBLICATIONS

Benjamin Fabian, et al.; Distributed ONS and its Impact on Privacy; In Proceedings of the International Conference on Communications; 2007; 6 pages.

Benjamin Fabian, et al.; Security Challenges of the EPC Global Network; Communications of the ACM, vol. 52, No. 7; Jul. 2009; 5 pages.

R. Fe; The Economic Impact of Counterfeiting and Piracy; Organization for Economic Cooperation and Development; 2008; 29 pages.

Bundesamt Fur Sicherheit in Der Informationstechnik; BSI-Standard 100-1; Information Security Management Systems; V. 1.5; 2008; 38 pages.

Bundesamt Fur Sicherheit in Der Informationstechnik; BSI-Standard 100-3; Risk Analysis Based on IT-Grundschutz; V. 2.5; 2008; 23 pages.

David Ferraiolo, et al.; Role-Based Access Control; in Proceedings of 15th National Computer Security Conference; 1992; 11 pages.

Global Standards 1; EPC Global Certificate Profile Specification, V. 2.0; http:/.www.gsl.org/gsmp/kc/epcglobal/cert/cert_1_0-standard-20060308.pdf; Jun. 2010; 14 pages.

Global Standards 1; EPC Tag Data Standard 1.6; http:/.www.gsl.org/gsmp/kc/epcglobal/tds/tds_1_6-RatifiedStd-20110922.pdf; Sep. 9, 2011; 218 pages.

Eberhard Grummt, et al.; Fine-Grained Access Control for EPC Information Services; In Proceedings of the 1st International Conference on Internet of Things; 2008; 16 pages.

Eberhard Grummt, et al.; Datensicherheit trotz transparenter Gutterstrome; Wissenschafliche Zeitschrift der TU Dresden; 2009; 5 pages.

Eberhard Grummt, et al.; Verteilte Autorisation in RFID-Ereignissystemen; SAP Research CEC Dresden; D.A.CH Security; Berlin, Germany; 2008; 9 pages.

Oliver Gunther, et al.; RFID and the Perception of Control: The Consumer's View; Communications of the ACM; vol. 48, No. 9; Sep. 2005; 4 pages.

* cited by examiner

Fig. 1   - prior art -

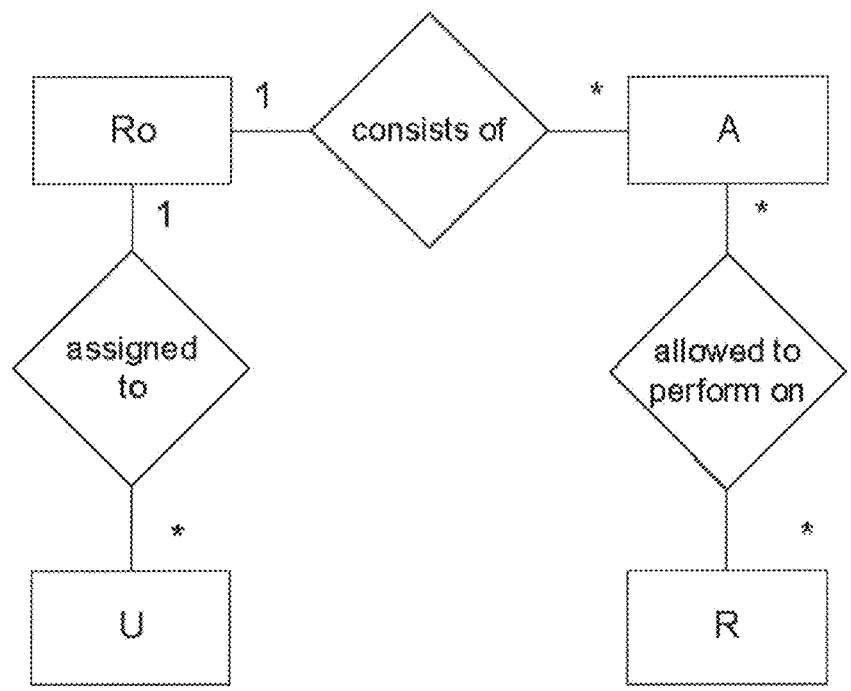
Fig. 3A
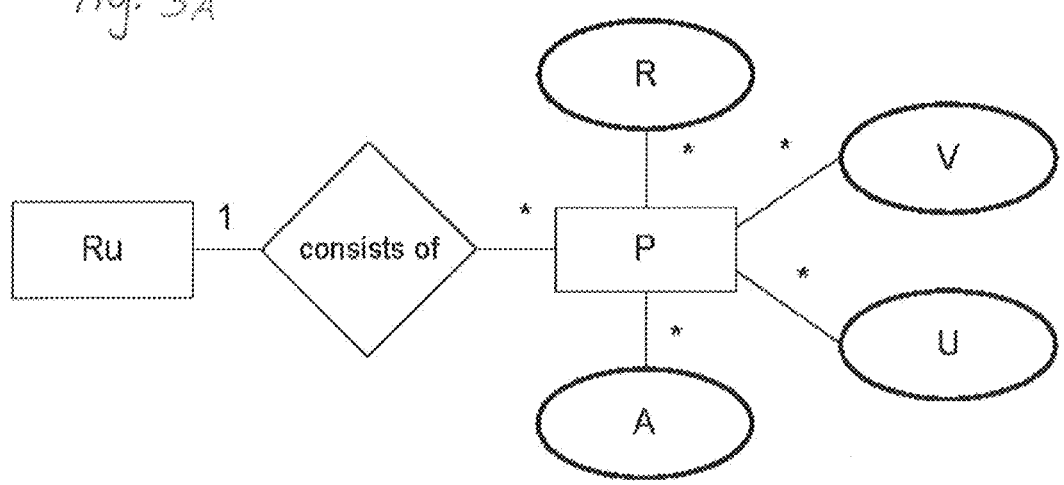
Fig 3B — prior Art —

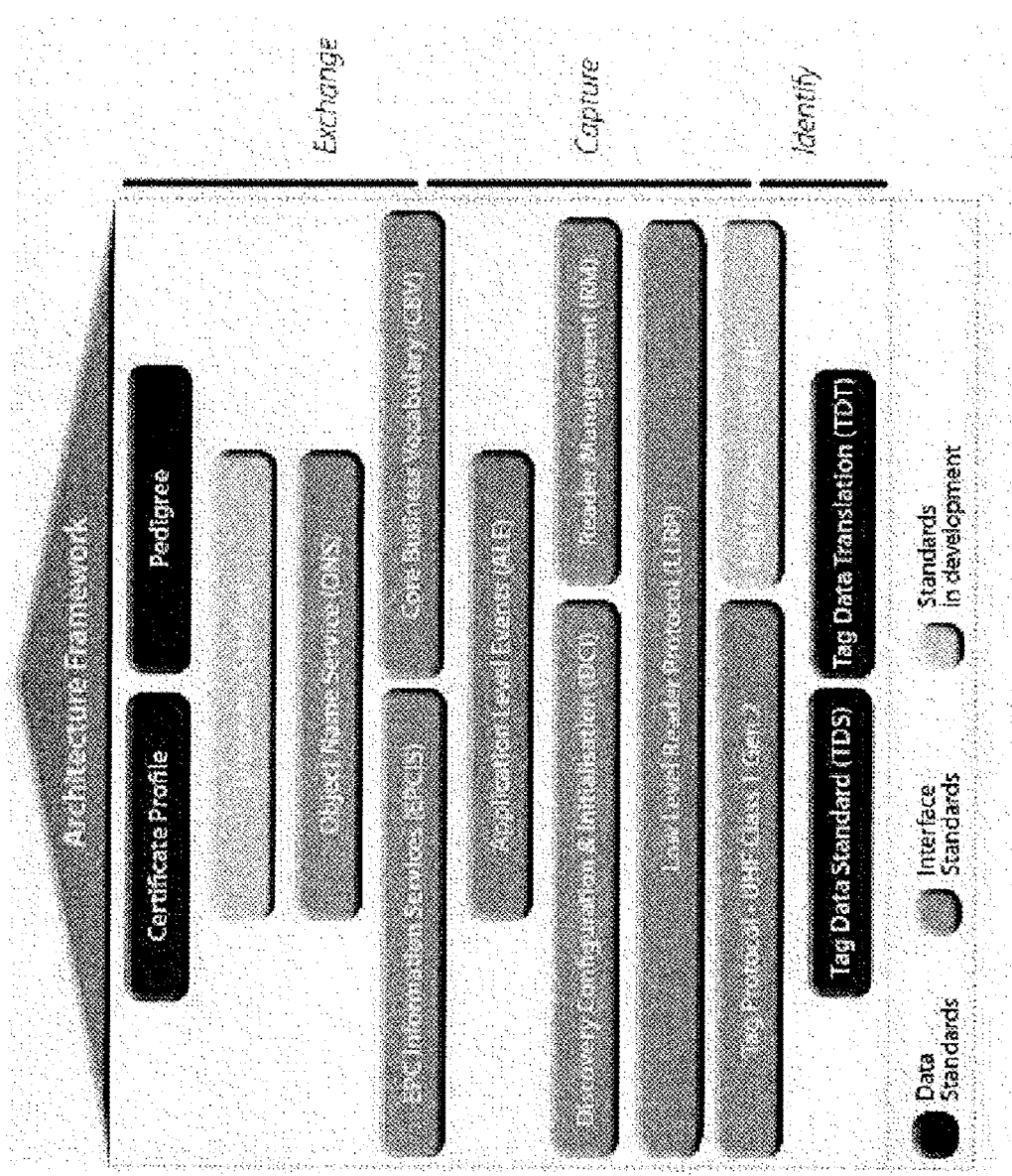
FIG. 4 — prior art —

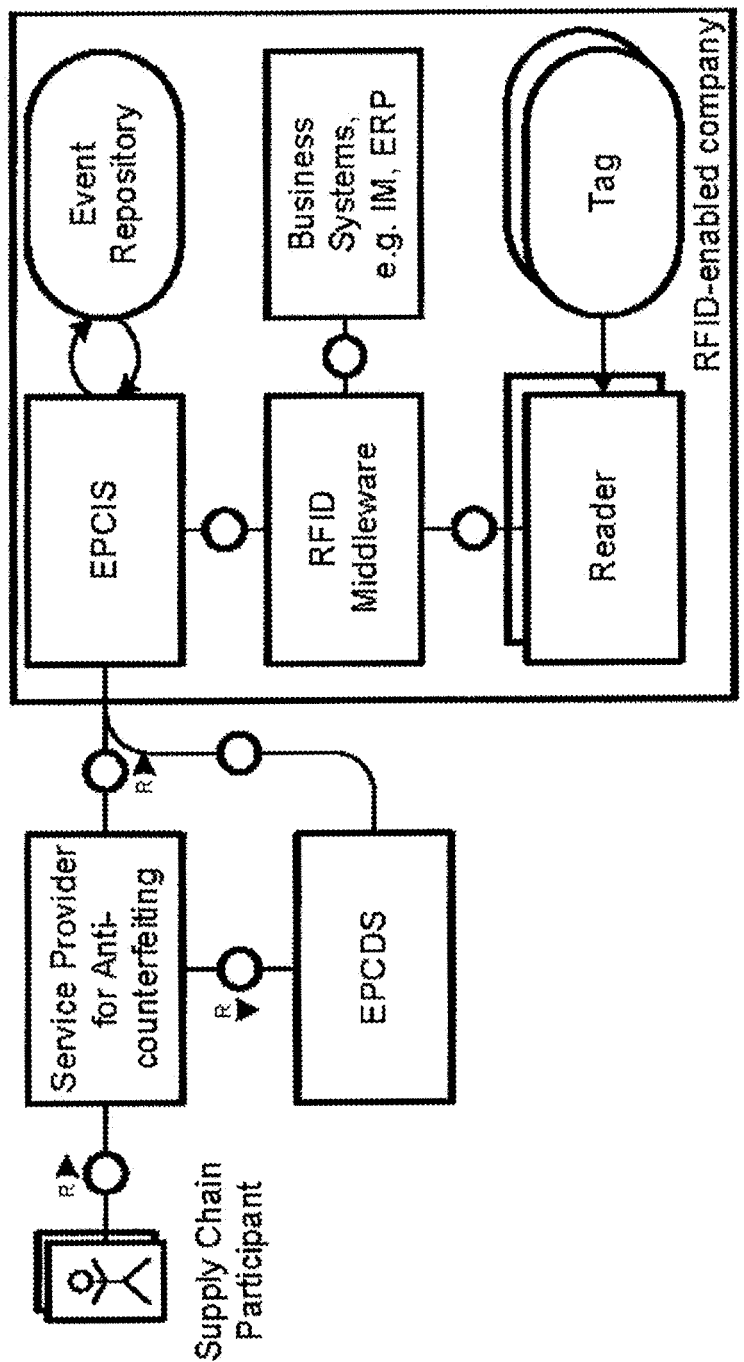
Fig. 5 - prior Art -

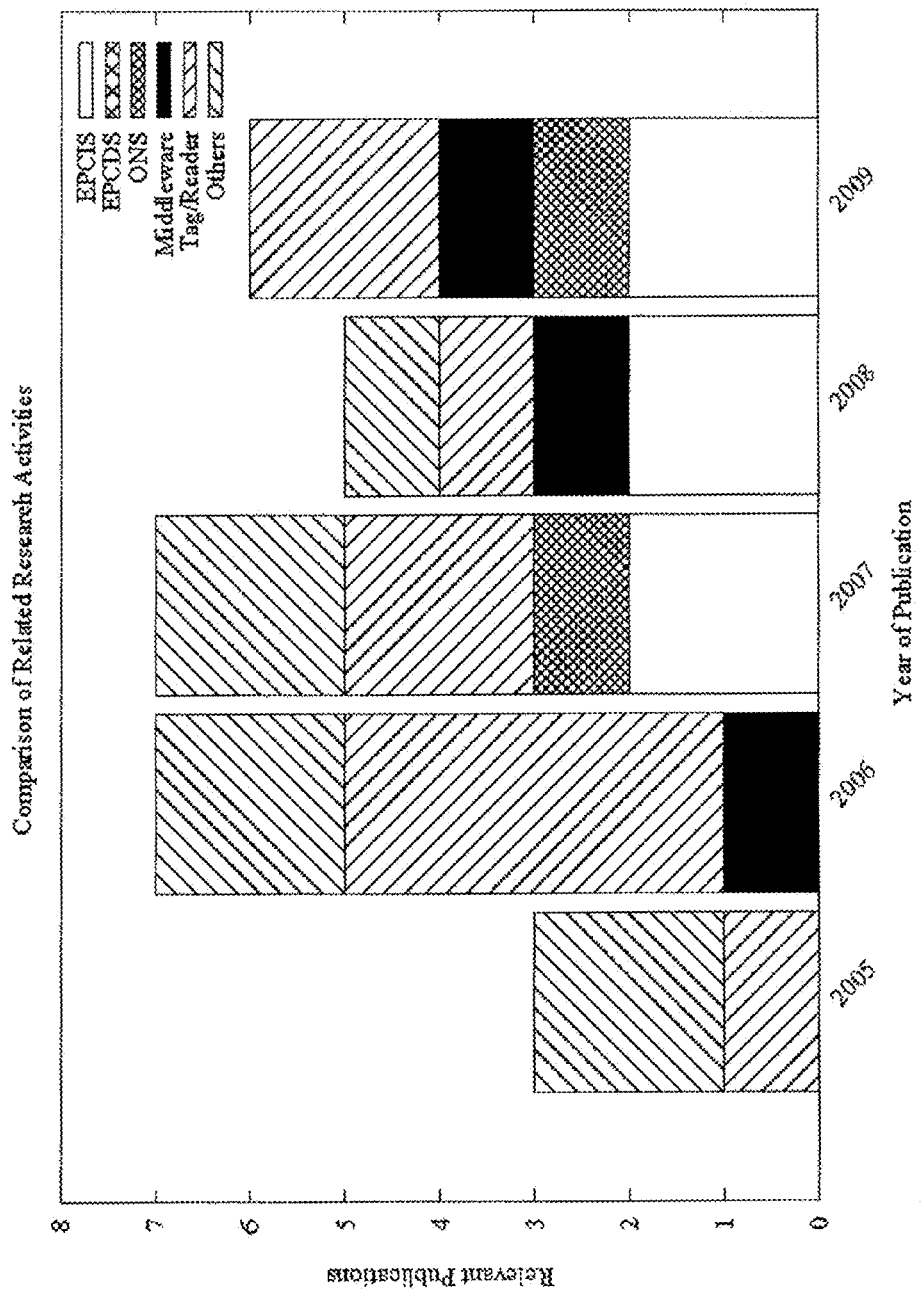
Fig. 6 - Prior Art

TRANSPARENT CONTROL OF ACCESS INVOKING REAL-TIME ANALYSIS OF THE QUERY HISTORY

CROSS-REFERENCE TO RELATED APPLICATIONS

This application claims the benefit of U.S. Provisional Application No. 61/649,946 filed May 22, 2012, which is incorporated herein by reference in its entirety.

BACKGROUND OF THE INVENTION

The invention relates to a method for granting an inquirer access to a repository, a communication protocol between an inquirer and a repository and a system for granting an inquirer access to a repository.

Different aspects of the invention shall—as an example—be explained in the context of a pharmaceutical supply chain. Alternative contexts of the different aspects of the invention shall be explained in this application, too.

The present invention addresses an organizational and a technical issue. Both are considered individually throughout this application.

From an organizational perspective, current businesses are confronted with continuously challenging factors, such as changing business partners and inter-changeable products, when dealing with new business partners. On the one hand, building on a static supply chain helps reducing these factors since supplier and customer known each other and proofed as reliable partners for years. On the other hand, static supply chains result in limiting factors, such as performing business with a limited set of partners. In a globalized market, supply chains tend to transform to increasingly dynamic and open supply networks that build on mutual exchange of products with new and even unknown business partners. As a result, more and more suppliers compete for the lowest price, i.e. consumers can easily switch between various vendors of standardized goods.

We refer to EPCglobal Networks as supply chain networks that associate a digital representation to all handled physical goods. Product meta data are stored in a distributed manner in individual event repositories of all involved supply chain parties. The existence of digital product meta data supports business processes, such as tracking and tracing of products, exchanging advice letters, goods receipt, etc. EPCglobal networks aim to involve the good's meta data in existing business processes, e.g. to verify product's authenticity automatically during good's receipt. However, exchanging meta data automatically results in certain security risks, e.g. competitors or attackers can derive business secrets.

This application addresses the problem of protecting sensitive business secrets while exposing good's meta data for certain supply chain parties and business cases in an automatic way. The invention addresses this problem disclosing a method for granting access to a repository, a system for controlling access of one or more inquirers to a repository and a communication protocol between a client and a server connected via a link to a repository, as will be explained in more detail in the following. The main contribution is the introduction of transparent security extensions for existing EPCglobal on device- and business-level to protect business secrets from being exposed to attackers or competitors.

From the technical perspective, the security extensions disclosed herein perform real-time analysis of the complete query history. Traditional access control mechanisms build on a bivalent decision taking, i.e. results of the set {"declined", "granted"}. In contrast to them, the developed History-based Access Control (HBAC) enables a continuous spectrum of control from the interval ["declined", "granted"]. Thus, it supports a more fine-grained way of data protection in contrast to existing access control techniques.

For example, if an inquirer is not allowed to access a certain subset of attributes of an EPC result set, the response is filtered. "Filtering" and "granting access rights" are part of the access control mechanism. Traditional access control mechanisms involve the definition and assignment of proper access rights to all involved parties before granting access to certain resources. In contrast, our developed security extensions support access rules that protect business secrets without assigning individual rights. In addition, the given contribution involves analysis of the complete query history when taking an access decision. This requires the following challenges to be addressed: a) storage requirements of the continuously increasing query history, b) real-time analysis of the history, and c) adaption of predefined access rights based on the results of the analysis of the query history. Depending on the history and access rules specific access decisions are taken.

Challenges in Pharmaceutical Supply Chains

The European pharmaceutical industry hit headlines with operation MEDI-FAKE announcing 34 million confiscated fake drugs in just two months (IP Crime Group. Crime Report 2008). The European Commission (EC) reported an increase of 118% for pharmaceutical counterfeits detected at borders in 2008 compared to 2007. The pharmaceutical product category is the third largest product category in terms of quantities of intercepted articles in addition to the categories CDs/DVDs and tobacco. Recent research results focusing on the ingredients of anti-malarial products from eleven African countries indicated these products contained either a low portion or none of the active ingredient Artemisinin (see Paul N Newton et al. Poor Quality Vital Anti-malarials in Africa—An Urgent Neglected Public Health Priority. *Malaria Journal*, 10(1):352, 2011). Counterfeited drugs are a risk for customers and suppliers, since their effects are neither tested nor validated and the customer may suffer from medical complications. Approx. 7,000 annual cases of medical complications in the U.S. are linked to pharmaceutical counterfeits or the use of improper ingredients.

This brief excerpt of reported cases and their impact highlights the omnipresent risks of counterfeits and the need for a reliable mechanism to protect products. This protection has to be an integer part of the entire supply chain and should involve all supply chain participants. A high level of supply chain integrity is the basis for reliable product tracking and counterfeit detection.

The European pharmaceutical supply chain consists of more than 192,000 parties (Jürgen Müller et al. A Simulation of the Pharmaceutical Supply Chain to Provide Realistic Test Data. In *Proceedings of 1st International Conference on Advances in System Simulation*. IEEE, 2009). The availability of generic drugs transformed the pharmaceutical market towards a more open supply chain. For example, new pharmaceuticals for the German market need to be licensed to obtain a "Pharmazentralnummer (PZN)" (central pharmaceutical number). The PZN is a relatively small restriction of admission. Once the manufacturer paid the fee for the usage of the PZN it can be used for a limited period of time without further investigations. The EC is working on a EU-wide standardization for unique identifiers and verification methods of medical products (European Commission. Delegated Act on the Detailed Rules for a Unique Identifier for Medical Products for Human Use and its Verification. hxxp://ec.europa.eu/ health/files/counterf_par_trade/safety_2011-11.pdf, November 2011.). It proposes the integration of essential product details into the identifier, such as the manufacturer product code and package identifier. However, the current identification approaches lack the ability to identify pharmaceuticals on item level instead of batch level.

RFID technology enables gathering of location-based information of tagged items without establishing a direct line of sight. All supply chain parties store event data in local Electronic Product Code Information Services (EPCIS) repositories that can be queried by other supply chain parties to retrieve details associated with products. We consider EPCIS repositories as standardized software products that store and manage access to event data, e.g. open source platform FOSSTRAK (Fosstrak. Project License. www.fosstrak.org/epcis/license.html, 2009, referred to in the following as FOSSTRAK).

The adoption towards EPCglobal networks incorporates the facts: native co-operation of all supply chain parties, amortization of initial investments, and secured exchange of event data to improve existing business processes, e.g. goods receipt and anti-counterfeiting. EPCglobal networks build the basis for an integer supply chain by supervising movements of ingredients from suppliers to manufacturers and movements of products from manufacturers via intermediate supply chain parties to end consumers.

In Europe, approx. 30 billion pharmaceutical product units are manufactured annually whereas approx. 50 percent are only available on-prescription. In the following, We focus on pharmaceuticals on-prescription base. Counterfeits of on-prescription medicines are more likely due to their higher retail price and customers that want to access them without having a valid prescription. Furthermore, we expect false composition of ingredients to harm or even to kill human beings, e.g. when an expected medical reaction is prevented or adverse effects occur. Approx. 2,200 pharmaceutical manufacturers produce pharmaceutical goods that are shipped to 50 thousand wholesalers within the EU. The latter deliver products in repacked transportation units to retailers (approx. 140 thousand individuals) and finally to the consumer (see Matthieu-P. Schapranow, Jürgen Müller, Alexander Zeier, and Hasso Plattner. RFID Event Data Processing: An Architecture for Storing and Searching. In *Proceedings of the 4th International Workshop on RFID Technology-Concepts, Applications, Challenges*, 2010, referred to in the following as Schapranow et al. I).

In terms of the pharmaceutical supply chain, we consider the consumer as the sink of product, e.g. a patient buying products in a pharmacy or a hospital. Only licensed retailers are permitted to sell on-prescription medicines in Europe, e.g. pharmacies, hospitals, etc. Between individual supply chain participants logistics provider are responsible for handling items and transferring them. During goods receipt and goods shipment individual tracking events are recorded at the site of the handling supply chain party. Tracking goods is the basis for creating the virtual product history of a certain item, i.e. the item's path through the supply chain. A dedicated service provider, who is granted access to the EPCIS repositories of all supply chain parties, is required to reconstruct the item's history. The service provider is the basis for validating the authenticity of the pharmaceuticals and to detect counterfeits based on consistency checks of data gathered from distributed EPCIS repositories.

FIG. 1 shows a combined data and product flow between supply chain party roles A . . . F of an RFID-aided pharmaceutical supply chain as known in the art. Service provider D accesses distributed EPCIS repositories of individual parties for verification of product authenticity. FIG. 1 shows the interaction of EPCIS repositories of individual supply chain parities and the service provider modeled using the Fundamental Modeling Concepts (FMC) (see Andreas Knöpfel, Bernhard Gröne, and Peter Tabeling. *Fundamental Modeling Concepts. Effective Communication of IT Systems*. John Wiley, 2005.

In the remainder of this application, an absence of the inference concept for EPCglobal networks. is assumed. Inference describes an approach to reduce event data by scanning boxes and pallets instead of their individual contents, i.e. the path of a concrete product needs to be reconstructed beyond boxing and unboxing operations. That means, content of packaging units, such as boxes, pallets, containers is not inferred from its containment relationship by evaluating add and delete events occurred at various stages within the supply chain. This is considered a task of the Electronic Product Code Discovery Services, which is not investigated in further detail in the context of this application.

The service provider is a trusted instance that can be queried by all supply chain participants. For example, customers can make use of an online web portal or public reader terminals in pharmacies. The implementation considerations for a dedicated service provider proposed herein, build the basis for further discussions (see Schapranow et al. I).

EPCglobal networks can provide a possible infrastructure for reliable product tracking and tracing across the entire supply chain. However, RFID technology—only one possible implementation for EPCglobal networks—was not designed for secured data exchange of confidential details. Hence, a variety of new data security threats arise when migrating towards an RFID-aided supply chain. On the one hand, the usage of EPCglobal networks is consider as a major improvement for involved business processes by providing fine-grained data about handled goods. It supports identification of ingredients from suppliers to manufacturers and products from manufacturers to customers. For example, EPCglobal networks support tracking of individual products and helps to distinguish them from mass products. Furthermore, their individual paths—from suppliers via all involved supply chain parties—is documented. On the other hand, it is stressed that data exchanged via EPCglobal networks can be misused to derive business internals, e.g. supplier relationships, product ingredients, and customer relationships. Qualified attacks against EPCglobal components and systematic combination of responses returned by EPCIS repositories build the basis for knowledge extraction by competitors. The given application aims to control access to sensitive business data while incorporating EPCglobal components for automatic data exchange.

Vulnerable Environments

Cables establish the link between two communication peers in traditional communication networks, e.g. in the plain old telephone services or in local area networks. If these wired links are secured against physical access, attackers are typically not able to gain unrecognized access. In wireless networks it is hard to secure communication because data are transmitted via the ether, which can be accessed by malicious attackers without being recognized. RFID technology makes use of both communication media. On the one hand, data are exchanged via traditional wired communication networks, e.g. EPC event is exchanged between EPCIS repositories for authenticity checks of pharmaceutical goods. On the other hand, communication between RFID tag and reader is performed via the ether. Security threats for EPCglobal networks, in particular in combination RFID technology, are defined the following section Threads of RFID-aided Supply Chains. In addition, attacks of communication networks are mapped to RFID technology and evaluated in a section Attacks Scenarios below and security requirements for EPCglobal networks are derived in a section Security Requirements. If item-level identifiers are not exchange via RFID technology, the corresponding wired security issues only exist. However, this application focusses on RFID since its use introduces additional security threats in contrast to other transmission techniques, such as barcode readers.

Threats of EPCglobal networks and attacks focusing on RFID technology as discussed are summarized in Table 1, as reproduced below.

| Th. | Attacks | Loc. | Involved Components | Actors |
|---|---|---|---|---|
| T1 | A3 | I, O, T | EPC, RFID Tag | A, R |
| T2 | A3 | I | EPCDS, EPCIS | C, R |
| T3 | A1, A3 | O, T | EPC, RFID Tag | A |
| T4 | A3 | I, T | EPC | C, R |
| T5 | A3 | I | EPCIS | R |
| T6 | A2, A3, A4, A5, A6, A7 | I, O, T | EPC, EPCIS, RFID Tag | A, C |

Table 1 shows a classification of security threats and possible attacks in EPCglobal networks with respect to their location in the supply chain (A=Attacker, C=Counterfeiter, I=Inside the Supply Chain, Loc.=Location, O=Outside the Supply Chain, R=Competitor, T=Transition Zone of the Supply Chain, Th.=Threat) Most attacks correspond to threat T6, which involves RFID tags and EPCIS repositories.

Data protection in context of communication networks refers to multiple Data Integrity aspects. A defined set of data must remain valid during the lifetime of its associated product. Furthermore, it must be ensured that all authorized supply chain parties can access data at any time without unexpected manipulations or modifications. This kind of data protection is referred to as data integrity. It ensures that third parties are not able to modify data during its lifecycle—expectedly or unexpectedly.

Another aspect of data protection is data quality. It highlights the issue that data describing a given item is not always processed correctly. Radio technology suffers from various aspects that can influence the transmission quality. Multiple readers and tags communicating simultaneously can limit coverage of radio waves and influence the quality of read data. Data quality is important for tracking and tracing since assumptions about the path of goods within the supply chain are incorporated in verification of product authenticity. For instance, certain readers have to be passed in a defined order to ensure that a product was handled by authorized intermediates only. Reduced data quality influences available data for authenticity checks of products.

Threats of RFID-Aided Supply Chains

Figure 2:
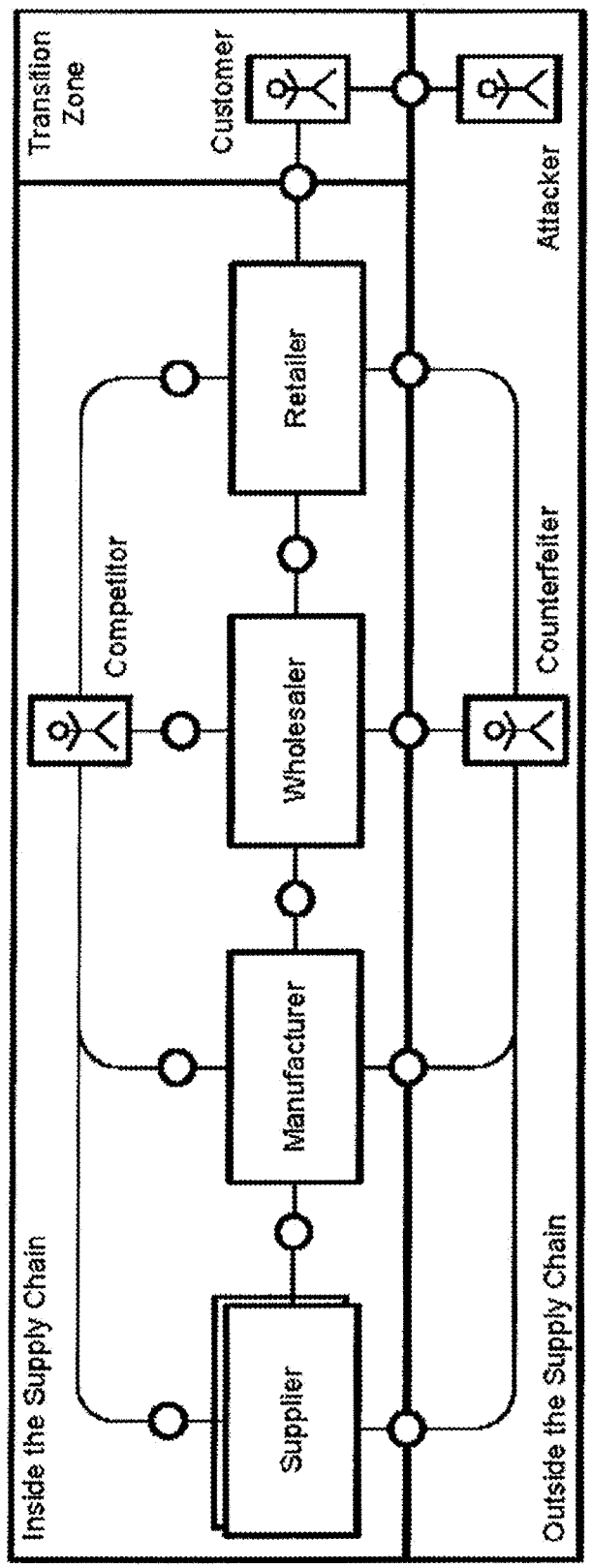

FIG. 2 depicts a classification of supply chain parties and possible attacks. It consists of suppliers, i.e. manufacturers that create goods, manufacturers that assembly goods, wholesalers, retailers, and customers. In addition, it depicts three categories of malicious actors: a) competitors within the supply chain, b) counterfeiter and c) attackers outside of the supply chain.

Due to the variety of involved actors in supply chains, specific security issues exist. The following classification combines security issues of supply chains with issues of EPCglobal networks.

T1 Implicit Product Identification:

The EPC references the product's manufacturer and the class of the product. For example, the SGTIN looks like urn:epc:id:sgtin:CompanyPrefix.ItemReference.SerialNumber as defined by EPCglobal (see for example Global Standards 1. Tag Data Standards 1.6. www.gs1.org/gsmp/kc/epcglobal/tds/tds__1__6-RatifiedStd-20110922.pdf, 2011, in the following referred to as EPCglobal 1, therein Sect. 6.3.1). If the EPC is stored on a RFID tag, it can be read out from distance without establishing a direct line of sight. Thus, the manufacturing company and the class of the product can be derived even when there is no direct access to the product. Furthermore, tagged products in transportations units can be derived by thefts by scanning their RFID tag with commodity readers. As a result, protection of on-tag data needs to be considered with respect to authorized parties.

T2 Supplier Relationships:

Querying the EPCDS or EPCIS repository of involved supply chain parties within the supply chain is the basis to reconstruct a product's full path through the supply chain. On the one hand, this is the basis for the anti-counterfeiting service provider. On the other hand, business relationships, e.g. intermediate wholesalers, are exposed when returning a full list of EPCIS repositories of supply chain parties that handled the queried product. Furthermore, competitors could query details about a guessed EPC of a potential product ingredient. If the EPCIS repository of the manufacturer returns any details, it exposes implicitly the business relationship with the supplier and possible product ingredients.

T3 Customer Privacy:

Due to the unique serial number stored in EPCs, customers can be tracked when they hold a product equipped with a functional tag. Manufacturer and attackers can associate customers with products they bought, e.g. during verification of the product's authenticity. This exposes the customer privacy.

T4 Customer Relationships:

The unique serial of the EPC used for item-level identification exposes relationships of supply chain parties that handled the good. For example, relationships between individual supply chain parties within the supply chain or with customers in the transition zone of the supply chain are affected from this issue. This has a major impact on the integrity of the supply chain since customer.

T5 Industrial Espionage:

Competitors can query the EPCIS to receive details about the processing time. For example, the time between product shipment and receipt can be derived. This measure can be used as indicator for selling rate, production time, or supply shortages and occurs within the supply chain. Furthermore, if event data is exchanged in clear text, its content can be eavesdropped. For example, external parties can analyze process steps involving the handled product.

T6 Counterfeit Injection:

Unique identification of products reduces the possibility of counterfeit injection. However, reusing a stolen tag on a counterfeited product, guessing a valid EPC code, or skimming of EPCs from authentic products can be misused for counterfeit injecting. Injecting faked EPCs into EPCIS repositories result can be used to make a faked product authentic from the EPCIS repository's perspective. Intercepting the communication between EPCIS and querying party can be used to return authentic details for faked products.

These brief examples highlight privacy concerns and security threats that arise in EPCglobal networks when fine-grained event data is automatically exchanged. On the one hand, controlling access to event data is the first step to prevent the aforementioned issues. On the other hand, restricting access to a subset of event data does not prevent its combination. From our perspective, the combination of event data is the basis to derive business secrets and business relationships.

Attacks Scenarios

In the following section attacks of communication networks are presented and their potential impacts on RFID-aided supply chains are derived.

A1 Malicious RFID Readers:

Data protection threats in RFID-aided supply chains are comparable to existing pendants in Wi-Fi networks. We assume that additional security mechanisms will be introduced to harden the resistance of RFID against manipulated RFID readers. Currently, it is possible to use commodity readers to access passive low-cost tags that are, for example, integrated in passports or driver's licenses.

For the pharmaceutical scenario defined in the section on Challenges in Pharmaceutical Supply Chains, above, this introduces the following issues. EPCs can be obtained without having physical access to the carrying tags. As a result, the EPC of a blister packet stored on a RFID tag can be read out after the customer has left the pharmacy. The holder of a tag does not know that a read attempt occurred. Furthermore, the knowledge that a concrete customer holds a specific tag can be misused to track customers, too. These are customer privacy threats as defined by threat T3. From the customer's point of view, the tags needs to be disabled before leaving the pharmacy to ensure personal privacy.

A2 Tampered RFID Tags:

Manipulating RFID-aided supply chains does not mandatorily involve attacking readers. Often it is sufficient to irritate the tag's function, e.g. by sending manipulated data or to shield tags from readers. With the help of a special wireless interface, an attacker can emit a recorded tag transmission to an incoming stimulus by a reader. In context of the pharmaceutical scenario, it allows exchange of an authentic product by a manipulated one while simulating the tag's behavior of the authentic product. Once the response of an authentic pallet was recorded it can be replayed many times. It may be sufficient that a single corrupted tag escorts a pallet of multiple items without the need for integrating it into the pallet itself. This threat can be misused to inject counterfeits into the supply chain as defined by threat T6.

A3 Man-In-The-Middle Attack:

The Man-In-The-Middle (MITM) attack is known in communication networks for years [60]. Data exchanged between two peers A and B is transmitted through different routes. Routes are dynamically set-up by the incorporated communication protocol. Once an attacker is controlling one node on the route or is able to influence the connection setup process through a specific route the network traffic between A and B can be filtered. MITM attacks are used to gain login information. In context of the EPCglobal networks, they can be performed in context of all mentioned threats.

The detection of unauthorized read events becomes very important, especially when using security-enhanced tags. The EPCglobal standard defines a kill command, which can be issued by sending a freely programmable 2×16-bit kill PIN. Although this is an irreversible action, it is interesting for attackers to obtain the kill PIN. Programming hundreds, thousands or hundreds of thousands tags with a dedicated kill PIN is a time-consuming operation. Every tag has to be programmed with a unique kill PIN. The kill PIN has to be stored in a company meta data repository connecting it with the corresponding EPC. Additionally, during tag programming it has to be ensured that a strong PRN generator is used for generation of the kill PIN, i.e. duplicates have to be omitted. Otherwise, gathering a single kill PIN might expose kill PINs of a certain product group or company. Attackers could disable tags of a complete delivery, which would result in blocked business processes that depend on the correct functionality of the tags.

In RFID-aided supply chains transportation routes of items are similar to routes in communication networks. Comparable to unsecured wireless connections, which can be accessed over a long distance, RFID technology suffers from very similar threats. RFID readers can be placed anywhere to acquire data of passing tags, e.g. in context of threat T4 or T2. The current owner of a product equipped with a RFID tag is not able to recognize read attempts without special equipment. Let us assume the pharmaceutical scenario given above. At the point of sale in the pharmacy, the kill command is issued to disable the RFID tag of a pharmaceutical product. The pharmacy authenticates itself to the supplier, checks whether the current product is authentic and queries for the specific kill PIN. Issuing the kill command ensures the customer's privacy by making it impossible to draw any mappings between product and customer after leaving the pharmacy, e.g. to prevent threat T3.

A4 Cloning and Spoofing:

Low-cost passive RFID tags, which are primarily used for tracking and tracing scenarios, are neither equipped with computational power nor any security equipment as will be described in below. Thus, any third party can access the tag's content with commodity reader devices. Cloning is the process of creating a complete copy of an original tag including the contained EPC. Copying an entire tag is the basis for injecting counterfeits into the supply chain as defined by threat T6. Once an existing product is replaced by a counterfeit its meta data history is valid from the point of view of any querying party. A cloned tag inherits the virtual product history of its original tag pendant.

Spoofing in terms of RFID—also known as masquerading or identity theft—exploits a trusted relationship between two peers. It is the process of influencing a RFID reader, which assumes to receive the EPC of a specific tag, while the original tag is absent. Spoofing can be achieved by cloning the original tag or by simulating a tag containing a virtual non-existing EPC. It is the basis for injection of counterfeits as defined by threat T6.

The EPCglobal tag standard defines unique product identification, but it does not define how to assign serial numbers (see EPCglobal). If serial numbers are assigned in a strictly linear order, attackers can derive faked ones by guessing. To reduce the possibility of serial number guessing a proper PRN generator needs to calculate new serial numbers for EPCs. This way, spoofed EPCs can be detected if a non-valid EPC is checked against the vendor's list of valid EPCs. This security issue is already recognized by the industry.

A5 Replay Attack:

In terms of communication networks replay attacks are prepared by MITM attacks. A third party listens to the conversation of two peers. Once a certain information is gathered, the attacker reuses it, e.g. for logging into a secured system. Computer systems can be protected against replay attacks, e.g. by using One-Time Passwords (OTPs). Their validity is limited for a one-time use only.

In RFID-aided supply chains, replay attacks can occur if products tagged with the same tag pass reader gates succeeding times, e.g. hours or days after the original tag passed in context of counterfeit injection as defined by threat T6. A manifestation in the pharmaceutical scenario is an EPC of a pharmaceutical product that is scanned during goods receipt multiple times at the site of the same vendor. Juels proposes the use of so-called pseudonyms, which are randomly changed after each read request (see An Juels. Minimalist Cryptography for Low-Cost RFID Tags. In Carlo Blundo and Stelvio Cimato, editors, *Security in Communication Networks*, volume 3352 of *Lecture Notes in Computer Science*, pages 149-164. Springer Berlin/Heidelberg, 2005). Pseudonyms work in a similar way like OTPs. In addition, they influence the uniqueness the exchanged data. As a result, without a concrete knowledge about the incorporated pseudonyms, the exchanged data cannot be derived. As a result, pseudonyms reduce replay attacks and traceability of tags by eavesdroppers while the decoded EPC remains unchanged.

A6 Controlled Signal Interferences:

Signal interferences are issues, which prevent proper tag reading. RFID technology uses different bands for wireless communication as described in the Components of EPCglobal section. Comparable to any kind of radio communication, the quality of RFID communication depends on the used band. If multiple communication attempts occur simultaneously, transmission quality degrades. Various liquids and metals, such as lead or aluminum, shield radio waves. As a result, tags cannot be read successfully or the data quality of the response degrades. It is possible to overlay radio waves by triggering controlled interferences with transmissions of higher amplitude. Attackers can hide the existence of spoofed tags by provoking controlled interferences. This technique can be used to hide counterfeits on its way as defined by threat T6.

A7 Data Encryption:

Communication via unreliable networks can be secured by using data encryption. In Wi-Fi networks encryption standards are used, e.g. TKIP or AES (Martin Beck and Erik Tews. Practical Attacks against WEP and WPA. hxxp://dl.aircrack-ng.org/breakingwepandwpa.pdf, 2008.). Data encryption prevents attackers from gathering data out of an encrypted communication stream. It is based on generating PRN out of a large domain for use as encryption keys. It is referred to as a secure encryption as long as no brute-force attack is able to obtain encrypted data in appropriate time. With increasing computational power, encryption standards become weak, such as the Data Encryption Standard (DES). Cloning an encrypted RFID tag results in a perfect copy of the original. Although the encrypting data on tag prevents attackers from reading the EPC in clear text, the perfect clone acts identically to its original pendant. As a result, encryption in context of RFID technology leaves the issues cloning and spoofing still open. As a result, encryption does not prevent threat T6 in context of EPCglobal networks.

Security Requirements

After having discussed selected threats for RFID systems, Concrete data security requirements for IT systems are defined in context of EPCglobal networks. From a system engineering's point of view, these requirements build the security blueprint during the design phase for the upcoming implementation. This application focusses on functional and non-functional system requirements.

Functional requirements describe how certain aspects of security extensions should react in response to concrete stimulus and how they should behave in certain situations whereas non-functional requirements define constraints that apply to the complete security extensions focusing on provided functions and services.

In the following, a selected list of functional requirements for security extension of EPCglobal networks is discussed. They are driven by the need for verification of goods without significant latency in business processes, e.g. when dealing with fast-moving goods. Since response time behavior as described in Hypothesis 1, as outlined further done, is relevant for the applicability of security extensions, response time is considered as a functional requirement in contrast to existing literature.

F1 Response Time:

From the business' perspective, applying security extensions must not result in significant delays of existing business processes. As a concrete example, the goods receipt process should be used as a motivation in the following. With respect to Hypothesis 1, an upper threshold of two seconds processing time must not be exceeded.

F2 Control Access:

Security extensions must control access to event data.

F3 Authenticated Users:

Security extensions need to grant access to authenticated users only.

F4 Querying Parties:

Keeping track of querying parties is important in case of data exposure. Any security extension should be aware of the querying party, date, and time when certain data were exposed to embank potential data leakages.

F5 Data Minimalism:

Querying parties should access only the data that is required to fulfill their tasks. Security extensions should follow the principle of data minimalism by granting access only to relevant data portions. As a result, the inquirer needs to be able to specify, which fraction of data should be returned.

F6 Filter Data:

Security extensions need to filter the result sets to control data access and to enforce the principle of data minimalism. The result set needs to be filtered to remove protected and sensitive data that is specified as inappropriate for the given inquirer.

The following constraints describe non-functional requirements for security extension of EPCglobal networks. These requirements are driven by the need for affecting the performance of existing business processes at a minimum.

N1 Processing Load:

From an operational perspective, security extensions result in additional processing requirements. Increased computational demands require additional hardware at the site of involved supply chain participants that handle many products, e.g. manufacturers and wholesalers. Thus, security extensions should keep requirements for additional computational power as low as possible.

N2 Maintainability:

The regular maintenance of access rights is a complex and time-consuming task in IT systems with a predefined number of users and roles. From the engineering perspective, a supply chain consists of a huge number of parties that do not known each other. We consider maintaining individual access rights for all parties as a time-consuming and complex job. Since access rights need to be granted before event data are exchanged, manually managing access rights delays business process that build on the automatic exchange of event data. Security extensions for EPCglobal networks need to automatically assign access rights for unknown supply chain parties on an individual basis.

N3 Ease of Configuration:

In terms of configuration, a policy administration point (PAP) needs to be provided for defining access rights, rules, etc. It needs to provide a configuration platform that supports the user in testing, modeling, verifying, and configuring access rights and rules.

N4 Ease of Integration:

Migrating to a new software or release is a complex and time-consuming task. For example, changing data formats involves processing of all data involved. As a result, security extensions should optimize migration efforts with respect to expected downtime and need for processing of current data in use.

Problem Statement and Hypotheses

In the following, a selected problem statement and corresponding hypotheses are introduced. The latter draw the motivation of this application, since we are going to prove or disprove their correctness with the help of the given contributions.

Action: With respect to the lifecycle of the EPC, the involved action when the event occurred, e.g. ADD, OBSERVE, or DELETE, and Read Point: The location, where the event occurred.

In contrast to the EPCglobal definition, the read point is considered as mandatory detail, e.g. for business processes to locate the concrete product. Events may also contain further optional details, such as involved business steps, business locations, and sensor data of active tags. EPCglobal defines the following core events types: object, aggregation, quantity, and transaction.

```
1    <soap:Envelope xmlns:soap="http://schemas.xmlsoap.org/soap/
         envelope/"><soap:Body><ns3:QueryResults xmlns:ns2="http://
         www.unece.org/cefact/namespaces/
         StandardBusinessDocumentHeader" xmlns:ns3="
         urn:epcglobal:epcis-query:xsd:1" xmlns:ns4="
         urn:epcglobal:epcis:xsd:1" xmlns:ns5="urn:epcglobal:epcis-
         masterdata:xsd:1">
2    <queryName>SimpleEventQuery</queryName>
3    
4        <EventList>
5            <ObjectEvent>
6                <eventTime>2010-10-04T00:11:39.000+01:00</eventTime>
7                <recordTime>2010-10-04T00:12:02.930+01:00</recordTime>
8                <eventTimeZoneOffset>+01:00</eventTimeZoneOffset>
9                <epcList><epc>urn:epc:id:sgtin:1301757845
                    .008.000133753170</epc></epcList>
10               <action>OBSERVE</action>
11               <bizStep>urn:epcglobal:epics:bizstep:fmcg:observe</
                    bizStep
12               <readPoint><id>urn:epc:id:sgln:1301757845.66446365.2</id
                    ></readPoint>
13               <bizLocation><id>urn:epc:id:sgln:1301757845.66446365.2</
                    id></bizLocation>
14           </ObjectEvent>
15           <ObjectEvent>
16               <eventTime>2010-10-04T16:01:53.000+01:00</eventTime>
17               <recordTime>2010-10-040T16:04:22.586+01:00</recordTime>
18               <eventTimeZoneOffset>+01:00</eventTimeZoneOffset>
19               <epcList><epc>urn:epc:id:sgtin:1301757845
                    .008.000133753170</epc></epcList>
20               <action>OBSERVE</action>
21               <bizStep>urn:epcglobal:epcis:bizstep:fmcg:observe</
                    bizStep>
22               <readPoint><id>urn:epc:id:sgln:549132542.340339831.2</id
                    ></readPoint>
23               <bizLocation><id>urn:epc:id:sgln:549132542.340339831.2</
                    id></bizLocation>
24           </ObjectEvent>
25       </EventList>
26   </ns3:QueryResults></soap:Body></soap:Envelope>
```

The integrity of existing supply chains is a fragile construct. When migrating to EPCglobal networks, new fine-grained data are shared between supply chain parties. On the one hand, this enables precise control of fast moving goods, e.g. to establish industry-wide anti-counterfeiting. On the other hand, the exposure of these data can be misused to derive sensitive business secrets or to inject counterfeit products into the market.

In the remainder of this application, events are referred to in context of EPCglobal networks as tuples, which may consist at least of the following attributes (see Global Standards 1. EPCIS Standard 1.0.1. www.gs1.org/gsmp/kc/epcglobal/epcis/epcis_1_0_1-standard-20070921.pdf, 2007, referred to in the following as EPCIS 1.0.1, Sec. 7.2.8):

Unique Product Identifiers: A list of unique identifiers of products the event is associated with, e.g. the individual Electronic Product Code (EPC), Event Time: The timestamp when the event occurred, Record Time: The timestamp when the event was recorded, The above listing shows event data serialized within a SOAP response body. Lines 5-14 show an event for action OBSERVE. It consists of the serialized unique product identifier urn:epc:id:sgtin:1301757845.008.000133753170, the event timestamp 00:11 a.m. at Oct. 4, 2010, and the serialized read point urn:epc:id:sgln:1301757845.66446365.2. Furthermore, it contains details about business step, business location, and record time. Event data build the foundation of EPCglobal networks. They enable fine-grained tracking and tracing of products, e.g. for anti-counterfeiting. EPCglobal networks require the automatic exchange of event data via EPCIS. However, unauthorized access to event data or their unsecured exchange result in data leakage, exposure of confidential business secrets, relationships, or product ingredients.

EPCglobal networks build the foundation of improved business processes, such as anti-counterfeiting, verification of product authenticity, and detection of counterfeit injection. We focus on the benefits of EPCglobal networks with respect to anti-counterfeiting in this application. For example, the liability for improper effects of counterfeited pharmaceuticals is widely discussed. The manufacturer of the original product is currently considered as the party that is reliable for side effects of counterfeited product unless the customer can clearly distinguish between authentic and counterfeited products. Faked pharmaceuticals may harm or even kill human beings and pharmaceutical manufacturer are considered as being reliable for any side effects.

EPCglobal networks are motivated by anti-counterfeiting techniques based on the analysis of event data and the need for supply chains integrity. Unless event data are considered as sensitive and still exchanged in clear text without any protection against manipulation or eavesdropping, it remains questionable whether they build a reliable basis for anti-counterfeiting. This application is driven by the idea that real-time security extensions throughout the supply chain can be used to restrict the injection of counterfeited goods into supply chains by automatically analyzing the product's meta data.

The title of this application points out a dedicated real-time aspect. It stresses the fact that access to event data needs to be granted or declined within milliseconds to prevent blocking of existing business processes that depend on the outcome of the access decision. We refer to real-time as the access decision of the security extensions is taken within an empiric time frame of less than two seconds as stated in hypothesis. 1. EPCglobal networks are considered as a possible basis for anti-counterfeiting, which support the reconstruction of time and location of a possible counterfeit injection. As a result, the stated liability problem can be shifted to the supply chain party that accepted an untested product after counterfeit injection.

Is it possible to establish new business relationships in open supply chain and to automatically exchange event data while protecting business secrets?

Nowadays, manufacturers control their suppliers and customers in closed supply chains, e.g. in the automotive industry. As a result, manufacturers are able to verify suppliers' products before deciding to use products of a new supplier. In addition, manufacturers define product characteristics that need to be fulfilled by the supplier, e.g. time to deliver, packaging size, and details contained in the advice letter, etc.

Open supply chains shall be construed as supply chains, wherein one or more unknown parties participating in the supply chain does not know each other. Hence manufacturers struggle to verify a supplier's product. In open supply chains there is the challenge how to initially trust unknown or new supply chain parties, e.g. new suppliers. We define the problem how to initiate a new relationship between business partners within open supply chains as initial trust problem. In the remainder of the work, we refer to trust as the absence of complete certainty. Since defining and measuring trust is not in focus of the work, we consider this brief definition as feasible to motivate the initial trust problem. Furthermore, unknown wholesalers or customers result in the risk of business infiltration, e.g. competitors that try to obtain details about suppliers, product ingredient or involved third parties. We consider business secrets as sensitive, which are protected by design in closed supply chains.

Supply chains are more and more optimized to improve Key Performance Indicators (KPIs), such as on stock availability, transportation costs, and on-time delivery. Nowadays, one of major competitive KPIs is conformance to promised delivery time. As a result, the electronic exchange of product meta data, e.g. delivery date or advice letter, is performed before its physical pendant is delivered. Combining the advantages of automatic exchange of product meta data, e.g. through EPCglobal networks, with open supply chains, results in new challenges for IT systems of involved supply chain partners.

In this application, we define alternatives to protect sensitive business secrets while enabling automatic exchange of product meta data in EPCglobal networks. Furthermore, our approach supports the use of implicit access rules that are evaluated with the help of the complete query history to control access to data that might expose business secrets when semantically combined. It further supports explicit definition of access rights for individual supply chain partners and groups and to enable a fine-grained access control. This contribution introduces access control for EPCglobal networks that are currently out of scope of EPCglobal specifications.

Granularity of Protection of Fine-Grained Event Data

Data stored in event repositories can vary in quantity and level of detail. De-pending on the business relation with the querying party, the amount of data and the degree of detail that is shared needs to be controlled to confirm with the principle of data minimalism.

Hypothesis 1 Validation and adaption of access rights based on the analysis of the complete query history can be performed in real-time during query processing, i.e. in less than two seconds.

Prevention of Anonymous Attacks Against EPCglobal Information Systems

EPCglobal networks require open interfaces that can be queried for details about handled goods. The question raises how to prevent anonymous attacks by counterfeiters or competitors against these interfaces to obtain event data or to derive sensitive business secrets.

Hypothesis 2 Applying Public Key Infrastructure (PKI) certificates for identification of supply chain parties can be used to establish specific access control and to trace counterfeiters or attackers once they were detected.

Exposure of Encryption Keys

Encryption is an establish way to securely exchange sensitive data. However, once the encryption key is exposed, the encrypted content is no longer secured.

Hypothesis 3 Management of individual encryption keys per supply chain participant can reduce impact of key exposure. Thus, in case of disaster, malicious clients can be blocked individually without affecting other supply chain participants. Using an in-memory database supports multiple key renewals per day and individual key lookups in an interactive manner.

State of the Art

The following chapter presents findings on selected related work and places our application in the corresponding context. There are two categories of related work with relevance to our work that are considered in this chapter:

Related work dealing with access control, which is a special mechanism to expose data to authorized parties only, is presented in section Access Control mechanisms, and Related work dealing with EPCglobal networks and securing its components is presented in section Components of EPCglobal networks.

The first is considered to outline existing techniques for protection of sensitive data, their limitations, and their applicability with respect to EPCglobal networks. The second is considered to present and evaluate standards introduced by the EPCglobal consortium, derive trends of ongoing security activities in this context, and to introduce the technical foundations of EPCglobal networks. In a section Combination and classification of Related Work the analysis results of related work are classified.

Access Control Mechanisms

Security aspects are typically researched to address a certain threat, platform, software, use case, etc. In the following, this application is placed in context of related work on access control systems. We define access control as all efforts to limit various actions a E A to sensitive resources r∈R to a certain user u∈U. Access control can formally be defined as a triplet as given in Eq. 1. In context of EPCglobal networks, we focus on event data as the resources that need to be protected, i.e. R={EPC events}.

$$(a,r,u) \forall a \in A, r \in R, u \in U \quad (1)$$

Discretionary Access Control (DAC) describes a class of mechanisms that control access by leaving the access decision to the user (Vincent C. Hu, David F. Ferraiolo, and D. Rick Kuhn. Assessment of Access Control Systems. Interagency Report 7316, National Institute of Standards and Technology, 2006, referred to in the following as Hu et al.). In other words, once a certain user is granted access to a resource, she/he is able to grant access for a certain resource to further users. Even if there is only limited access defined for a certain resource, e.g. read-only, the user is able to create a copy of the resource's content and grant individual access for further users to the copied content, which results in data exposure. For example, representatives of DAC are Access Control Lists (ACLs) incorporated by the operating system Microsoft Windows and owner-group-other flags of Unix for controlling access to files. The counterpart of DAC is referred to as Non-Discretionary Access Control (NDAC), i.e. access is not directly controlled by the user, but by a dedicated administrative entity (see Hu et al.).

Role-based Access Control (RBAC) defines a superclass for access control mechanisms that enforce access rights and restrictions on working roles rather than on individuals (David F. Ferraiolo and D. Rick Kuhn. Role-Based Access Control. In *Proceedings of the 15th NIST National Computer Security Conference*, pages 554-563, 1992). RBAC decouples user management from access management. To do so, RBAC controls access to resources by controlling actions A performed by users U on resources R. In contrast to traditional access control, RBAC groups allowed actions A in roles Ro as depicted in FIG. 3(a). There is no direct mapping between resources R and users U due to the indirection introduced by the roles concept. Formally, RBAC can be understood as set of tuples with $A_{ro}=(\{a \in A | \text{permitted by ro}\}$, $R_{ro}=\{r \in R | \text{ro is granted access to}\})$ and $U_{ro}=(\{u \in U | \text{assigned to ro}\})$ as defined in Eq. 2.

$$RBAC=\{(A_{ro},R_{ro}) \times U_{ro}\}, ro \in Ro \quad (2)$$

FIG. 3 gives a comparison of access control mechanisms using entity relationship diagrams. In FIG. 3a RBAC controls allowed actions on resources via roles, while RuBAC, as depicted in FIG. 3b controls access via rules evaluating predicates (A=Actions, P=Predicates, R=Resources, Ro=Roles, Ru=Rules, U=Users, V=Additional decision data).

With the assumption that the number of users is larger than the number of active roles, RBAC results in reduced maintainability. For example, granting access to the location attribute of gathered event data to all colleagues working as packers becomes a single task. Rather than identifying all packers within the company and setting their individual access rights, all colleagues working as role Packer are assigned with the right to read EPC event location. Thus, all packers get immediate access to the required event data in a transparent way. Furthermore, also newly joined colleagues are automatically granted the access rights to read EPC event location. However, this results in the disadvantage, that people's role membership has to be supervised otherwise access rights might be expanded while certain persons are no longer allowed to get access. For instance, if there are two mutually excluding roles defined to establish a Separation of Duties (SoD) and a certain person gets assigned both roles, SoD is violated although RBAC is applied (see Hu et al.)

Nevertheless, RBAC is valued as a concept that improves handling of access for a potentially infinite number of users. In terms of the pharmaceutical supply chain as described above the number of users of a certain EPCIS repository is not known beforehand. In contrast to the number of involved goods and parties in the pharmaceutical supply chain, the amount of active roles is expected to be comparable small. Firstly, roles accordingly to the supply chain role are reasonable to distinguish between direct partners, who receive goods without involved third parties, and indirect partners, which receive goods via further intermediates. Secondly, roles can be used to group goods in categories and control access via this indirection. Thirdly, special classifications introduced by the supply chain party can be used to value certain partners, e.g. high and low priority business partners or suppliers.

This example shows two aspects of RBAC. Firstly, roles cannot be predefined due to the variety of possible classification criteria. Secondly, grouping individual inquirers into roles helps to abstract from the unknown number of inquirers and keeps access control as a limited task rather than as a regular task when an unknown inquirer is querying.

In context of EPCglobal networks and the given pharmaceutical scenario, RBAC supports abstraction of individuals. As a result, the administrative overhead for maintaining possibly hundred of thousands individual access rights vanishes. Thus, we consider RBAC as one way to reduce the complexity. In the given application, RBAC is applied to definition and enforcement of access rights as will be described in a section Extended process steps further down.

Rule-based Access Control (RuBAC) refers to all access control mechanisms defining access rights or restriction in a set of rules that need to be evaluated for each access request (Hu et al.). In other words, RuBAC is a general term for access control systems that allows some form of organization-defined rules (Adesina S. Sodiya and Adebukola S. Onashoga. Components-Based Access Control Architecture. *Issues in Informing Science and Information Technology*, 6:699-706, 2009). RuBAC results in the advantage of defining various kinds of complex rules based on any kind of additional attributes, such as remote host name, current time, user details, etc. As a result, RuBAC enables a more fine-grained access control than RBAC. However, a concrete definition of rules and its interpretation needs to be implemented individually. RuBAC defines a set of rules Ru consisting of predicates P that are evaluated specifically when a concrete user u is accessing a certain resource r to perform an action a. Formally, RuBAC can be represented as given in Eq. 3 and depicted in FIG. 3b.

$$Ru=\{P(a,r,u,v)\}) \forall a \in A, r \in R, u \in U, \{v \in V \text{ decision data}\} \quad (3)$$

RuBAC results in a higher flexibility when granting access. In the given application, RuBAC is incorporated to adapt access rights accordingly to the history of granted access rights as will be described in the section Extended Process Steps, further below.

The contributed HBAC combines RBAC and RuBAC to control access to event data in a holistic way as described in the section Architecture, further down.

The eXtensible Access Control Markup Language (XACML) is an eXtensible Markup Language (XML) dialect specified by the OASIS consortium. It aims to define access control rights for subjects representing users, resources, and action based on rules and policies (OASIS Open. eXtensible Access Control Markup Language (XACML) V.2.0, February 2005, referred to as OASIS 2.0 in the following). In addition, XACML introduces a conceptual SoD for access control systems, which is also applicable for the given application. Tab. 2 presents XACML duties, its brief description and a mapping to components of this work with direct references for further reading, as reproduced below.

| XACML | Description | HBAC | Section |
| --- | --- | --- | --- |
| Policy Enforcement Point (PEP) | Component that enforces the decision issued by the PDP, i.e. interacting with the user and the resource to grant access to | Access Control Client (ACC) | ACC |
| Policy Decision Point (PDP) | Component that issues and revokes valid policies, e.g. based on external in-formation, such as the querying user, history, context, etc. | Access Control Server (ACS) | ACS |
| Policy Administration Point (PAP) | Component responsible for managing policies, i.e. creating or modifying or access rights | Configuration Tool | Configuration Tool |
| Policy Information Point (PIP) | Component that provides additional information for the PDP to derive decisions | Trust Relationship Server (TRS) | TRS |

Table 2 illustrates a mapping of XACML duties to sections within this application.

The use of XML for definition of access rights is a common approach as shown by the classification of related work. This standardized way of communication contributes to the interoperability between various software systems and vendors. In addition, it makes the automatic transformation of data formats possible, e.g. by using an eXtensible Stylesheet Language Transformations (XSLTs) (see James Clark. XSL Transformations (XSLT). www.w3.org/TR/xslt, November 1999). However, in addition to XACML, which is only rarely used for RFID-specific developments, various extensions or other XML dialects are used, such as aidXACML or EAL introduced by Grummt et al. (Eberhard Grummt and Martin Schöffel. Verteilte Autorisation in RFID-Ereignissystemen. In Patrick Horster, editor, *D.A.CH Security—Bestandsaufnahme, Konzepte, Anwendungen, Perspektiven*, pages 337-345, Berlin, Germany, 2008).

The Open Digital Rights Language (ORDL) is a XML dialect for defining and maintaining rights of asset (ODRL Initiative. ODRL V2.0-XML Encoding. hxxp://odrl.net/2.0/WD-ODRL-XML.html, 2010). Assets in context of ODRL are mainly multimedia contents, such as audio or video contents. In the given application, we consider event data as company-specific assets comparable to purchased multimedia contents. Event data can be accessed by various inquirers but with individual access rights. Once a certain criterion expires accessing event data must not be able. We decided to make use of ODRL for definition of access rights and access control information for our contribution since it is a lightweight approach and reduces data processing overhead. However, a homomorphism can be defined that transforms ODRL to the more expressive XACML, i.e. XACML is another possible implementation for definition of access rights.

Components of EPCglobal Networks

The EPCglobal consortium—newly also known as Global Standards 1 (GS1)—defines technical components and standards for intercommunication in RFID-aided supply chains. EPCglobal standards can be grouped in the functional layers identification, capturing, and exchanging as depicted in FIG. 4 (taken from Global Standards 1. GS1 Standards Knowledge Centre. www.gs1.org/gsmp/kc/epcglobal/).

The identification layer deals with the data format stored on tags, e.g. Tag Data Standard (TDS), and its translation, e.g. Tag Data Translation (TDT).

The capturing layer defines the communication protocol between tags and readers, e.g. Tag Protocol UHF Class 1 Gen1, EPC HF, and the Low Level Reader Protocol (LLRP), which is responsible for data acquisition and event capturing.

On top, the Discovery Configuration and Initialization (DCI) and the Reader Management (RM) define how to discover and control distributed reader devices. The Application Level Events (ALE) standard defines how to handle, filter, and process reader events for software applications.

EPCIS bridge the gap between the layers capture and exchange. The Core Business Vocabulary (CBV) defines language elements used for data exchange. From the enterprise's point of view, the EPCIS provides high-level access methods for processing event data in enterprise applications, such as ERP systems. Object Name Service (ONS) and EPCDS perform lookup and discovery of resources, such as supply chain participants that handled a certain good. The standards Certificate Profile (CP) and Pedigree define data formats for exchanging data within EPCglobal networks from a business perspective.

We define EPCglobal networks as communication networks that exchange event data with the help of the components as defined by EPCglobal standards of the appropriate layer. In other words, EPCglobal networks contain only relevant components for business transactions, i.e. EPCglobal actors for EPCIS, ONS, and EPCDS. In addition to existing EPCglobal definition, we assume the existence of a generic service provider that performs business tasks not addressed by aforementioned components of EPCglobal networks, such as anti-counterfeiting.

RFID Tags

RFID tags consist of the components: a) antenna, b) integrated circuits, c) data storage, and d) optional equipment, such as sensors. They are tiny radio devices that can be distinguished accordingly to a) the operating frequency band, b) the type of tag, and c) their read-write capabilities.

The available radio band for RFID communication is defined by global standardization that can be restricted on a per-country basis (International Organization for Standardization. ISO/IEC 18000: Information Technology—Radio Frequency Identification for Item Management, 2004-2010). Table 3 displays a classification of radio frequency bands used by RFID tags. UHF tags are nowadays used for tracking and tracing scenarios due to the low power required for emitting signals. Table 3 gives an overview of available radio bands and their frequency in Europe and in the United States of America (USA), as displayed below.

TABLE 3

| Radio Band | Frequency |
|---|---|
| Low Frequency (LF) | 100-135 kHz |
| High Frequency (HF) | 13.56 MHz |
| Ultra High Frequency (UHF) | 868 MHz (Europe), 915 MHz (USA), 2.45 GHz (ISM) |
| Super High Frequency (SHF), Microwave (MW) | 5.8 GHz |

In comparison, current radio broadcasting based on FM operates in the frequency band 87.5-108 MHz, whereas former radio broadcasting was based on AM that operates in the frequency band Long Wave (LW) 148.5-283.5 kHz, Medium Wave (MW) 520-1,610 kHz, and Short Wave (SW) 2.3-26.1 MHz. Furthermore, current cellular phones operate in the bands 900 MHz and 1800 MHz (Europe), 850 MHz and 1900 MHz (USA) respectively. Nowadays, UHF tags are mainly used for EPCglobal networks, i.e. their operating frequency is comparable to cellular phones or is located within the so-called Industrial, Scientific, and Medical (ISM) band.

The tag's type describes its capabilities. Keeping production costs low is a major requirement for passive RFID tags in EPCglobal networks for Near Field Communication (NFC) (see for example, Erick C. Jones and Christopher A. Chung. *RFID in Logistics: A Practical Introduction.* CRC Press, 2007, chapter 3]. Passive low-cost tags are powered by the physical principle of induction, i.e. they need to be placed near the reader's electromagnetic field, which is required for a) power supply of the tag's integrated circuits and b) data communication. In contrast to NFC, Far Field Communication (FFC) refers to communication when the distance between reader and tag exceeds one wavelength. FFC requires typically active RFID tags since they are able to actively modulate data via the radio band using their equipped battery.

Table 4 compares the classification of tag capabilities, as displayed below. Passive tags work only with an external stimulus. They are used due to their low manufacturing costs for nowadays tracking and tracing scenarios.

TABLE 4

| Type | Functionality | Description |
|---|---|---|
| Passive | Induction | No power supply, powered by reader's electromagnetic induction, works only while in the reader's field |
| Semi-active | Induction μC | Battery-powered, e.g. to perform regular sensor measurements, not for transmission |
| Active | Active transmission, μC | Battery-powered to extend transmission range and for regular sensor readings |

Read-write capabilities of RFID tags can be used to further classify tags. Three classes of tags exist accordingly to their read-write capabilities: a) read-only, b) write-once, read-many, and c) write-many, read-many tags.

Table 5 gives a comparison of RFID tags based on read-write capabilities. Read-only tags are nowadays used for tracking and tracing scenarios due to the higher hardware requirements for read-write tags.

TABLE 5

| Type | Description | Example |
|---|---|---|
| Read-only | Programmed once by the tag's manufacturer | Toll systems, e.g. E-ZPass |
| Write-once, Read-many | Programmed once by the product's manufacturer | Tags with EPCs |
| Read-write | Content can be changed at any time | Cash card systems, eg. PUCK |

Read-only tags are a subset of Write-Once Read-Many (WORM) tags, but the tag's manufacturer initializes its content. The first user, e.g. the good's manufacturer, initializes write-once, read-many tags. Write-many, read-many tags are equipped with a small flash storage comparable to external flash devices for personal computers that can be read and written multiple thousand times.

RFID Reader

RFID reader devices consist of a) a set of antennas and b) a controller device. The controller device implements radio interface protocols to communicate with RFID tags via the ether. Antennas are used to send out radio signals to tags and to receipt data.

Object Name Service

The ONS is a yellow page service for RFID-aided supply chains (see Global Standards 1. EPCglobal Object Name Service 1.0.1. www.gs1.org/gsmp/kc/epcglobal/ons/ons_1_0_1-standard-20080529.pdf, 2008). It returns for a given EPC the Unified Resource Locator (URL) of the manufacturer's EPCIS. The inquirer can contact the EPCIS of the manufacturer to obtain further details about the product and subsequent participants that handled a certain good identified by the EPC.

EPC Information Services

The EPCIS provides standardized interfaces between internal event repositories and external inquirers (see EPCIS 1.0.1). In other words, it is responsible for exchanging relevant internal data with external participants of the supply chain, e.g. to perform anti-counterfeiting. The EPCIS is also involved in controlling access to event data and to ensure privacy of internal data. Thus, we consider the EPCIS as possible target of attackers to obtain event data.

EPC Discovery Services

The EPCDS acts as an intermediate for querying parties that preprocesses data from various EPCIS repositories and performs preliminary operations on them, e.g. aggregation of internal event data (see Global Standards 1. Discovery Services Standard (in development). www.gs1.org/gsmp/kc/epcglobal/discovery). When the inference concept for supply chains is applied, the EPCDS is required to reconstruct the virtual path of individual products. Up to now, there is no EPCDS implementation ratified by EPCglobal available since corresponding standards are still in development. However, Müller contributes with an EPCDS built on the in-memory building blocks as defined in section *In-memory Technology Building Blocks* (see Jürgen Müller. *An In-Memory Discovery Service to Retrieve Track & Trace Information in a Unique Identifier Network with Hierarchical Packaging.* PhD thesis, Hasso Plattner Institute, 2012).

Middleware

The RFID middleware acts as a mediator between RFID readers and the capturing interface of the EPCIS repository. It fulfills a set of common tasks within a company to integrate event data in existing business systems, such as ERP systems. Furthermore, it is responsible for filtering and collecting events and harmonization of data format between EPCglobal components (EPCIS 1.0.1).

Security in EPCglobal Networks

The Certificate Profile (CP) is defined by the EPCglobal consortium and specifies security aspects in EPCglobal networks. The first version 1.0 was released in March 2006 and contains the sections "Introduction", "Algorithm Profile", "Certificate Profile", "Certificate Validation Profile", and two appendices, which are described in a total of 11 pages. Latest released version 2.0 of this standard ratified in June 2010 consists of the identical outline in a total of 14 pages (Global Standards 1. EPCglobal Certificate Profile Specification Version 2.0.www.gs1.org/gsmp/kc/epcglobal/cert/cert_2_0-standard-20100610.pdf, June 2010, referred to in the following as EPCglobal, cert. 2.0). In the following, the content of the latest CP is summarized and evaluated.

The CP expects the use of X.509 certificates in context of EPCglobal networks, which requires a global PKI. From our perspective, this is feasible, since the use of PKIs has been proven to work for productive environments, such as device and user authentication 802.11x in communication networks and Germany's electronic identity cards (see for example Bundesamt für Sicherheit in der Informationstechnik. BSI TR-03128 EAC-PKI'n für den elektronischen Personalausweis, V. 1.1. www.bsi.bund.de/ContentBSI/Publikationen/TechnischeRichtlinien/tr03128/index_htm.html, 2010, in the following referred to as BSI TR-03128). The rest of the CP provides recommendations about how to use X.509 certificates for identification purposes.

The section Algorithm Profile contains recommendations for X.509 certificates. As of today, it is recommended to use the following settings:

Algorithm: sha2WithRSAEncryption, i.e. any of the algorithms SHA-224, SHA-256, SHA-384, SHA-512.

Key length: 2,048 bits (3,072 bits by the year 2031).

The section "Certificate Profile" contains mainly a description on how to include an EPC's URI representation within a certificate and how to encode users, services, servers, readers and devices accordingly, e.g. by including their unique serial number and/or device specific Media Access Control (MAC) identifier.

Further details about how to ensure security aspects, such as authentication and how to use it in context of access control are not defined in the CP. Therefore, we evaluated the latest EPCIS standard version 1.0.1 ratified in September 2007 for definitions regarding security (EPCIS 1.0.1). It contains a subsection dealing with authentication and one dealing with authorization. The former contains the hint that the EPCIS Query Control Interface can be used for authentication. In addition, a non-normative explanation is given, indicating that the use of mutual authentication is expected. Concrete implementations or definitions are missing. The section about authorization specifies the following actions as valid:

Refuse a request completely by a generic SecurityException,

Hide data, e.g. the list of business transactions, but remove entire event when hiding data results in misleading data, and Return a subset of requested data only, e.g. only the first hundred matching event when querying all known events, Respond with coarser grained data than requested, e.g. substituting all company-internal locations, such as gate 1, assembly area 2, etc. by a common location for the company, Limit the scope of a query to a certain client, e.g. to provide EPCIS repositories as Software-as-a-Service (SaaS).

The business-level security extensions described in Chap. Business-level Extensions for Event Repositories incorporate the latter three aspects to restrict access of clients to event data. The CP contains further a non-normative explanation stating: "[ . . . ] the EPCIS specification does not take a position as to how authorization decisions are taken (EPCIS 1.0.1)". We value this application as concrete contribution to show how to handle these decisions and how to protect sensitive event data.

The term security services was recently mentioned in the context of EPCglobal standards. However, a concrete definition or a draft is still missing during creation of this document. We consider the results of this work as a major step forward to make security services for EPCglobal networks come true.

Official standards give hints for incorporating security features and expect their usage. However, EPCglobal leaves detailed design decisions, implementation strategies, and concrete implementations are left open to the reader. These standards lack a comprehensive description of threats, attack scenarios, their impact on business processes and possible countermeasures. The transformation of a conventional supply chain towards an RFID-aided supply chain involves various security relevant adaptations, such as open interfaces for accessing EPCIS repositories (EPCIS 1.0.1). Existing work shows various threats, their impact, and countermeasures. The given application contributes in designing, developing, and implementing concrete security extensions for EPCglobal EPCIS repositories. The latter is considered as a possible target of attacks since it is the source of sensitive event data that can be misused by attackers to derive correlated business information (Matthieu-P. Schapranow, Martin Lorenz, Alexander Zeier, and Hasso Plattner. License-based Access Control in EPCglobal Networks. In *Proceedings of 7th European Workshop on Smart Objects: Systems, Technologies and Applications. VDE*, 2011, in the following referred to as Schapranow II).

In-Memory Technology Building Blocks

In the following section, we introduce selected in-memory technology building blocks that are incorporated for the developed security extensions. We refer to in-memory technology as a toolbox of technology artifacts to enable processing of enterprise data in real-time in the main memory. This includes the processing of hundreds of thousands of queries in a multi-user system in sub-second response time. In-memory technology enables decision taking in an interactive way without keeping redundant or pre-aggregated data.

To support analytical and transactional operations, two optimized types of database systems evolved. On the one hand, database systems for transactional workloads store and process data in a row-oriented format, i.e. attributes are stored side by side. On the other hand, database systems optimized for analytical purposes scan selected attributes of huge datasets in a very short time, e.g. by maintaining pre-aggregated totals. If complete data of a single row needs to be accessed, storing data in a row format is advantageous. For example, the comparison of two customers involves all of their database attributes, such as inquirer's name, time, and content need to be loaded. In contrast, columnar stores benefit from their storage format, when only a subset of attributes needs to be processed. For example, summing up the total amount of products passed a certain reader gate involves the attributes date and business location, but the attributes EPC and business step are ignored. Using a row store for this purpose would result in processing of all attributes of the entire event list, although only two of these attributes are required. Therefore, a columnar store benefits from accessing only relevant data.

Insert-only or append-only describes how new data are managed. Traditional database systems support four operations for data manipulations, i.e. insert, select, delete, and update of data. The latter two are considered as destructive operations since original data are no longer available after its execution (Matthieu-P. Schapranow. Transaction Processing 2.0: The Epochal Change in Designing Transaction Processing Systems. Master's thesis, Hasso Plattner Institute, April 2008, referred to in the following as Schapranow III, see sect. 7.1 therein). In other words, it is neither possible to detect nor to reconstruct the complete history of values for a certain attribute after its execution since only the latest value is permanently stored. Insert-only tables enable storing the complete history of value changes and the latest value for a certain attribute (Hasso Plattner and Alexander Zeier. *In-Memory Data Management: An Inflection Point for Enterprise Applications*. Springer, 2011, referred to in the following as Plattner et al.). For instance, this is the foundation of all bookkeeping systems to guarantee transparency. Insert-only builds the basis of storing the entire history of queries for access decisions of HBAC. In addition, insert-only enables tracing of access decisions, e.g. to perform incident analysis.

Compression in context of in-memory technology refers to an isomorphism that defines a storage representation, which consumes less space than the original representation (Plattner et al.). A columnar storage supports the use of lightweight compression techniques, such as run-length encoding, dictionary encoding, and differencing (Per Svensson. The Evolution of Vertical Database Architectures—A Historical Review. In *Proceedings of the 20th International Conference on Scientific and Statistical Database Management*, pages 3-5. Springer-Verlag, 2008). Due to the fixed data type per column, subsequent values are within a given interval, e.g. integer values. In addition, the given data type defines an upper threshold for individual values. Depending on the source of data, the number of concrete values is lower than all possible values from this interval, i.e. the amount of distinct values is required to store all data. This data representation requires only the amount of distinct values to store. For example, all incoming queries are stored in a log database table of the HBAC for analysis. If ten supply chain participants query details for the same product, it results in ten-times the same query. Instead of storing the query redundantly, dictionary compression stores the query once and maps it to a smaller integer representation. Within the database only the query's corresponding integer value is stored and database queries are rewritten to use the integer representation instead. The original representation is replaced just before the result set is returned to the client. As a result, the database executes all operations on compressed data without decompression. In comparison to the uncompressed format, which requires transferring ten-times the complete query string through the memory hierarchy of database server, the compressed data improves cache-hit ratio since more compressed data fits into the cache memory.

We distinguish the partitioning approaches vertical and horizontal partitioning (Sam Lightstone, Toby J. Teorey, and Tom Nadeau. *Physical Database Design: The Database Professional's Guide to Exploiting Indexes, Views, Storage, and more*. Morgan Kaufmann/Elsevier, 2007, referred to as Lightstone et al. in the following). Vertical partitioning refers to rearranging individual database columns. It is achieved by splitting columns of a database table in two or more sets of columns. Each of the sets can be distributed on individual databases servers. This technique can also be used to build up database columns with different ordering to achieve better search performance while guaranteeing high-availability of data (Joseph M. Hellerstein, Michael Stonebraker, and James Hamilton. *Architecture of a Database System, Foundation and Trends in Databases*, volume 1, 2007, Referred to as Hellerstein I in the following). Key to success of vertical partitioning is a thorough understanding of data access patterns. Attributes that are accessed in the same query should rely in the same partition since locating and joining additional columns result in degradation of overall performance.

In contrast, horizontal partitioning addresses long database tables and how to divide them into smaller chunks of data. As a result, each portion of the database table contains a subset of the complete data. Splitting data in equivalent long horizontal partitions is used to support parallel search operations and to improve scalability. For example, a scan of the query history results in a full table scan. With a single partition, a single thread needs to access all individual history entries to check the relevant predicate for selection. When using a naïve round robin horizontal partitioning across ten partitions, the scan of the complete table is performed in parallel by ten threads simultaneously. It reduces the response time by approx. 1/9 compared to the aforementioned single threaded approach. This example shows that the partition length depends on the incorporated partitioning strategy. For example, instead of using round robin, range partitioning can be used, e.g. inquirers are portioned in groups of 1,000 with the help of their user id or requested EPC.

Parallelization can be applied to various locations within the application stack of enterprise systems—from within the application running on an application server to query execution in the database system. As an example of application-level parallelism, we assume the following. Incoming queries need to be processed in parallel by EPCIS repositories to satisfy response time expectations. Processing multiple queries can be handled by multi-threaded applications, i.e. the application does not stall when dealing with more than one query at a time. Operating systems threads are a software abstraction that needs to be mapped to physically available hardware resources. A CPU core is comparable to a single worker on a construction area. If it is possible to map each query to a single core, the system's response time is optimal. Query processing also involves data processing, i.e. the database needs to be queried in parallel, too. If the database is able to distribute the workload across multiple cores a single server works optimal. If the workload exceeds physical capacities of a single system, multiple servers or blades need to be installed for distribution of work to achieve optimal processing behavior. From the database point of view, data partitioning supports parallelization since multiple CPU cores even on multiple servers can process data simultaneously (Joseph M. Hellerstein, Michael Stonebraker, and James Hamilton. *Architecture of a Database System, Foundation and Trends in Databases*, volume 1. now Publishers, 2007, referred to as Hellerstein II in the following, therein Chap. 6). This example shows that multi-core architectures and parallelization depend each other while partitioning is the basis for parallel data processing.

We define two categories of data stores: active and passive. We refer to active data when it is accessed frequently and regular updates are expected, e.g. access rules of HBAC. In contrast, passive data are neither updated nor accessed regularly. They are purely used for analytical and statistical purposes or in exceptional situations where specific investigations require these data. For example, tracking events of a certain pharmaceutical product that was sold five years ago can be considered as passive data. Firstly, from the business' perspective, the pharmaceutical can be consumed until the best-before date of two years after its manufacturing date is reached. When the product is handled now, five years after it's manufacturing, it is no longer allowed to sell it. Secondly, the product was most probably sold to a customer four years ago, i.e. it left the supply chain and is typically already used within its best-before data. Therefore, the probability that details about this pharmaceutical are queried is very low. Nonetheless, the tracking history is conserved and no data is deleted in confor-mance to legal regulations. As a result, the passive data can still be accessed but with a higher latency than active data. For example, passive data can be used for reconstructing the path of a product within the supply chain or for financial long-term forecast. This example gives an understanding about active and passive data. Furthermore, introducing the concept of passive data results in a classification of data stores. Thus, active data that need to be accessed in real-time can be separated from passive data that is ready for archiving.

When data are moved to a passive data store they no longer consume fast accessible main memory. Dealing with passive data stores involves the definition of a memory hierarchy including fast, but expensive, and slow, but cheap memory. A possible storage hierarchy is given by: memory registers, cache memory, main memory, flash storages, solid state disks, SAS hard disk drives, SATA hard disk drives, tapes, etc. To distinguish between active and passive data, rules for migration of data from one store to another needs to be defined. We refer to them as data aging strategy or aging rules. We consider the process of aging, i.e. the migration of data from a fast to a slower store as background task, which is per-formed regularly, e.g. once a month or once a week. Since this process involves reorganization of the entire database, it should be performed only during times of low database access, e.g. during nights or weekends.

In application development, layers refer to levels of abstraction. Each application layer encapsulates specific logic and offers certain functionality. Although abstraction helps to reduce complexity, it also introduces obstacles. Examples for the latter are a) functionality is hidden within a layer and b) each layer offers a variety of functionality while only a small subset is in use. From the data point of view, layers are problematic since data are marshalled and unmarshalled for transformation to the layer-specific format. As a result, identical data are present in various layers and representations. A reduction of layer improves the use of hardware resources. Moving application logic to the data it operates on results in a smaller application stack and also code reduction. Reducing the code length results in improved maintainability. HBAC is implemented as a single layer application in Python and interacts directly with the in-memory database. As a result, processing overhead due to multiple layers is already addressed by its design.

Combination and Classification of Related Work

The wish of data protection in information systems is as old as the existence of any kind of data. Historically spoken, while the development of first computer systems started in World War II, such as ENIAC, the aspect of data protection arose. For instance, with the invention of radar systems airplane attacks could be detected by sending out a radio signal and observing its reflections. Identification Friend or Foe (IFF) systems were developed to distinguish unknown aircrafts from each other. Friendly aircrafts were equipped with an IFF system that sent out a special signal in response to a detected radar signal. Let us consider IFF systems as information systems since typical attacks for information system also apply for them. After introducing IFF systems, they were copied and security extensions, such as on-device encryption, were added to secure their operation.

Lampson defines "[ . . . ] all the mechanisms that control the access of a program to other things in the system" as protection (see Butler W. Lampson. Protection. In *Proceedings of 5th Princeton Conference on Information Sciences and Systems*, pages 437-443, 1971, referred to as Lampson in the following). This general definition contains the first indication of nowadays more popular term access control. In his application, the primarily goal of adding protection to information systems is named as protecting user's from their own or other user's malice. In context of this work, this is still valid, since the goal is to protect supply chain participants from malicious behavior—whether intended or unintended—of other supply chain participants, technical errors of other automatic information systems, competitors, counterfeiters, or any kind of attackers. In addition, Lampson discusses concepts of access control matrices as a strategy for protection. This concept is also incorporated by the given work. He names possible issues that reside in former hardware limitations of the year 1971. For instance, the complete access control matrix can grow fast depending on the amount of users and objects. Keeping it entirely in fast accessible main memory is considered as a waste of resources since its capacity is limited and only single entries of the access control matrix need to be accessed at a certain moment (see Lampson).

In this application, we consider these hardware limitations as no longer valid. We keep the entire access control matrix in a compressed format in fast access main memory by incorporating in-memory technology as discussed in the corresponding section above.

The historical examples show a common empiric paradigm that is still valid for modern information systems: aspects of data protection are rarely considered during the design phase. More often, data protection is investigated once a product is ready to sell and a critical number of users are running the system. After this critical mass has been reached, the product becomes a more attractive target for attackers. In context of EPCglobal networks, the EC recognized this gap for RFID systems and released a recommendation on the implementation of privacy and data protection principles in applications supported by radio-frequency identification in 2009. It contains the explicit advice to overcome the gap of security by recommending that "[ . . . ] privacy and information security features should be built into RFID applications before their widespread use (principle of 'security and privacy-by-design')" (see European Commission. Recommendation on Privacy and Data Protection in Applications Supported by Radio-frequency Identification. hxxp://ec.europa.eu/information_society/policy/rfid/documents/recommendationonrfid2009.pdf, May 2009). In addition, it contains a list of guidelines and principles that should be considered while implementing RFID information systems to raise its acceptance.

From the risk assessment's point of view, classifications of security risks are helpful to identify threats, assess them, evaluate its monetary impact, and to design and implement countermeasures. Garfinkel et al. classify security risks accordingly to the location where they occur in one of the following classes (Simson L. Garfinkel, An Juels, and Ravi Pappu. RFID Privacy: An Overview of Problems and Proposed Solutions. *IEEE Security and Privacy*, 3:34-43, 2005):

Inside the Supply Chain: Locations and transportation systems con-trolled by supply chain participants, Outside the Supply Chain: Locations after the product left the control of supply chain partners and is operated by the customer, and In the Transition Zone: Locations when products are leaving from inside to outside the supply chain, e.g. when the product is handed to the customer.

The present application primarily addresses the security of event repositories and the involved data exchange. Thus, we address threats that belong to the categories inside the supply chain and within the transition zone.

Spiekermann performed neutral studies on the acceptance of RFID technology and Privacy Enhancing Technologies (PETs) in retail businesses. In her work, she comes to the result that "[ . . . ] consumers do value the service spectrum, which can be realized through RFID [but] they are willing to forgo these benefits in order to protect their privacy" (see Sarah Spiekermann. Privacy Enhancing Technologies for RFID in Retail—An Empirical Investigation. In *Proceedings of the 9th International Conference on Ubiquitous Computing*, pages 56-72, Berlin, Heidelberg, 2007. Springer-Verlag). As a result, we stress the fact that improving security by using transparent privacy protection mechanisms is mandatory to increase acceptance for RFID-aided supply chains.

In 2006, the National Institute of Standards and Technology (NIST) published a technical report assessing access control systems. It observes that a wide range of access control systems is based on XML-based policy languages, but all of them lack the capability to express historical-based policies (Hu et al., Sect. 3.6.3). In context of EPCglobal networks the temporal and history aspect becomes more important since goods are moving from party to party and access rights need to be modified multiple times during the lifecycle of a certain product. During research of related work for EPCglobal networks, we observed only a small amount of related works dealing with temporal access control from Hu et al, (see for example Hu et al.). This motivated me to focus on processing of the query history to contribute with an HBAC system based in-memory data processing in the given application.

In the following, we classify related work correspondingly to the categories:

a) related work dealing with access control management systems and b) RFID-specific related work.

FIG. 5 depicts components of an RFID information system that might be addressed by RFID-specific work: The components of Infrastructure components of RFID-enabled companies are depicted as FMC block diagram. Company-internal and -external systems exchange event data through standardized interfaces of EPCIS as defined by EPCglobal.

TABLE 6

| Component | Location | Category | Type |
|---|---|---|---|
| EPCIS Repository | Company/SaaS Provider | E/I | SW |
| RFID Middleware | Company | I | SW |
| RFID Reader | Company, Freight Gates, Stock, | I | HW |
| RFID Tag | Good | E | HW |
| Service Provider | SaaS Provider | E | SW |
| Discovery Service | SaaS Provider | E | SW |

Table 6 categorizes these components correspondingly to their physical location within the supply chain and their technology affinity. Table 6 classifies components as E=External, HW=Hardware, I=Internal, SW=Software.

Table 6 further shows that RFID tags and readers are systems embedded in hardware to perform frequent actions in a very fast response time. In contrast, the remaining components are software system components of the enterprise software architecture. As a result, different requirements for interoperability and standardization exist for both categories. The classification in internal and external components is the basis to identify security threats. Company internal components can be controlled by enterprise-wide security policies that are enforced by regular trainings or tests of personnel. In contrast, external components cannot be controlled by company policies. Therefore, external components should be considered as uncontrollable components in terms of security that might be the foundation of further threats as discussed by Schapranow (Matthieu-P. Schapranow, Jürgen Müller, Alexander Zeier, and Hasso Plattner. Security Aspects in Vulnerable RFID-Aided Supply Chains. In *Proceedings of 5th European Workshop on RFID Systems and Technologies*. VDE, 2009, referred to in the following as Schapranow III). Two thirds of the components given in Table 6 are software, whereas we categorized the EPCIS repository as internal and external component equally. In this work, we focus on how to secure internal and external components, i.e. passive RFID tags and EPCIS repositories. The need for focusing on software components arises from the evaluation of components and categories addressed by related work.

FIG. 6 gives a comparison of related work depicting year of publication (2005-2009) vs. addressed component and amount of relevant publications. Left: publications addressing security of components tags, readers, and their communication dominate. Right: Work addressing security of software systems, such as EPCIS repositories, middleware, and ONS, dominate. Work addressing the security of EPCDS is not present.

FIG. 6 visualizes the results of our analysis of related work. It depicts the year of publication in relation to the addressed RFID component and quantity of publications. Starting in 2005, it shows that related work dealing with security focuses on the air interface between readers and tags. Due to the limited security capabilities of low-cost tags and uncontrollable vulnerable environments the tag's content can be obtained with various well-researched techniques. Moreover, FIG. 6 highlights two further characteristics of related work: a) research activities concerning security of enterprise components started after device-level security was researched and b) work dealing with security aspects of enterprise components of EPCglobal networks rarely exist in comparison of work addressing the air interface, tags, or reader hardware. Although switching to EPCglobal networks involves new hardware components, e.g. RFID readers for RFID technology or barcode scanner when incorporating visual identification techniques, there are also various software components required. Tab. 6 classifies components of RFID-aided supply chains accordingly to the categories location within the supply chain, its access type, and whether it is a hard- or software component. It highlights that the amount of involved enterprise software components, such as EPCIS repository, EPCDS, ONS, etc., is twice the amount of involved hardware components. The majority of involved enterprise software components motivate our research activities on business-level security in the rest of this application.

A similar trend can also be observed for industrial implementation projects, e.g. for product authenticity. For example, the pharmaceutical manufacturer Pfizer started a pilot project to use RFID technology for tracking pharmaceuticals in 2006, but it was not rolled out company-wide, until today (U.S. Pharmaceuticals Pfizer Inc. Anti-Counterfeit Drug Initiative Workshop and Vendor Display. www.fda.gov/OHRMS/DOCKETS/dockets/05n0510/05N-0510-EC21-Attach-1.pdf, 2006). The Metro Future Store initiative aims to improve supply chain management in the last step of supply chain: in retail stores, but most of the examples lack concrete productive implementation (METRO Group. METRO Group and RFID. www.future-store.org/fsi-internet/get/documents/FSI/multimedia/pdfs/broschueren/RFID24, 20111, 2008.).

Public discussions about the reasons for stopping these projects are not available. However, concerns about data security and privacy are considered as possible reasons (see Spiekermann). Initiatives, such as FoeBuD e.V. in Germany, fight for a strictly use of RFID tags in industries, e.g. in retail stores (FoeBuD e.V. Die StopRFID-Seiten des FoeBuD e.V. www.foebud.org/rfid/index_html, January 2012). FIG. 6 depicts that these privacy concerns are addressed by related work for securing RFID-specific enterprise systems starting in 2007. This application contributes by providing security extensions for RFID-specific enterprise software components to increase the acceptance and the future usage of EPCglobal networks.

The present application combines access control mechanisms, EPCglobal networks, and RFID technology as individual fields of research. We analyzed existing related work with respect to each of the research fields focusing on data security and applicability to the given pharmaceutical scenario.

Abadi and Fournet discuss the dynamic assignment of access rights for programs during their execution and refer to it as HBAC (Martin Abadi and Cedric Fournet. Access Control based on Execution History. In Proceedings of the 10th Annual Network and Distributed System Security Symposium, pages 107-121, 2003). Edjlali et al. proposed years ago that HBAC "[ . . . ] has the potential to significantly expand the set of programs that can be executed without compromising security [ . . . ]" (Guy Edjlali, Anurag Acharya, and Vipin Chaudhary. History-based access control for mobile code. In Proceedings of 5th Conference on Computer and Communications Security, pages 38-48, 1998). The NIST observed that concrete HBAC implementations are limited, e.g. in terms of real-time analysis of the history (Hu et al.).

Based on the given components, related work dealing with RFID-specific data security and privacy may be classified. A comparison shows with respect to latest access control approaches a common usage of XML-based approaches for specification of access rights; primarily XACML, which is discussed in the following. Furthermore, there is a two-divided implementation approach for data security in RFID technology. For securing the communication between tag and reader fast hardware-based implementation are incorporated. However, the majority of related work dealing with EPCglobal components proposes software solutions, e.g. when focusing on the aspects authentication or access control. Only a small portion of related work actively makes use of encryption when exchanging data. We assume that most contributions do not consider data security in EPCglobal networks so far due to the missing standardization of the EPCglobal consortium.

SUMMARY OF INVENTION

The present invention relates according to a first aspect to a method of granting access to a repository storing data and in a further aspect to a system for controlling access of one or more inquirers to a repository storing data, and in a third aspect to a communication protocol between a client and a server connected via a link to a repository. The aspects of the invention provide unprecedented levels of granularity in access rights, while the management of access rights is kept separate from the actual repository which helps to implement the aspects of the invention as a transparent extension to methods and/or systems for granting access to existing repositories. The aspects of the invention may be used in a supply chain, a product tracking system or a medical care environment or a power grid, as non-limiting examples.

The term data shall be understood in the following as any data pertaining to an object or a state of an object. An object may be any physical object, such as a product, a traceable product or information pertaining to a subject, such as a physical object or a person. The repository could for example hold as data meter readings for one or more households in a power grid. Alternatively the repository could hold personal data about patients comprising a treatment and/or a diagnosis for an individual patient. The repository may further hold any type of data that should be protected. The given example types (smart meter data, EPCs, or patient data) are non-limiting examples.

In a preferred embodiment the data is event data. The term event data shall be understood as data documenting what happened to an object, for example a product, such as documenting its manufacture and/or its whereabouts, any maintenance operations. Alternatively in case of event data pertaining to patients, treatments received by and/or diagnosis for an individual patient may be considered as event data, too. For a repository storing event data for a power grid, meter readings for an individual or several households could be considered as event data.

Event data may comprise unique identifiers, event time, record time, an action and/or a read point. In case of a medical patient the unique identifiers could be the patient's id and/or an insurance number of the patient without limitation. In case of event data pertaining to a supply chain, for example a pharmaceutical supply chain, the unique product identifiers may pertain to a list of unique identifiers of products the event is associated with, such as the individual Electronic Product Code (EPC). Event time in the above example could be a timestamp indicating when the event occurred. The record time instead is a timestamp indicating when the event was recorded. Action indicates with respect to the lifecycle of the EPC the action that was involved, when the event occurred. Such actions may be without limitation: ADD, OBSERVE, or DELETE. The Read point identifies a location where the event occurred.

In a preferred embodiment the data or event data may pertain to traceable products. Traceable products can be tracked over their product lifecycle. Such products could be pharmaceuticals without any limitation. The traceable products may carry means allowing identifying them. Such means could be RFID chips, holograms, bar codes, and the like without any limitation. Alternatively or additionally any item that is traceable may be considered a traceable product; be it during manufacture or throughout the use and/or lifespan of the product, for example pharmaceuticals as mentioned before, a car or a critical part of an engine, such as a rotor blade of a helicopter.

An inquirer may be any entity having an interest in events related to a traceable product. Such an entity could be someone within a supply chain of the product or someone trying to prove authenticity of the product.

The term link between the access control server and the repository may be any suitable link, such as internet or intranet. It is to be understood that the entity controlling the access control server and/or the repository is able to implement a secure way of communication between the access control server and the repository.

The term network shall be understood as a network adapted to transport data between connected entities. The network may be provided by the internet. It is to be understood, that the entity controlling the access control server and/or the repository is typically not able to control the network such that it may be difficult to implement a secure way of communication between the access control server and an access control client used by an inquirer, when the inquirer is unknown to the access control server.

According to a preferred embodiment of the method for granting access to a repository, there may be an access control server connected to the repository via a link and the repository may store data. The method for granting access to the repository may be used in a supply chain, a product tracking system, a medical care environment, or a power grid. The repository may store data, preferably sensitive business data pertaining to one or more supply chains, event data pertaining to one or more traceable products, medical data pertaining to one or more patients, or measurement data pertaining to one or more measurements. The access control server may perform a step of receiving from an individual one of a plurality of inquirers a query regarding a set of data. The access control server may further perform a step of transmitting an encrypted result set to the individual inquirer. The access control server may receive a request for permission to view the result set. The access control server may further perform a step of generating a permission.

In a preferred embodiment of the method the step of generating the permission may comprise adding the query to a database holding a history of queries submitted by the inquirers. The method may further comprise a step of comparing the database holding the history of queries to a set of rules defining content of the repository to be protected.

In a preferred embodiment the step of generating the permission further comprises an evaluating of a set of roles the inquirer and/or the access control client is assigned to. The step of generating the permission may or additionally comprise adding the query submitted by the individual inquirer to a history of queries and comparing the history of queries with a set of rules defining content of the repository to be protected.

It is to be understood that the granting of the permission based on the history of queries submitted by the individual and/or all inquirers provides a finer granularity of access permissions for the embodiments of the invention. In repositories with a large number of queries, an owner of the repository may overlook, if an individual inquirer could reconstruct sensitive data when combining result sets from several of his previous queries. Each individual query result may have been inline with a role of the inquirer or specific access rules defined for the inquirer, as known today; but in combination it may be possible to reconstruct confidential information. The same holds for an individual inquirer handling a large number of access clients querying the repository. To prevent disclosure of confidential information the invention suggests to use a history to analyze recent, preferably all queries of an individual inquirer and to define rules describing data sets considered confidential in order to prevent them from being disclosed. If the query history including the present query, i.e. the combination of all queries by the individual inquirer, matched one of the rules, relevant data portions are filtered.

The grant of permission based on the history of queries is further of advantage if the method or the system according to the invention got compromised, for example an individual access control client got compromised. Compromised shall be understood in that the access control client and/or the inquirer controlling the access control client are no longer trustworthy; for example due to a party pretending to be part of a pharmaceutical supply chain when they actually are not. If parts of the inventive system or some of the inventive method steps get compromised this may lead to a data leak, i.e. a disclosure of data to a party that would normally not be qualified to see such data. The database storing the history of queries submitted by multiple inquirers, preferably all inquirers, makes it possible to clearly assess, which queries were actually submitted during a time span when parts of the inventive system or individual ones of the inventive method steps were compromised. In consequence, an entity controlling the access control server can be established, which data sets were disclosed, in particular during the data leak. Such an assessment is not possible with repositories according to the state of the art.

In a preferred embodiment of the method the step of receiving the query comprises receiving the query from an access control client. The access control client may be connected to the access control server over a network. The query may be submitted by the individual inquirer.

In a preferred embodiment the method step of transmitting the encrypted result set may further comprise a step of generating a preferably symmetrical key. It is of advantage, if the symmetrical key is unknown to the access control client. In a further step of encrypting the result set, the symmetrical key may be used for encrypting the result set.

The transmitting of the encrypted result set to the access control client is of advantage in order to protect the result set from being viewed by the inquirer before the requested permission is granted. The enforcement of access rights is performed at the latest possible point in time, i.e. before the result is presented to the inquirer. This is possible as obtaining response data and the imposing of access rights are kept separate according to the aspects of the invention. This separation is of advantage when implementing the present invention as an extension to an existing repository without the repository itself requiring changes, for example relating to any rules pertaining to access rights thereto. Any actions pertaining to access rights to the result set are handled by the access control server and the access control client. Likewise the step of generating the permission does not impose additional workload on the repository.

It is further of advantage to generate and use the symmetrical key for encrypting the result set. As the result set is of variable length depending on the query, use of the symmetrical key for its encryption will be faster than using asynchronous decryption schemes. It is further of interest to alter the symmetrical keys used for encryption of the result set on a regular basis. This could be done for example, on an hourly basis. Should one of these keys get compromised, they get replaced by a new one, so the compromised key will no longer be valid for encryption and/or decryption. It is of advantage to use symmetrical keys which are unknown to the access control client when being generated at the access control server. This way the encrypted result set using the preferably symmetrical key may be delivered to the access control client and remains protected until the access control client receives the preferably symmetrical key.

According to a preferred embodiment the step of generating the permission may comprise a step of consulting a trust server and/or a step of receiving a trust score from the trust server. This may be of interest when dealing with a new inquirer being unknown to the owner of the repository, i.e. the access control server. The trust server typically holds information on how far other entities trust the new inquirer. This level of trust may be established based on previous contacts and/or interactions other entities had with the new inquirer. The trust server may return a trust score for the new inquirer to the access control server, so that the access control server may in return use this trust level in the process of generating an initial permission set for the new inquirer.

According to a preferred embodiment of the method may comprise a step of forwarding the symmetrical key and the permission to the access control client. The step of generating the permission may further comprise a decrypting of the encrypted result set using the symmetrical key. The generating of the permission may be in response to the access control client requesting this permission. This is to say that the access control client having received the encrypted result set is not able to decrypt the result set, before receiving the symmetrical key that is being forwarded together with the permission. Thereby the event data communication is separated from the communication pertaining to the permission to view the result set at the access control client.

According to a preferred embodiment the method may comprise a step of decrypting the encrypted result set using the preferably symmetrical key. The access control client may perform the decrypting step.

According to a preferred embodiment the method may comprise a step of filtering the result set according to the permission. In the preferred embodiment the access control client performs the filtering step. The filtering step may comprise removing and/or replacing of selected content from the result set. The selected content may be such content of the result set in conflict with the set of rules defining content of the repository to be protected. The removing and/or replacing may maintain an integrity of the result set. This is to say that after the removing and/or replacing a valid result set is achieved and the response set remains formally correct or consistent. This is of advantage in order to perform the filtering in a transparent way without the inquirer and/or the access control client requiring special adjustments, such as a recompilation of the client software (not the access control client).

The step of filtering the result set according to the permission is of advantage for the embodiments of the present invention, as a finer granularity of access permissions is obtained. According to the invention granting of access rights is not a mere decision between yes and no but several grades in between. One can precisely define which portions of the result set shall be visible to the inquirer. Furthermore the filtering step according to the invention prevents an unintended disclosure of sensitive data to parties not qualified to see them, like for example competitors. This maintains reliable protection of those data sets considered worth protecting by an owner of the repository.

The step of filtering the result set may further comprise evaluating rules defining a prohibition prior to an evaluation of rules defining a permission. Such a form of evaluation is also referred to as white listing. This is of interest in order to explicitly grant permission for an inquirer needing a result set for his task at hand, even if the history of queries by this inquirer would prevent this inquirer from seeing the requested result set.

According to a preferred embodiment the method may further comprise a step of presenting the filtered result set. The presenting step is in the preferred embodiment performed by the access control client. The step of presenting the filtered result set to the inquirer is of advantage as a format of the result set is maintained as expected by the inquirer. Suppose the inquirer expects a valid SOAP message as result set. The filtered result set presented to the inquirer is a valid SOAP message, wherein sensitive data that should not be disclosed to the inquirer have been removed or replaced by default values, yet maintaining the integrity of the result set. Therefore the inquirer may not even realize that he is being presented the filtered result set. This is to say, the filtering is transparent to the inquirer.

According to another preferred embodiment the comparing step may comprise comparing multiple queries submitted by the individual inquirer to the set of rules defining content of the repository to be protected. In a further preferred embodiment all queries submitted by the individual inquirer are compared to the set of rules defining content of the repository to be protected.

In yet another preferred embodiment the database holding the history of queries is implemented using an in-memory technology. This is of advantage because the analysis of the history of queries submitted by the individual inquirer can be achieved during an acceptably short time span using in-memory technology.

In another preferred embodiment the step of generating the permission may comprise an evaluation of a set of roles the individual inquirer is assigned to. Alternatively or additionally the step of generating the permission may comprise evaluating a set of rules the individual inquirer is assigned to.

In another preferred embodiment of the method may further comprise a step of requesting a result set from the repository and a step of receiving a result set from the repository corresponding to the query.

According to another preferred embodiment the method may comprise a step of securing communication between the access control client and the access control server. It is to be understood that the access control server may be in communication with a plurality of access control clients. Alternatively or additionally any communication may be secured between the access control server and the access control client used by the individual inquirer. This securing may further be applied to any access control client.

It is of advantage for the securing step according to the embodiments of the invention, to use an asymmetric encryption scheme as typically the access control server and the access control clients are remote and the network, such as the internet is between them and needs to be bridged in a safe manner, so that third parties may not intercept any clear text queries or result sets.

Alternatively or additionally the securing may comprise implementing a public key infrastructure (PKI). Should any of the access control clients become compromised, their certificate may be declared invalid in order to prevent any further data leakage or data being compromised.

According to a further aspect the invention relates to a system for controlling access of one or more inquirers to a repository comprising data. The system may be used in a product tracking system, in a supply chain, a medical care environment or a power grid. The repository may store data, preferably sensitive business data pertaining to one or more supply chains, event data pertaining to one or more traceable products, medical data pertaining to one or more patients, or measurement data pertaining to one or more measurements. The access control server may be connected to the repository via a link and adapted to receive from an access control client a query submitted by an individual inquirer of a plurality of inquirers regarding a set of data. The access control server may further be adapted to request and receive a result set from the repository corresponding to the query. The access control server may further be adapted to transmit an encrypted result set to the access control client. The access control server may further be adapted to receive a request for permission to view the result set from the access control client. The access control client may further be adapted to generate a permission in response to the request for permission.

In a preferred embodiment of the system the access control server may be adapted to add the query to a database holding a history of queries submitted by the inquirers. The access control server may be further adapted to generate the permission based on a comparison of the history of queries to a set of rules defining content of the repository to be protected.

In another preferred embodiment of the system, the access control server may be further adapted to generate the permission based on a comparison of multiple queries submitted by the individual inquirer, preferably all, inquirers to a set of rules defining content of the repository to be protected. This consideration of history of queries is of advantage in order to provide a finer granularity of access permissions than available for repositories today. The system may further be used to extend an existing repository in order to transparently provide the finer granularity of access rights based on a history of queries. The system of the invention further helps to prevent disclosure of confidential data due to a series of queries submitted by the inquirer.

It is to be understood that obtaining the response set of data and the imposing of access rights are kept separate from each other according to the system of the invention. This is of advantage when implementing the present invention as an extension to an existing repository without the repository itself requiring changes. Such changes could for example relate to any rules pertaining to access rights or components of the system requiring a recompilation. Any actions pertaining to access rights to the result set are handled by the access control server and the access control client. Likewise the generation of the permission does not impose additional workload on the repository.

In a further preferred embodiment of the system, the access control server is adapted to consult a trust server and further adapted to receive a trust score for the individual inquirer from the trust server. Alternatively or additionally the access control server is adapted to generate a preferably symmetrical key and to encrypt the response set using the key.

In yet another preferred embodiment of the system the access control client is connectable to the access control server via a network, and the access control client is adapted to forward queries from the individual inquirer to the access control server, and adapted to receive the encrypted result set and the permission from the access control server.

In a preferred embodiment of the system the access control server is adapted to generate the permission based on a set of rules the individual inquirer is assigned to. Alternatively or additionally the access control server may also be adapted to grant the permission based on a set of roles the individual inquirer is assigned to.

In a preferred embodiment of the system the access control client is adapted to decrypt the encrypted result set using the preferably symmetrical key.

In a yet further preferred embodiment of the system, the access control client is adapted to filter the result set according to the permission by removing and/or replacing content from the result set in conflict with the set of rules defining content of the repository to be protected, while maintaining an integrity of the result set.

In yet another preferred embodiment of the system the access control client is connectable to the access control server via a network. The access control client may further be adapted to forward queries from the individual inquirer to the access control server and further adapted to receive the encrypted result set and the permission from the access control server.

In a preferred embodiment of the system, the access control client is further adapted to present the filtered result set to the individual inquirer. It is to be understood that presenting to the individual inquirer may mean presenting to an inquirer application. This is to say that the inquirer may be a software artifact requesting data from the repository.

In yet another preferred embodiment of the system, the system comprises means for securing communication between the access control server and the access control client.

In another preferred embodiment the database holding the history of queries is a database according to the in-memory technology.

According to a third aspect the invention pertains to a communication protocol between a client and a server connected via a link to a repository for use in a supply chain, a product tracking system, a medical care environment or a power grid. The repository may store data, preferably sensitive business data pertaining to one or more supply chains, event data pertaining to one or more traceable products, medical data pertaining to one or more patients, or measurement data pertaining to one or more measurements. The communication protocol may comprise a step of receiving at the server a query from the client regarding a set of data from the repository. The communication protocol may further comprise a step of transmitting an encrypted result set from the server to the client. The result set may correspond to the query. The communication protocol may further comprise a step of receiving at the server a request for permission to view the result set from the client, and further a step of forwarding a key for decrypting the encrypted result set and a permission to view the result set from the server to the client.

In a preferred embodiment of the communication protocol, the client may be an access control client. Alternatively or additionally, the server may be an access control server.

In another preferred embodiment of the communication protocol the key may be used for encrypting the result set, the key preferably being a symmetrical key.

According to yet another preferred embodiment of the communication protocol it may comprise steps of securing communication between the client and the server.

It is to be understood that the invention was described pertaining to a method for granting access and pertaining to a system of granting access. Advantageous effects identified for the method for granting access according to the invention are likewise valid for the system for controlling access according to the invention. Consequently advantages explained in combination with method steps according to the method of the invention, will be reflected in advantages of corresponding system features.

The invention shall be explained next based on the following drawings.

Figure 7:
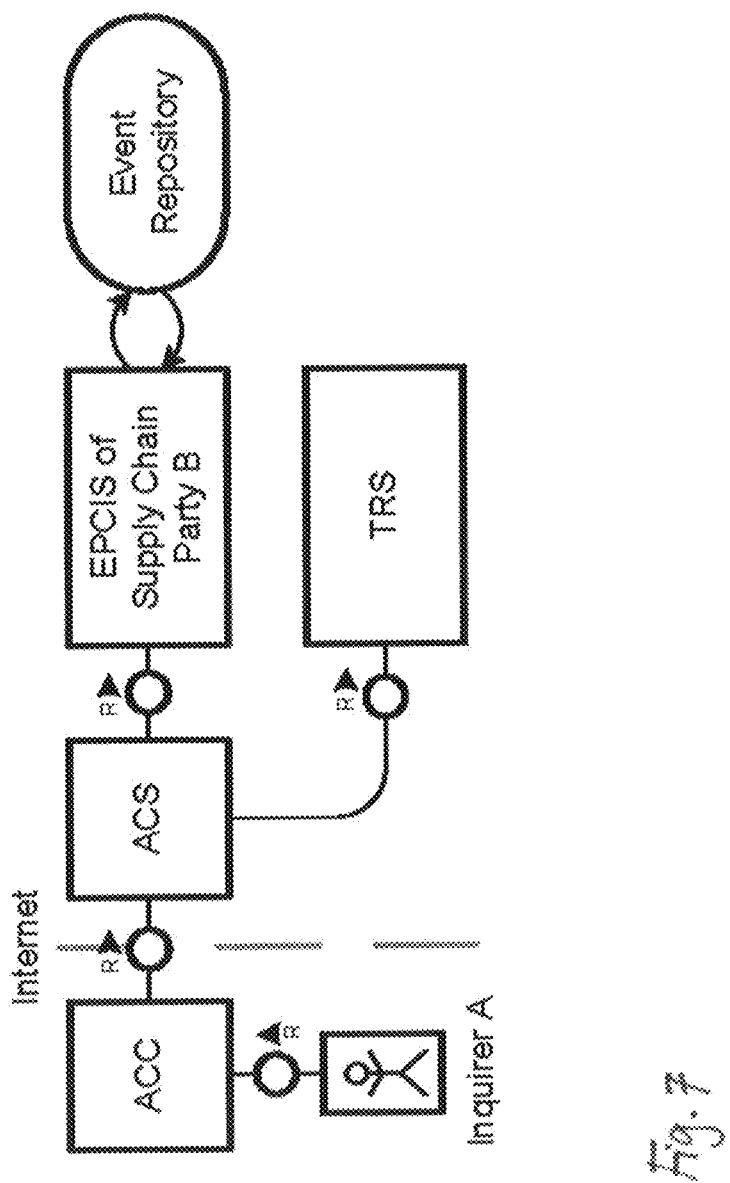
Figure 8:
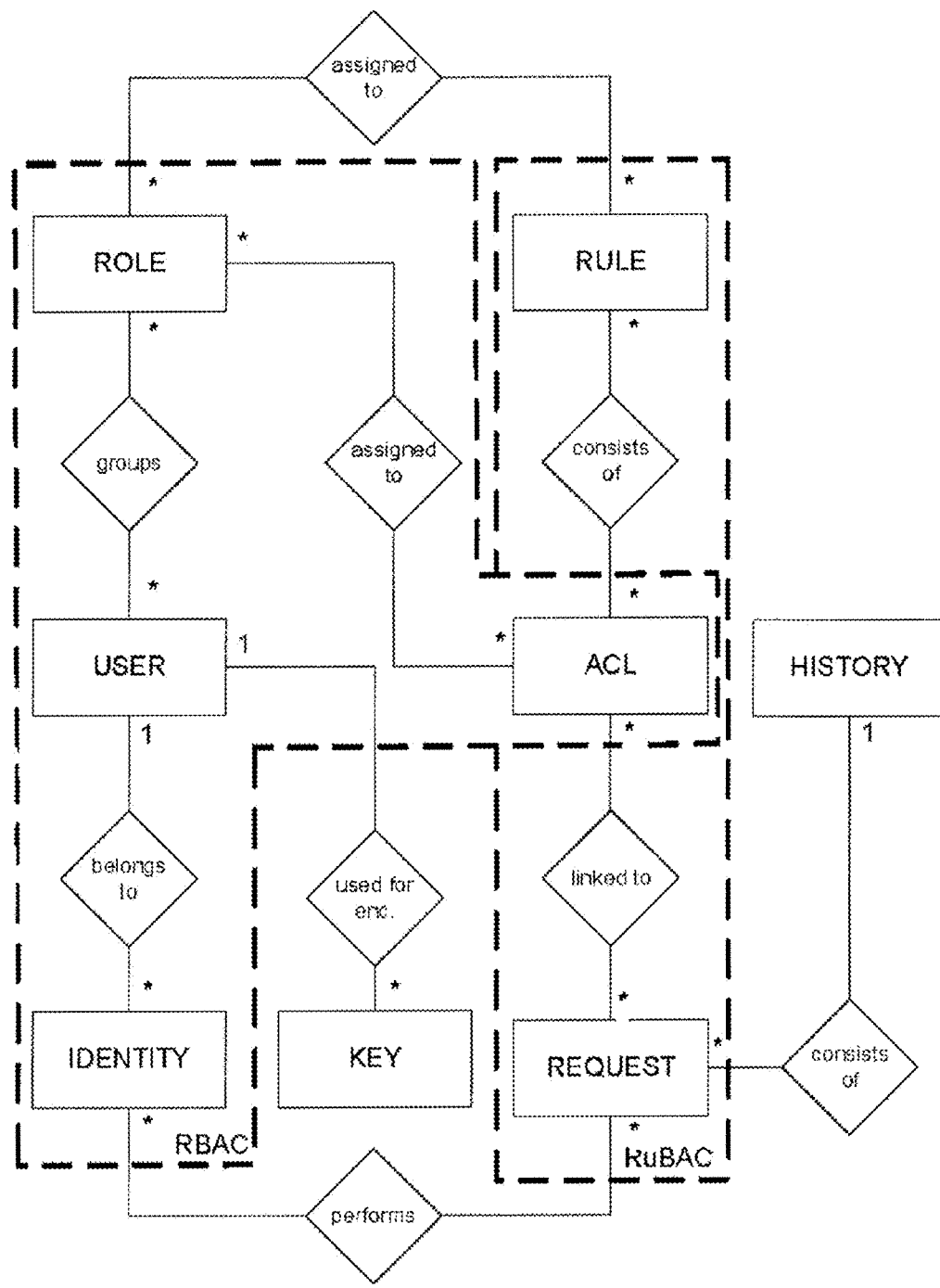
Figure 9:
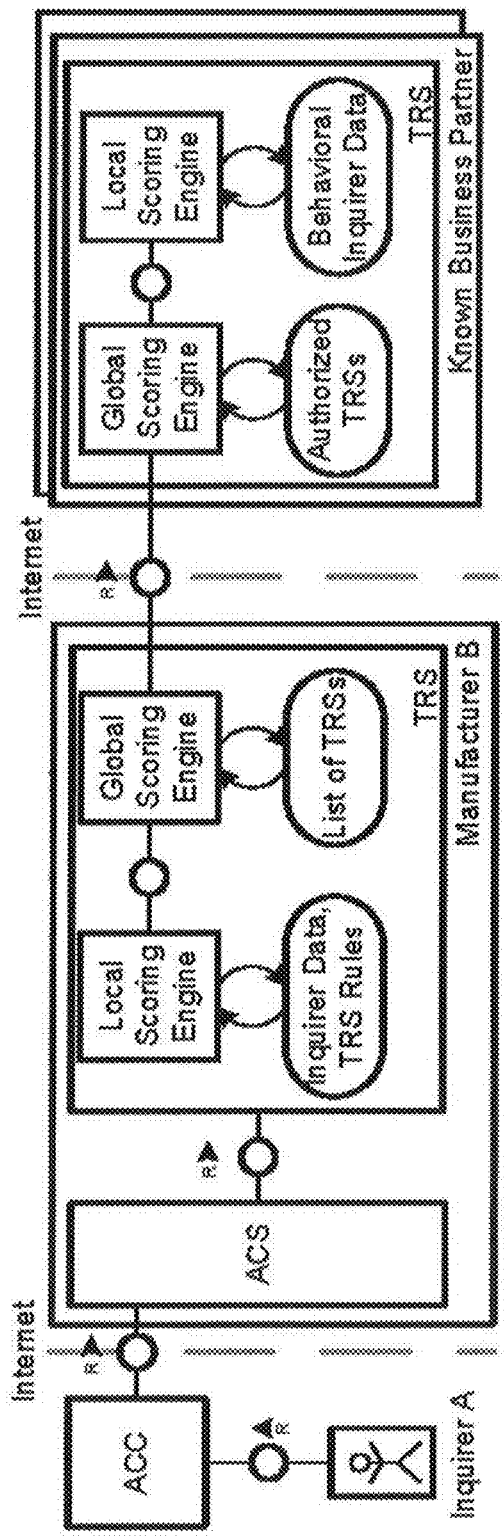
Figure 10:
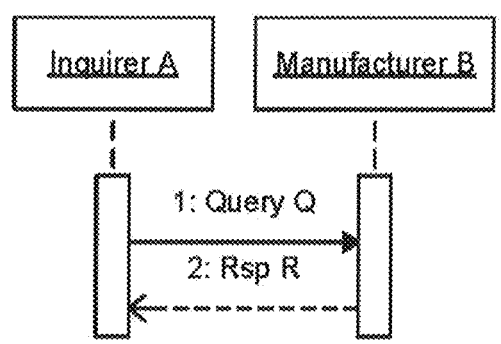
Figure 11:
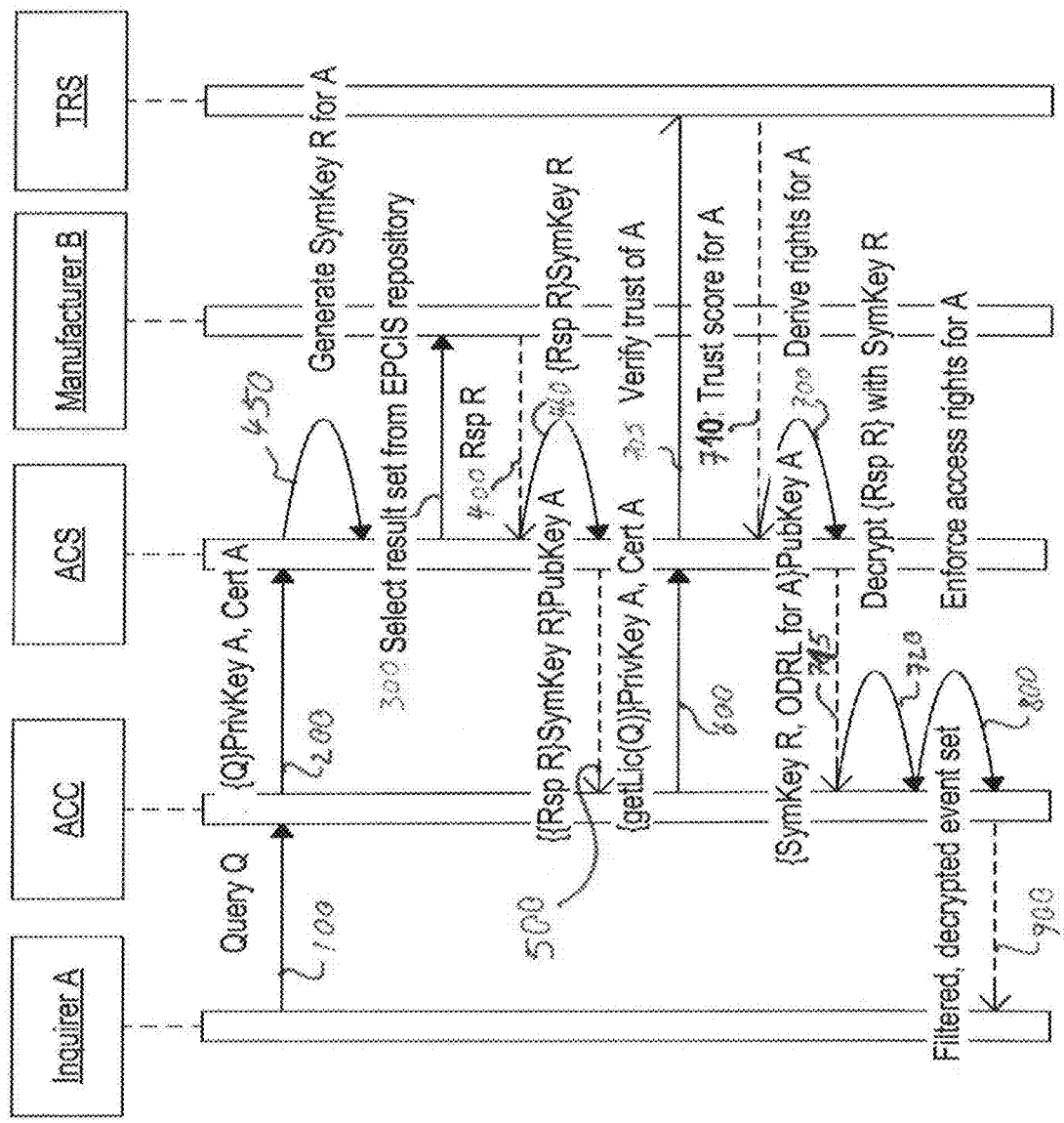
Figure 12:
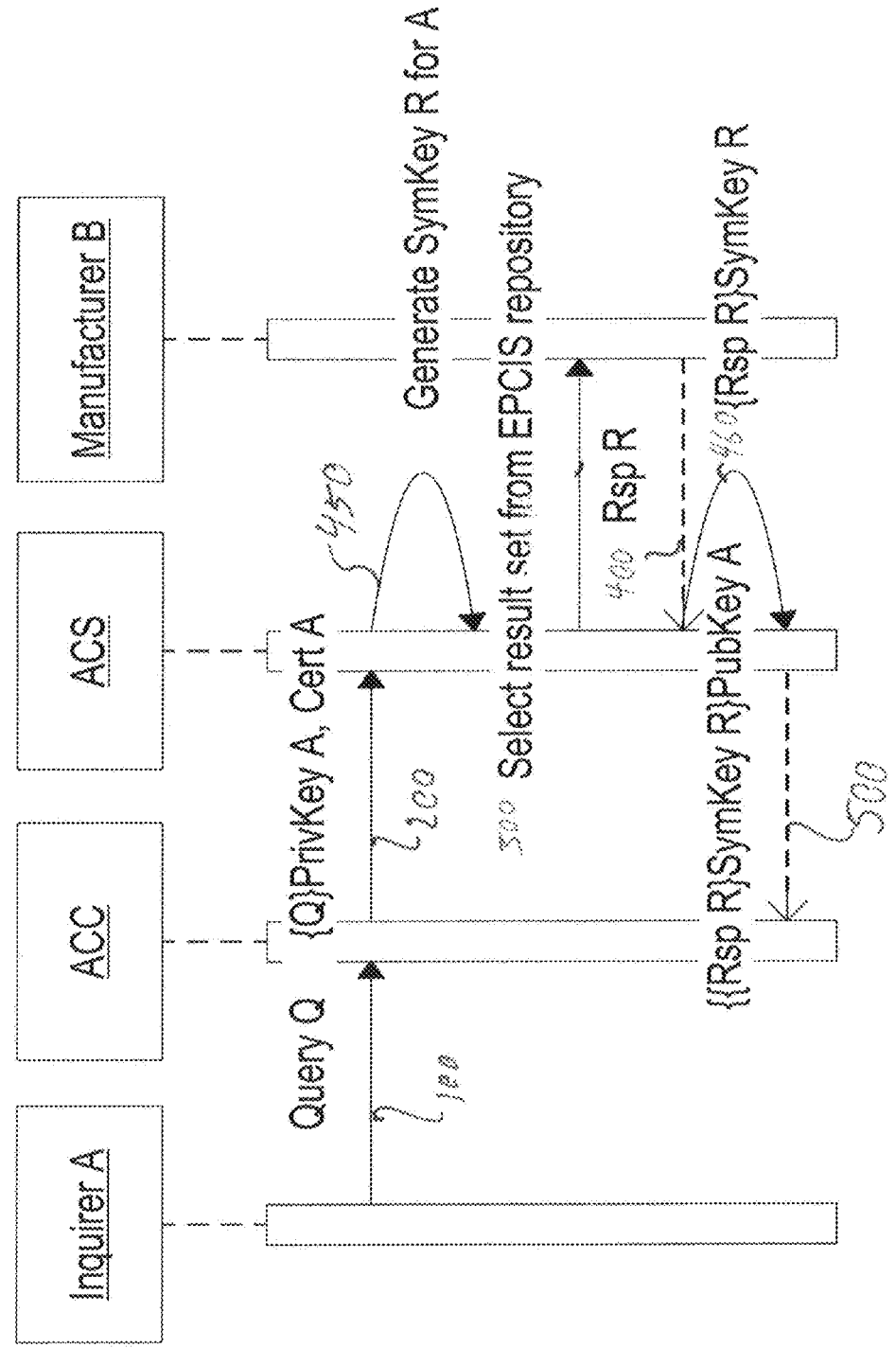
Figure 13:
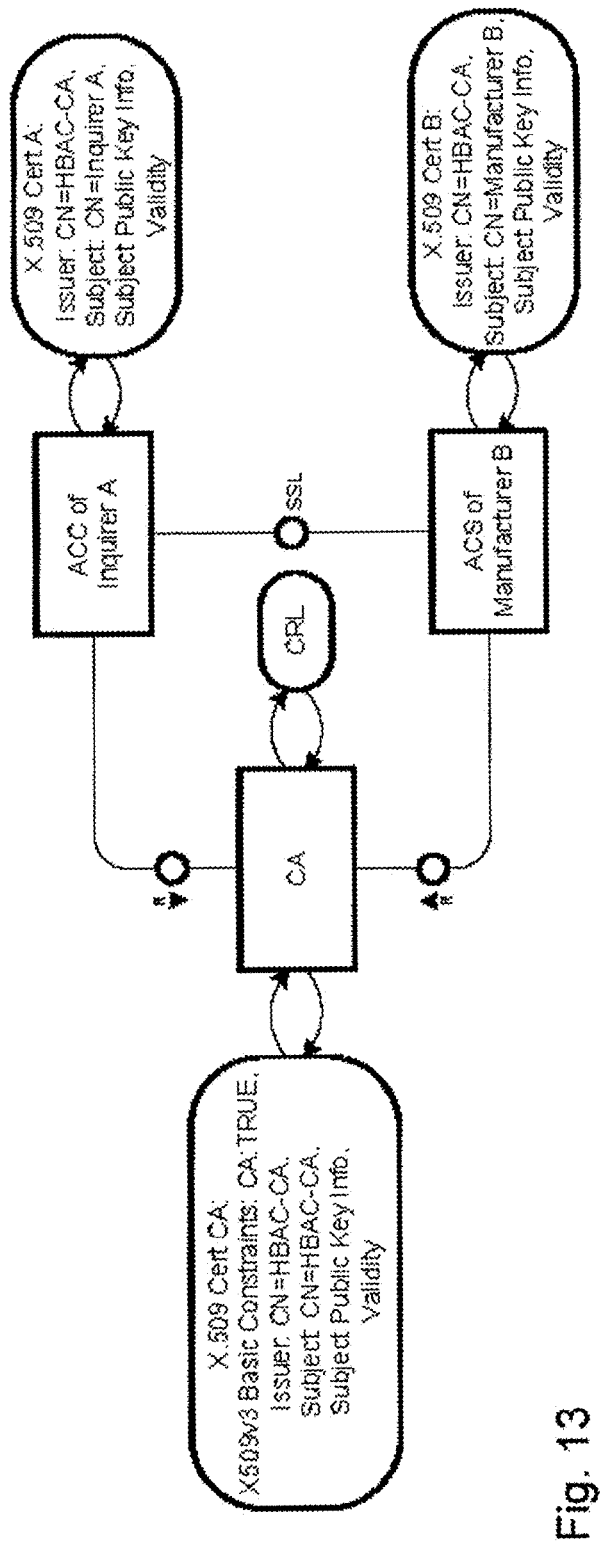
Figure 14:
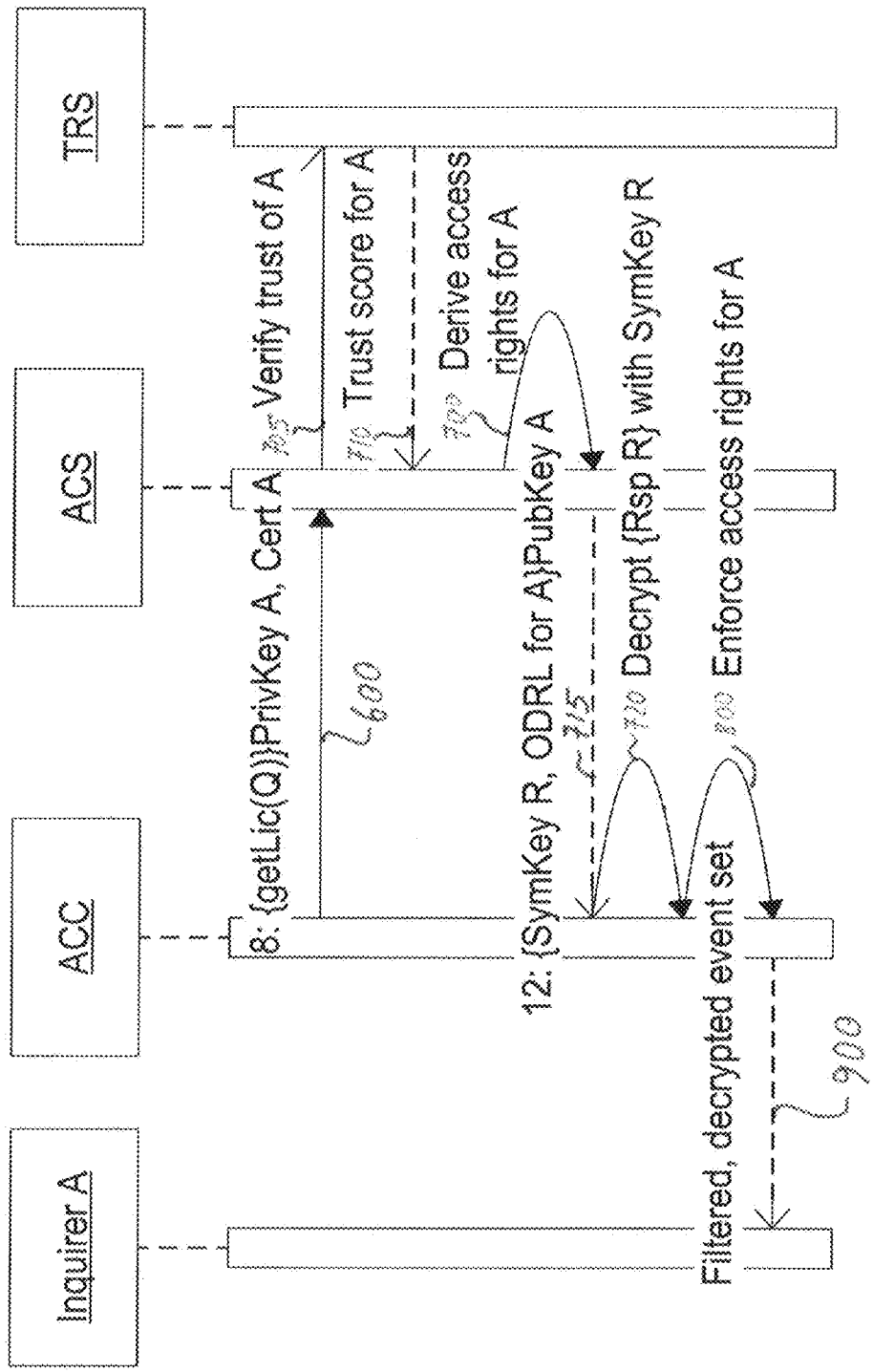
Figure 15:
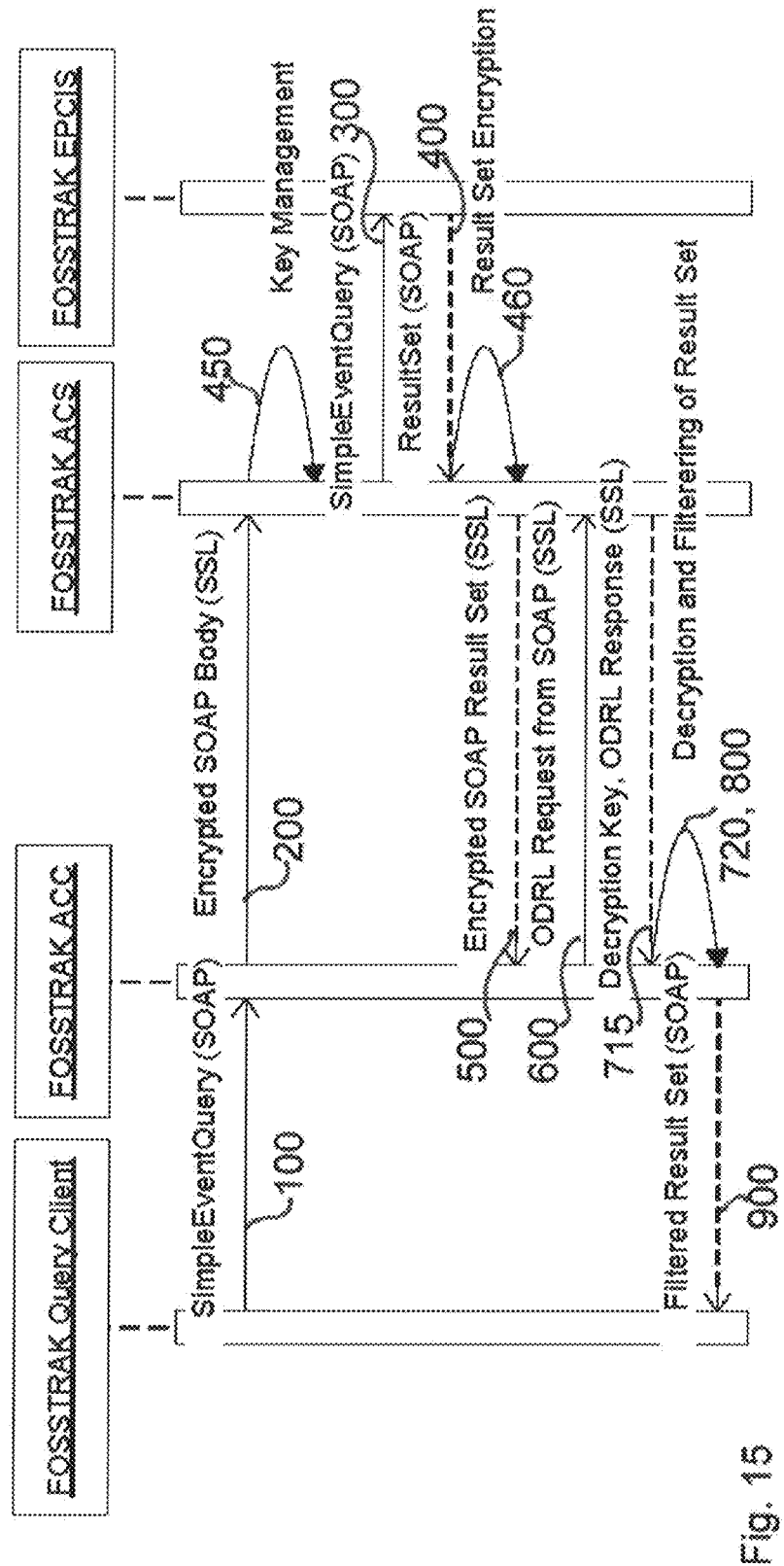
Figure 16:
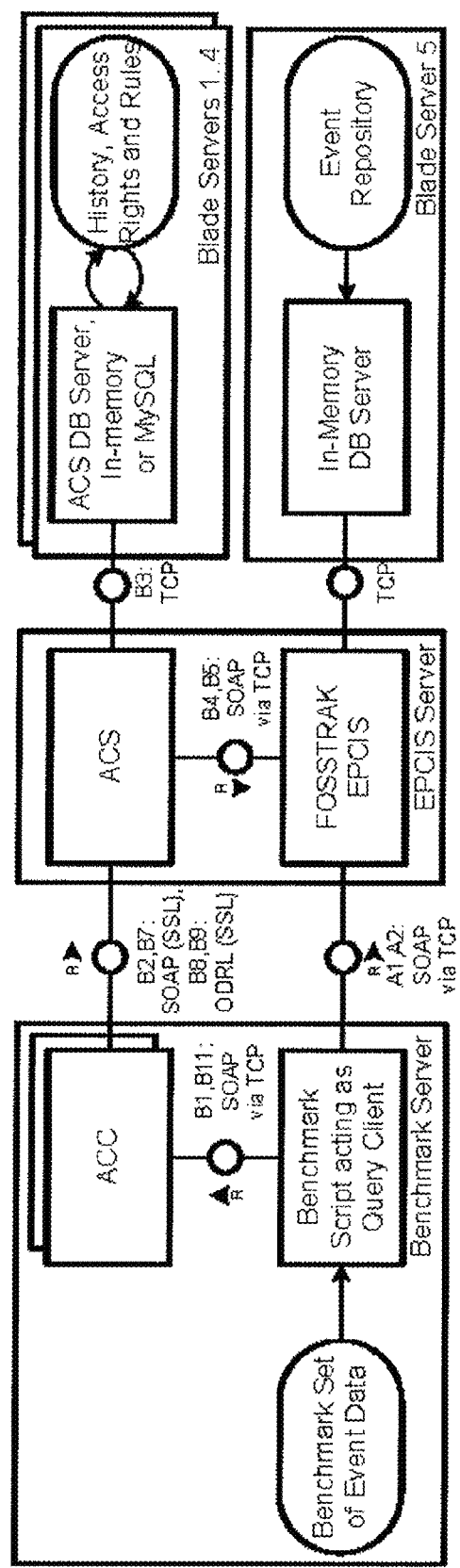
Figure 17A:
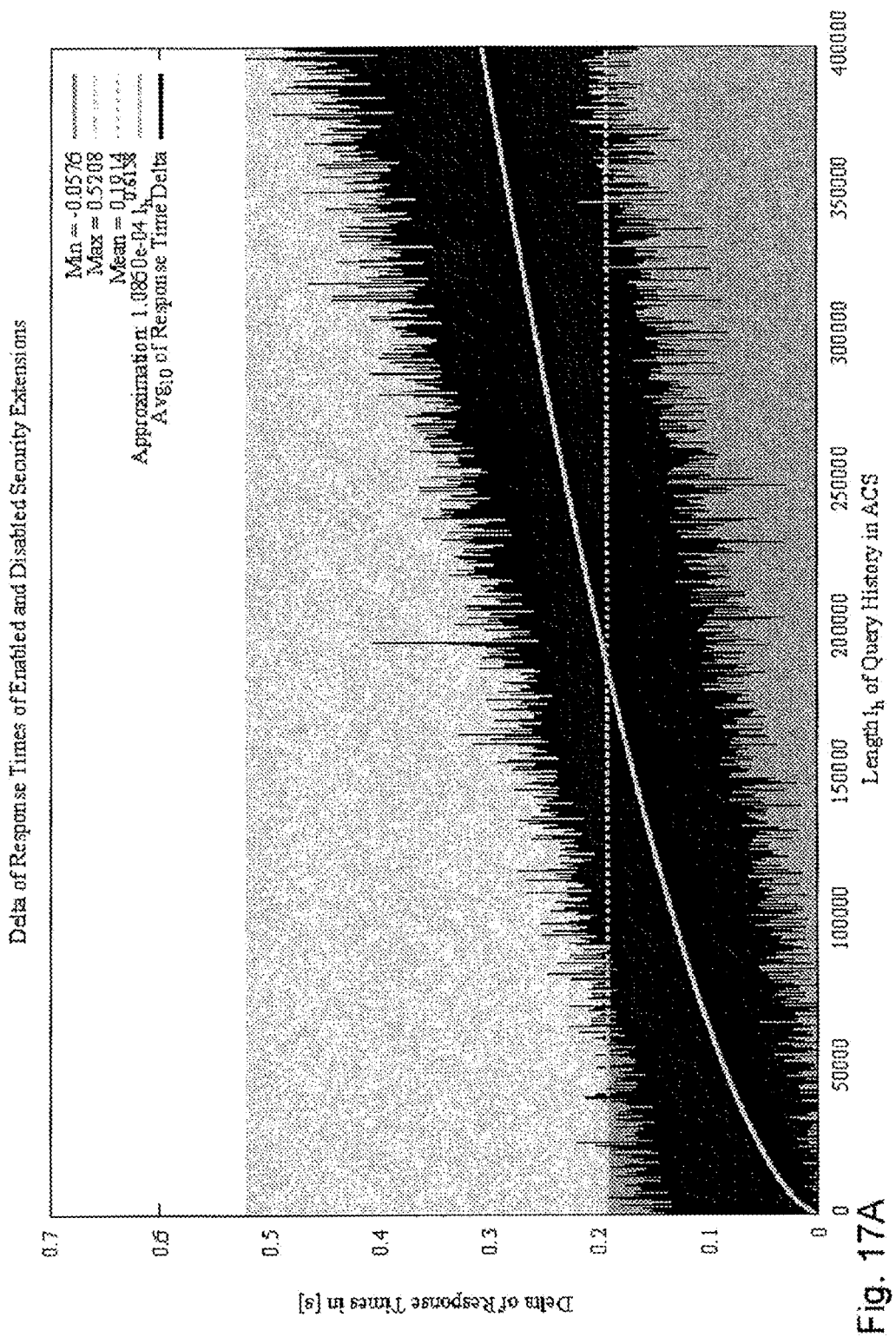
Figure 17B:
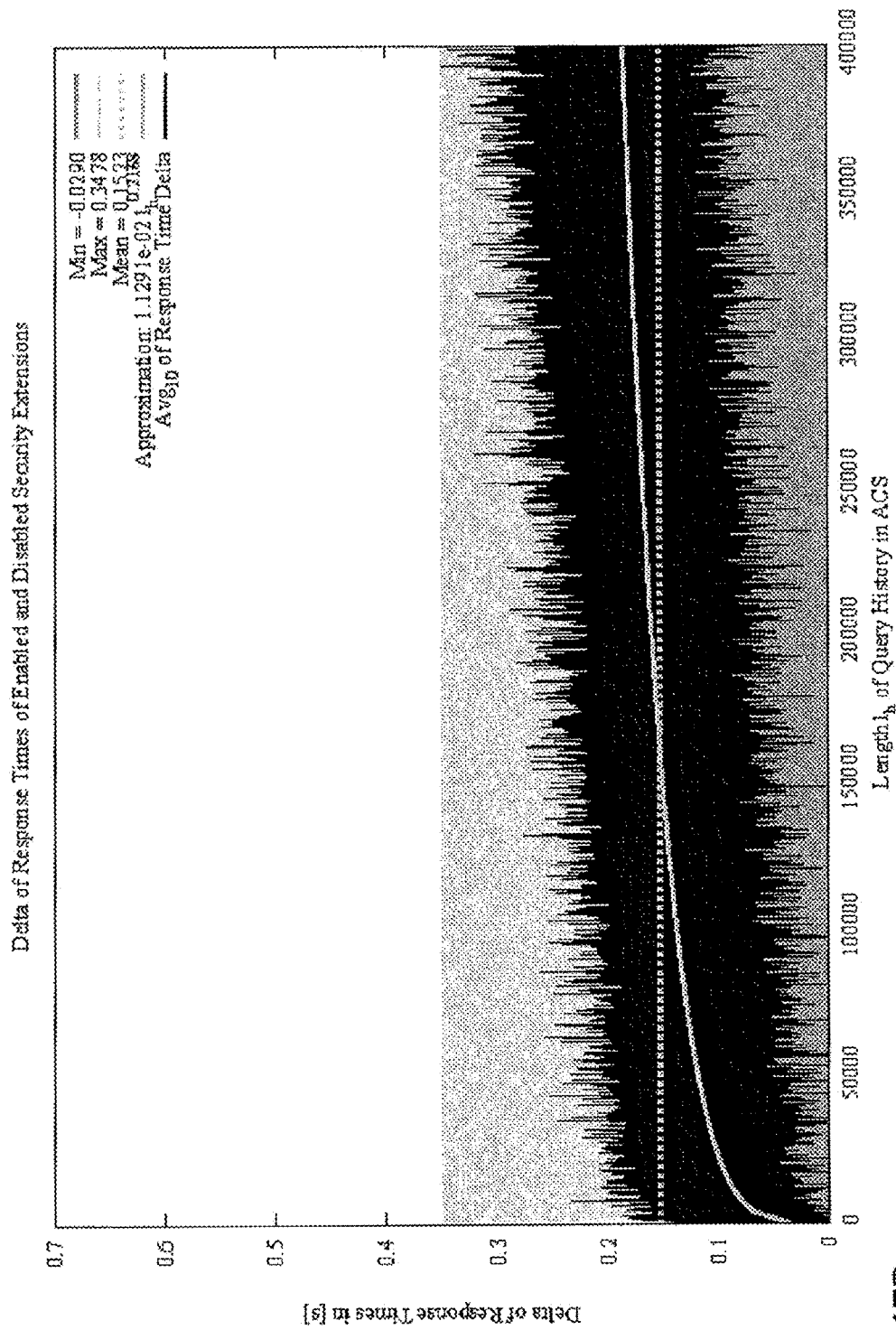
Figure 17C:
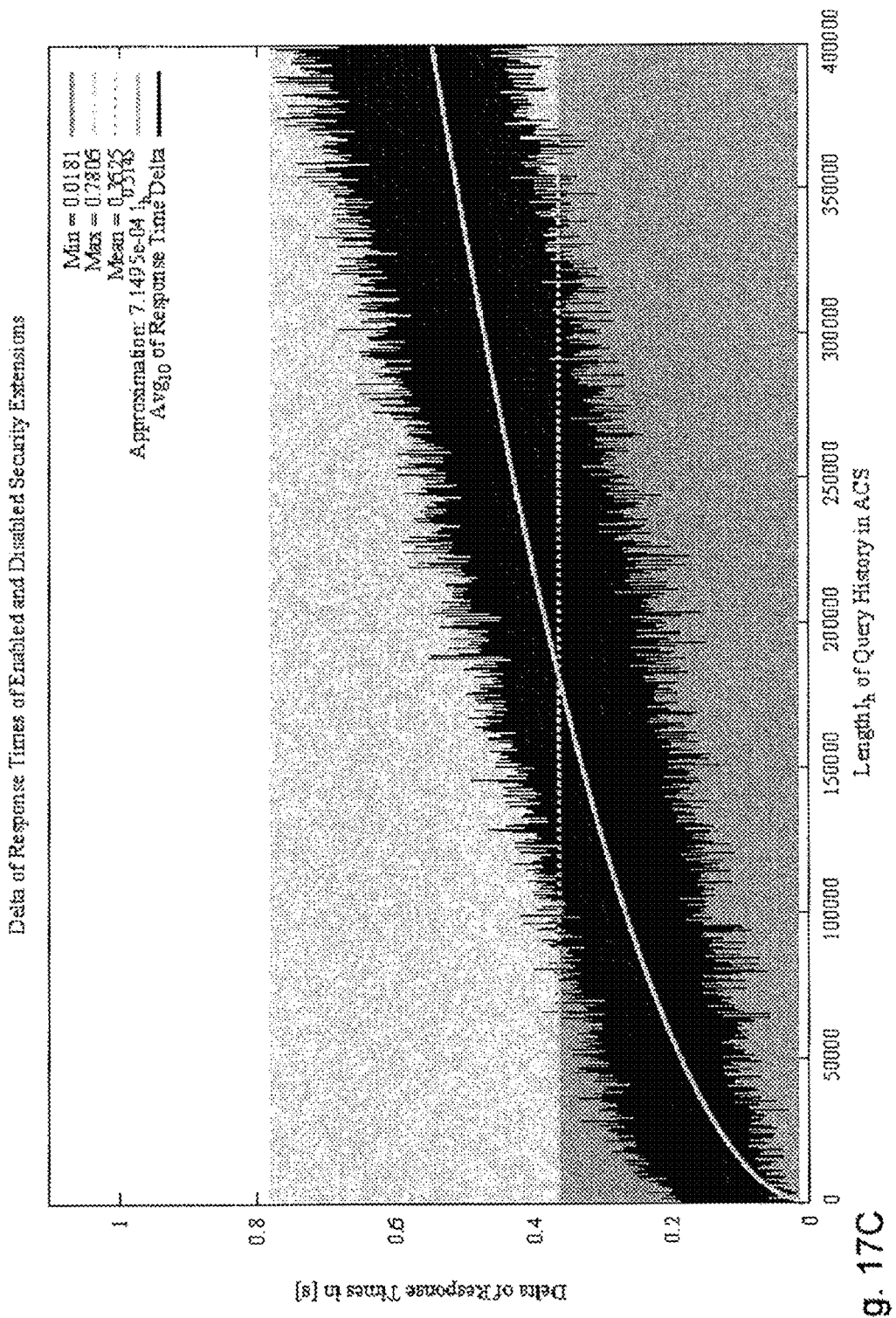
Figure 17D:
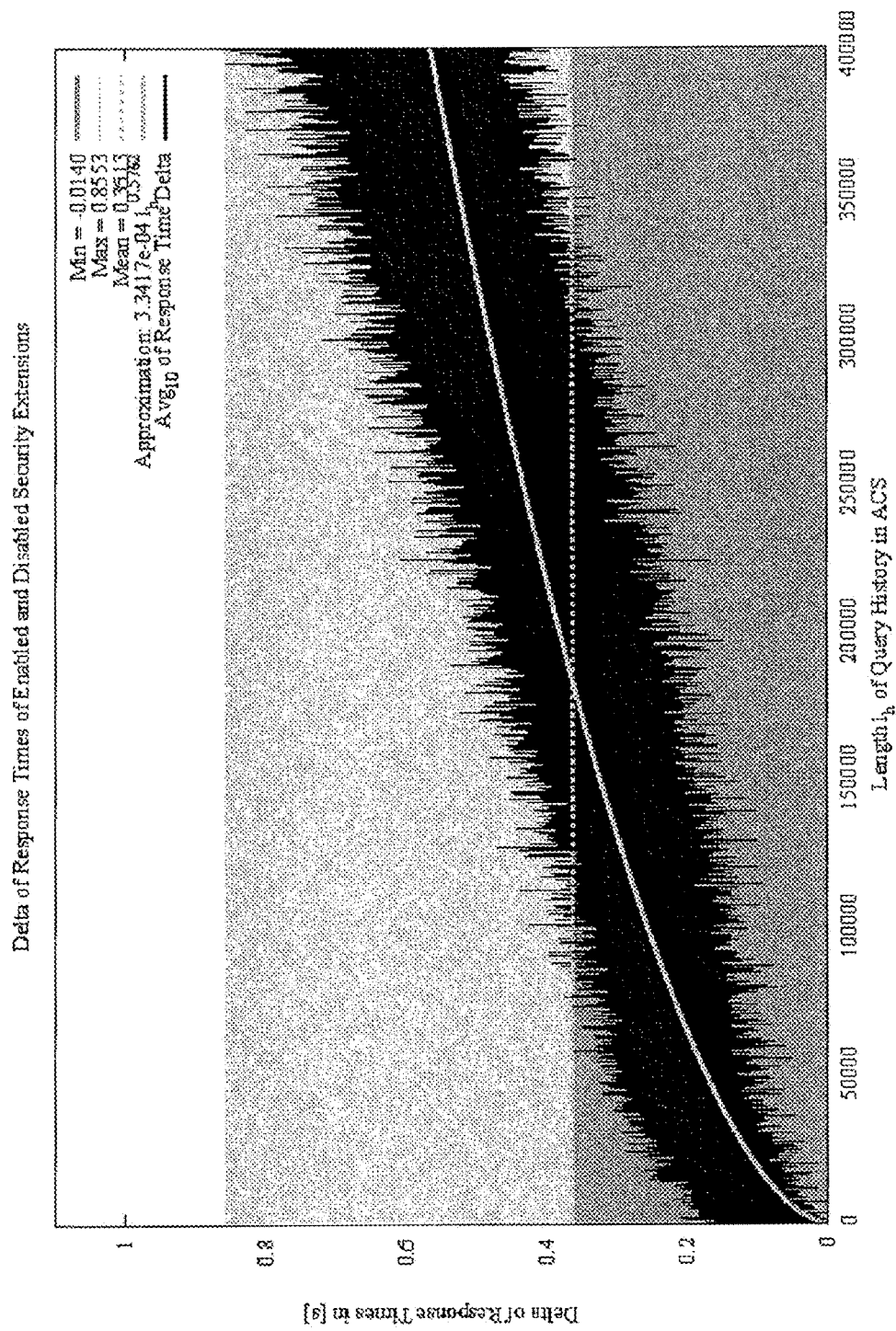
Figure 17E:
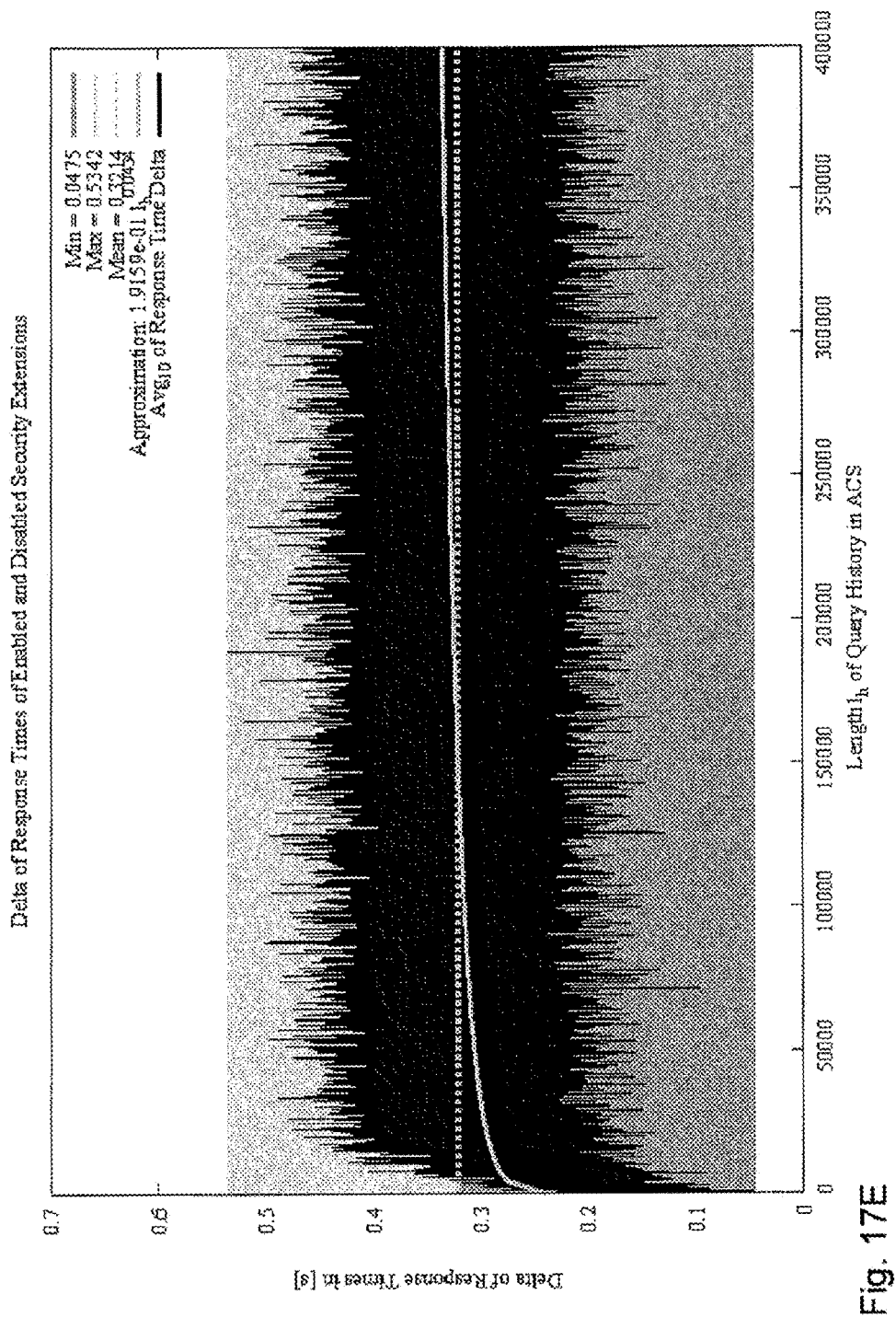
Figure 17F:
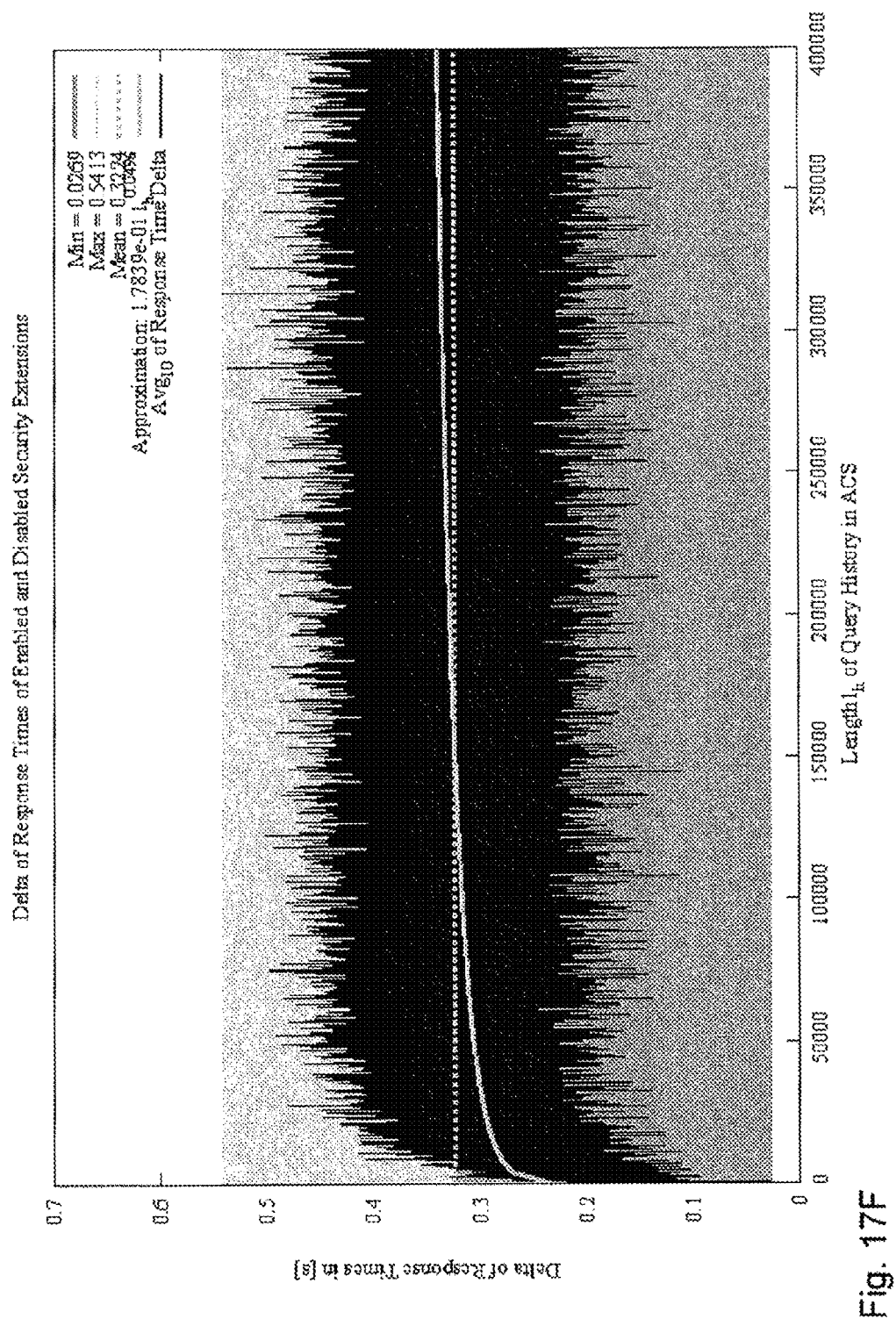
Figure 17G:
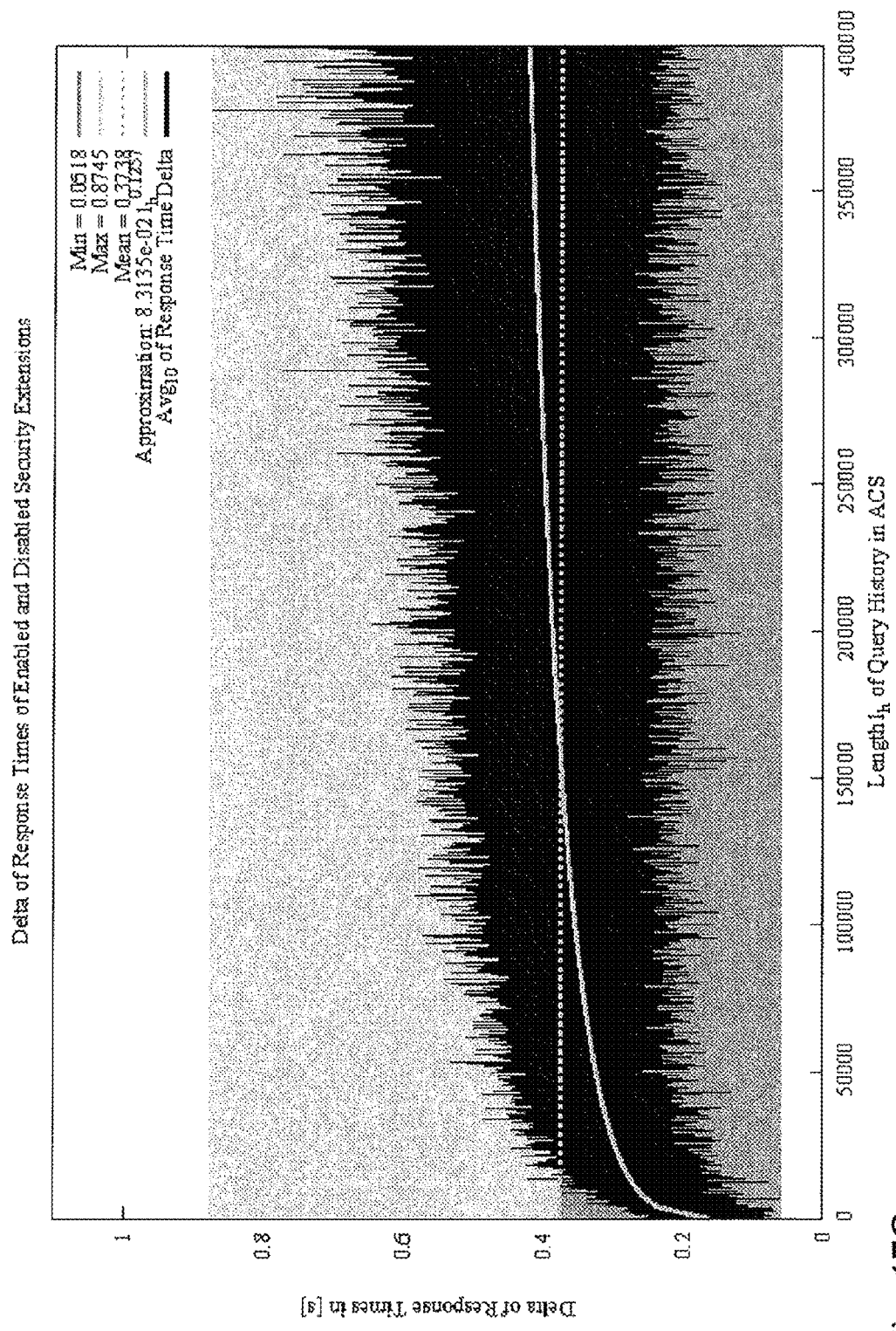
Figure 17H:
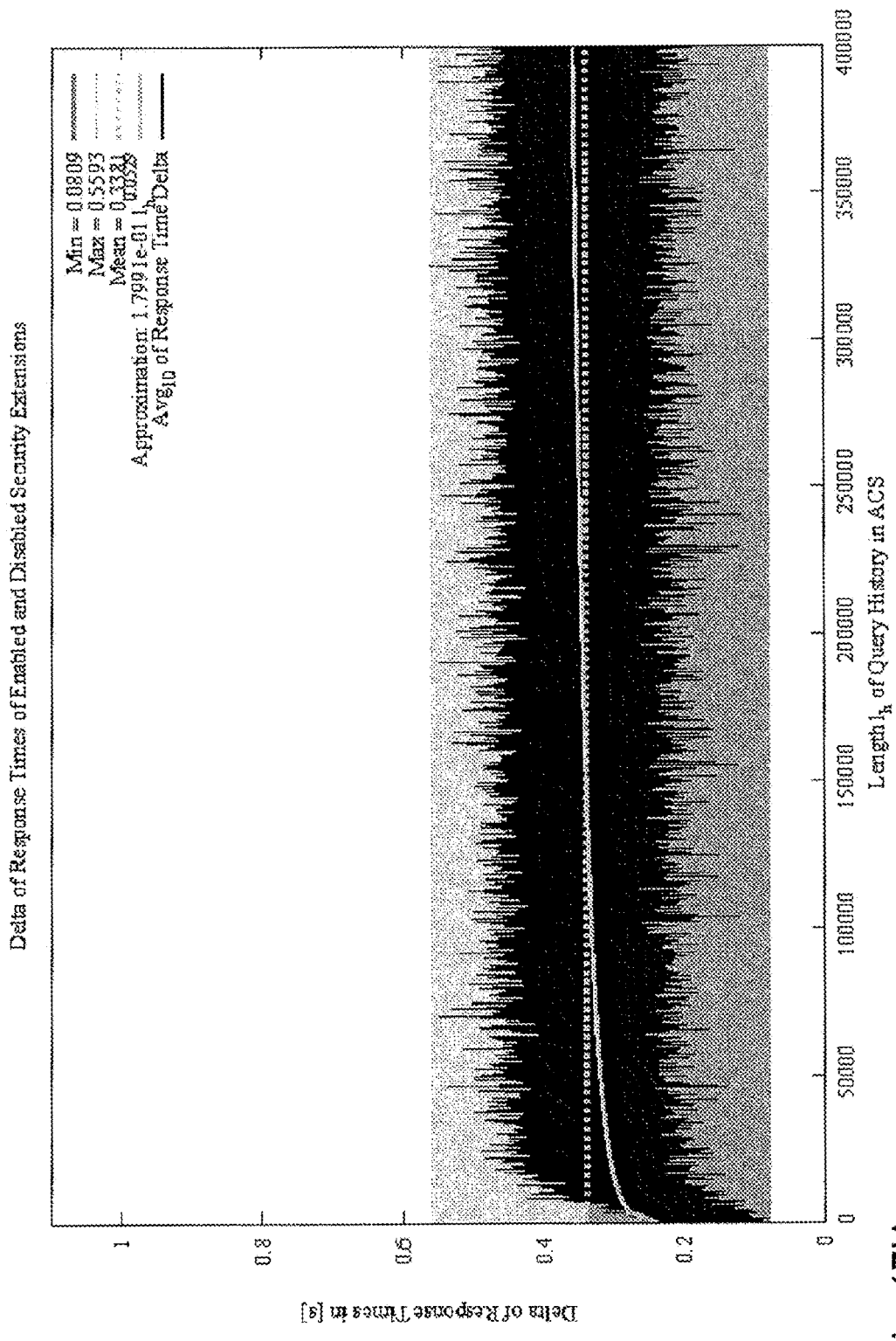
Figure 17L:
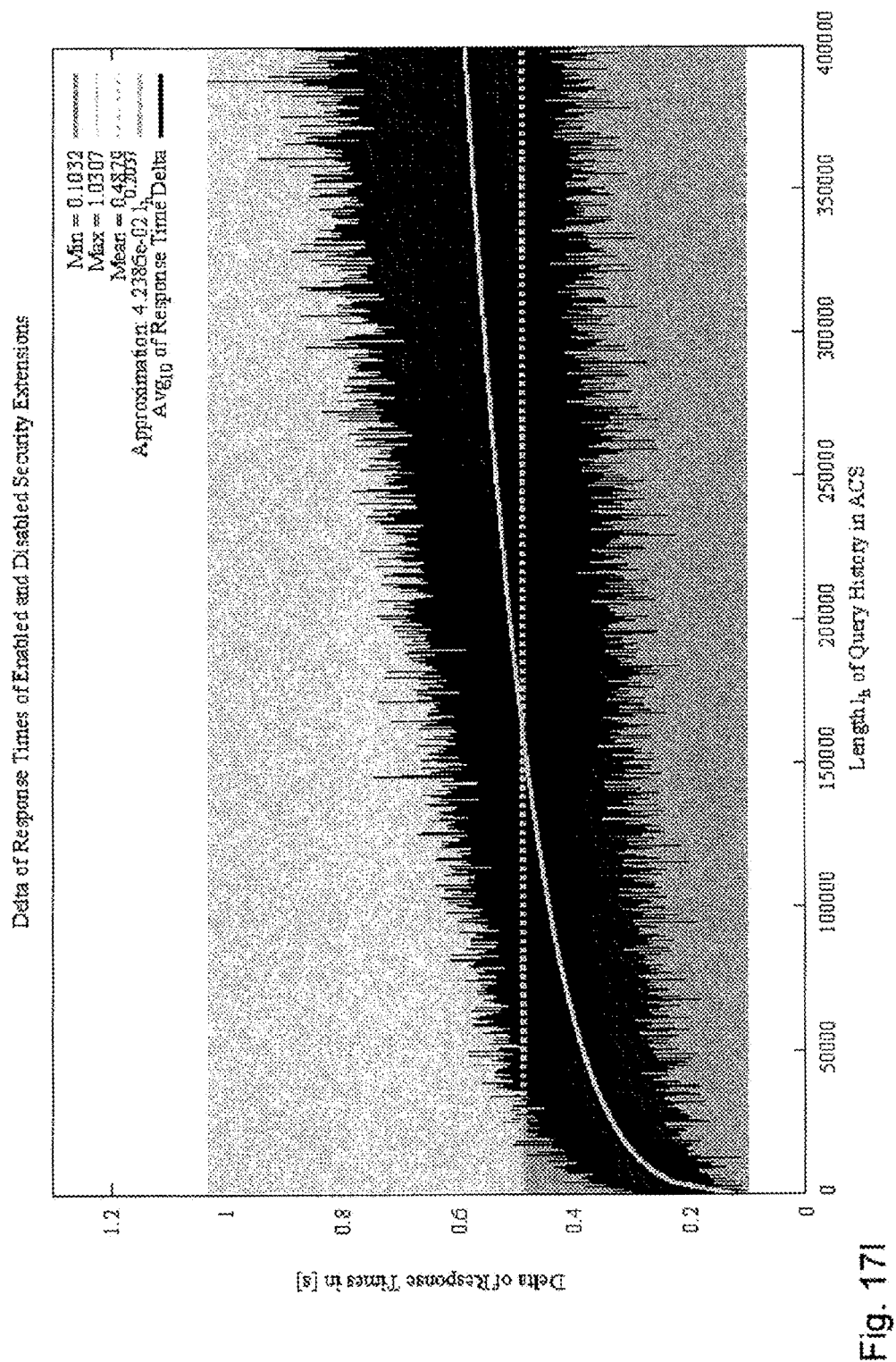
Figure 17J:
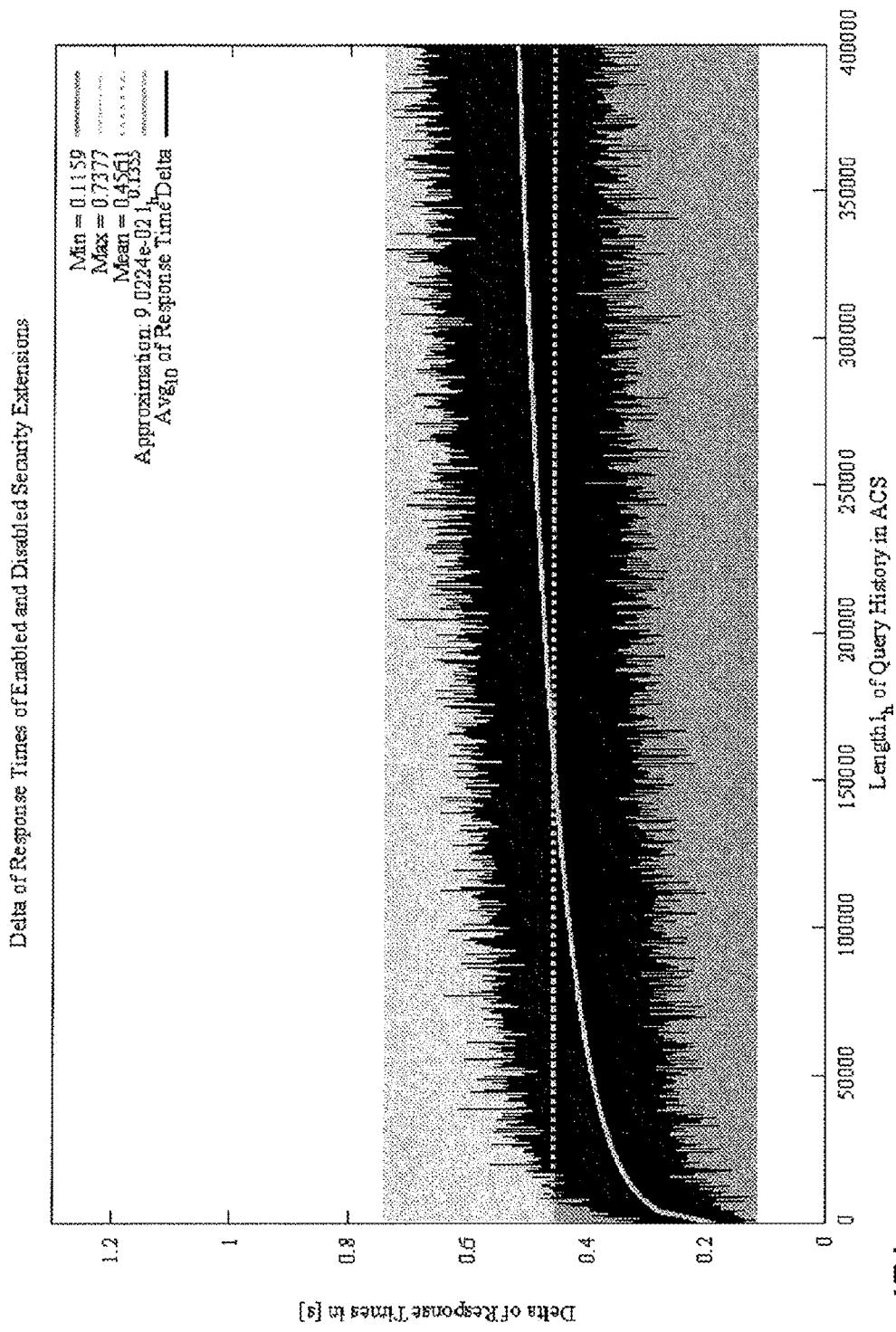
Figure 17K:
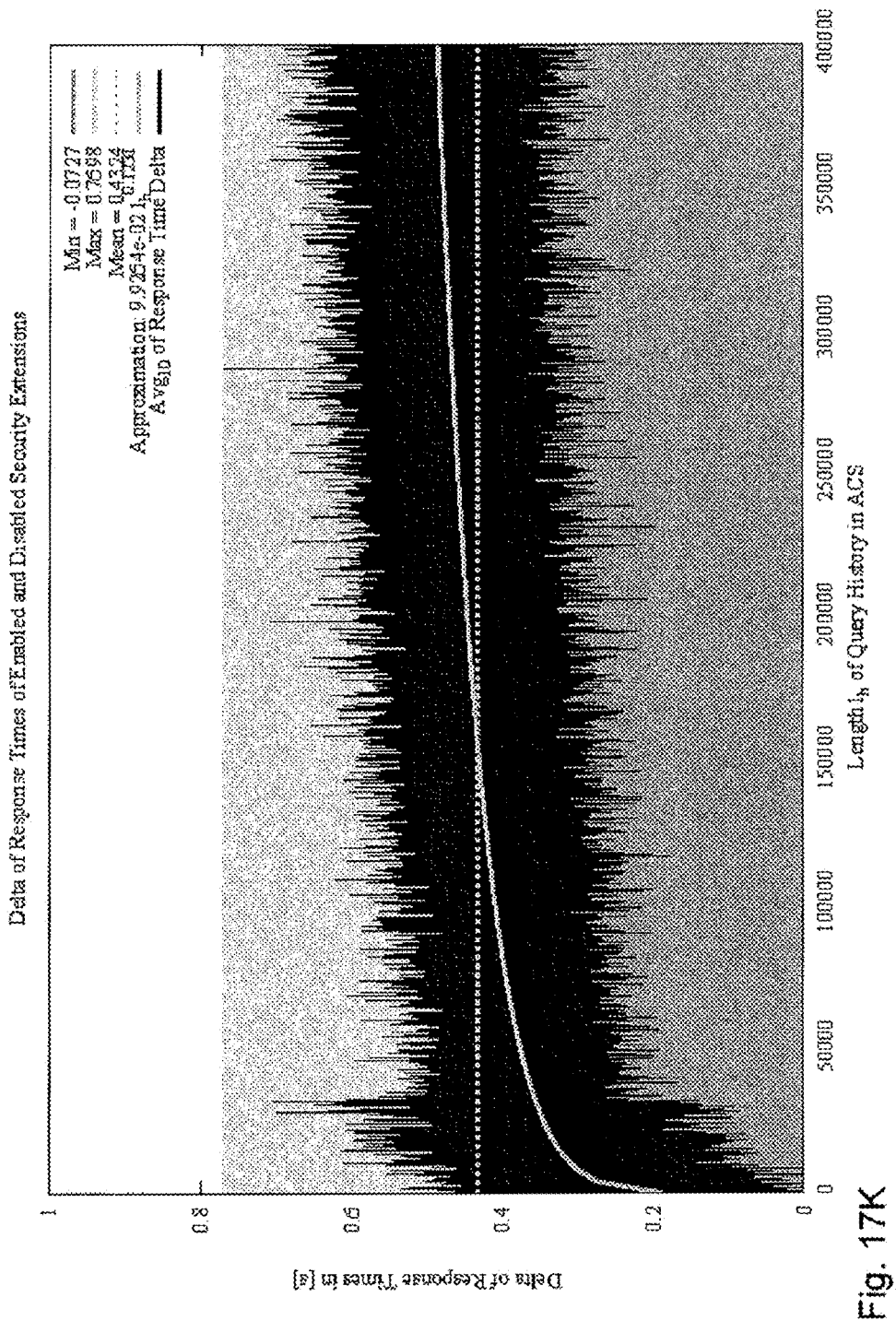
Figure 17L:
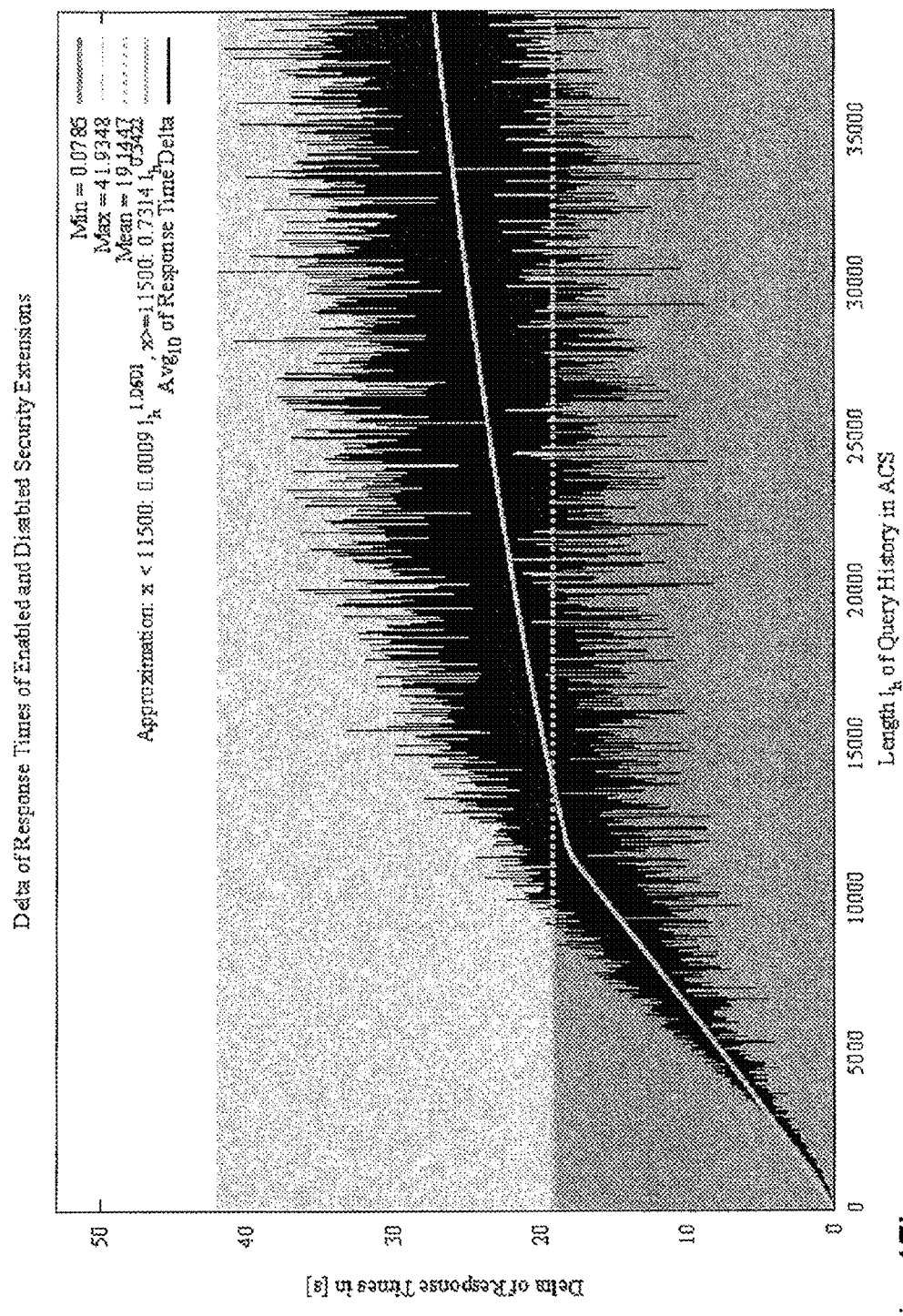
Figure 18:
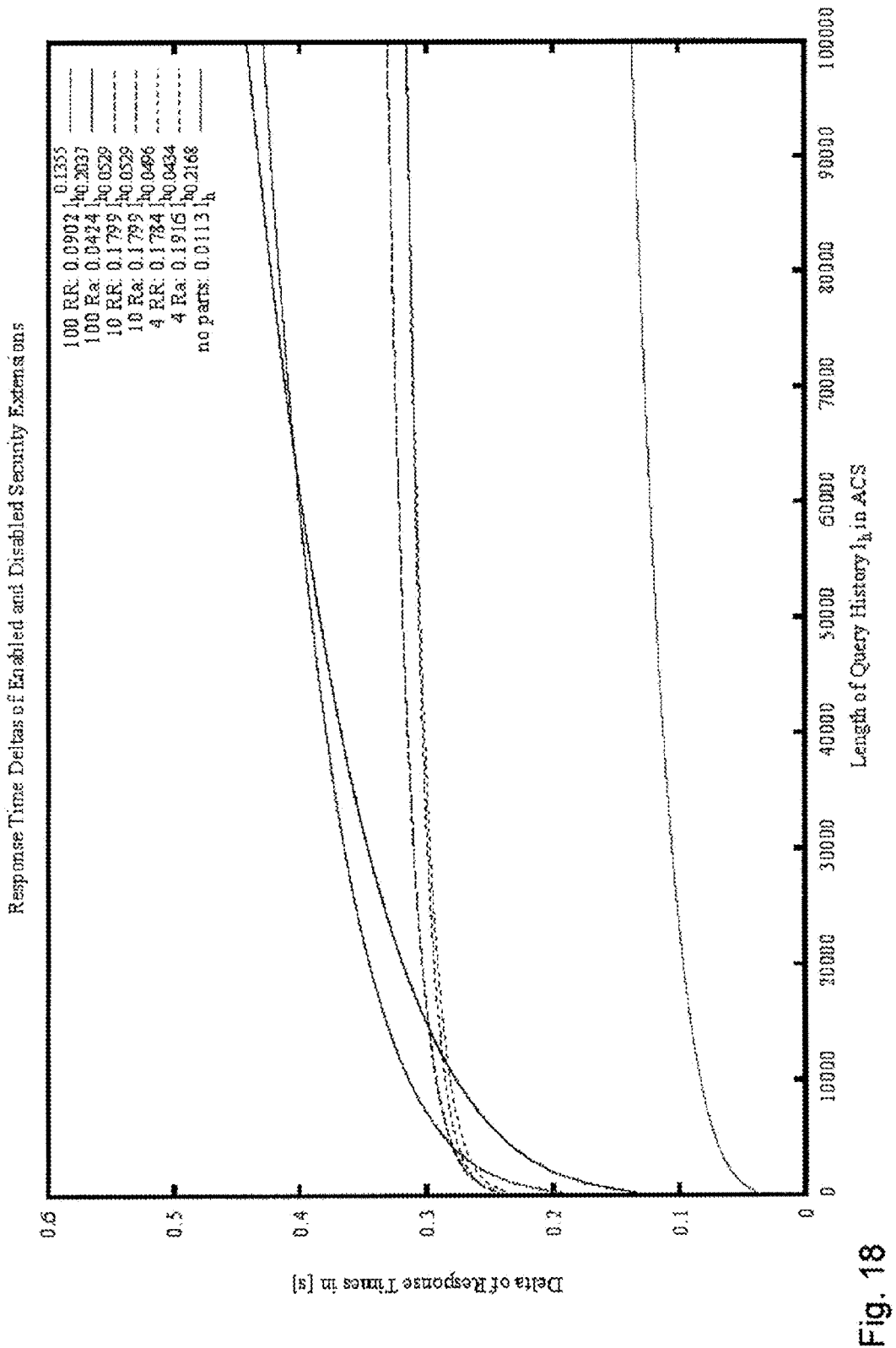

FIG. 1 shows a combined data and product flow between supply chain party roles A to F of an RFID-aided supply chain, as known from the prior art, FIG. 2 shows an FMC block diagram illustrating a classification of supply chain parties and known possible attacks, FIG. 3a shows an entity relationship diagram (ER diagram) of entities involved in a known Role based access control, FIG. 3b shows an ER diagram of entities involved in a known Rule based access control, FIG. 4 shows a protocol stack of the known EPCglobal standard, FIG. 5 shows Infrastructure components of an RFID-enabled company, FIG. 6 shows an overview of related work, FIG. 7 shows an interaction of history based access control (HBAC) actors according to the present invention, FIG. 8 shows an ER diagram of history based access control (HBAC) according to the present invention, FIG. 9 shows a trust relation server or trust server (TRS) connecting to remote TRSs of known business partners, FIG. 10 shows an UML sequence diagram depicting a communication protocol for client-server applications, FIG. 11 shows an UML sequence diagram depicting the communication protocol according to an embodiment of the invention, FIG. 12 shows an UML sequence diagram depicting a portion of the communication protocol pertaining to Event data communication, FIG. 13 shows an interaction of access control client, access control server and a certificate authority, FIG. 14 shows an UML sequence diagram pertaining to a portion of the communication protocol pertaining to license data communication, FIG. 15 shows an UML sequence diagram depicting message flow for integration of HBAC with existing FOSSTRAK components, FIG. 16 shows a benchmark setup for HBAC, FIG. 17A shows Delta of response times of FOSSTRAK capture client over length $l_h$, 4 inquirers, without partitioning, FIG. 17B shows Delta of response times of FOSSTRAK capture client over length $l_h$, 10 k inquirers, no partitioning, FIG. 17C shows Delta of response times of FOSSTRAK capture client over length $l_h$, 4 inquirers, RANGE 1, 2, 3, 4, FIG. 17D shows Delta of response times of FOSSTRAK capture client over length $l_h$, 4 inquirers, ROUNDROBIN 4, FIG. 17E shows Delta of response times of FOSSTRAK capture client over length $l_h$, 10 k inquirers, 4 range partitions, FIG. 17F shows Delta of response times of FOSSTRAK capture client over length $l_h$, 10 k inquirers, 4 round robin partitions, FIG. 17G shows Delta of response times of FOSSTRAK capture client over length $l_h$, 10 k inquirers, 10 range partitions, FIG. 17H shows Delta of response times of FOSSTRAK capture client over length $l_h$, 10 k inquirers, 10 round robin partitions, FIG. 17I shows Delta of response times of FOSSTRAK capture client over length $l_h$, 10 k inquirers, 100 range partitions, FIG. 17J shows Delta of response times of FOSSTRAK capture client over length $l_h$, 10 k inquirers, 100 round robin partitions, FIG. 17K shows Delta of response times of FOSSTRAK capture client over length $l_h$, 10 k inquirers, 100 range partitions, indexes on attributes identities and requests, FIG. 17L shows Delta of response times of FOSSTRAK capture client over length $l_h$, 10 k inquirers, no partitioning, MySQL, and FIG. 18 shows a comparison of HBAC response times for 10 k inquirers using approximation functions.

Figure 19:
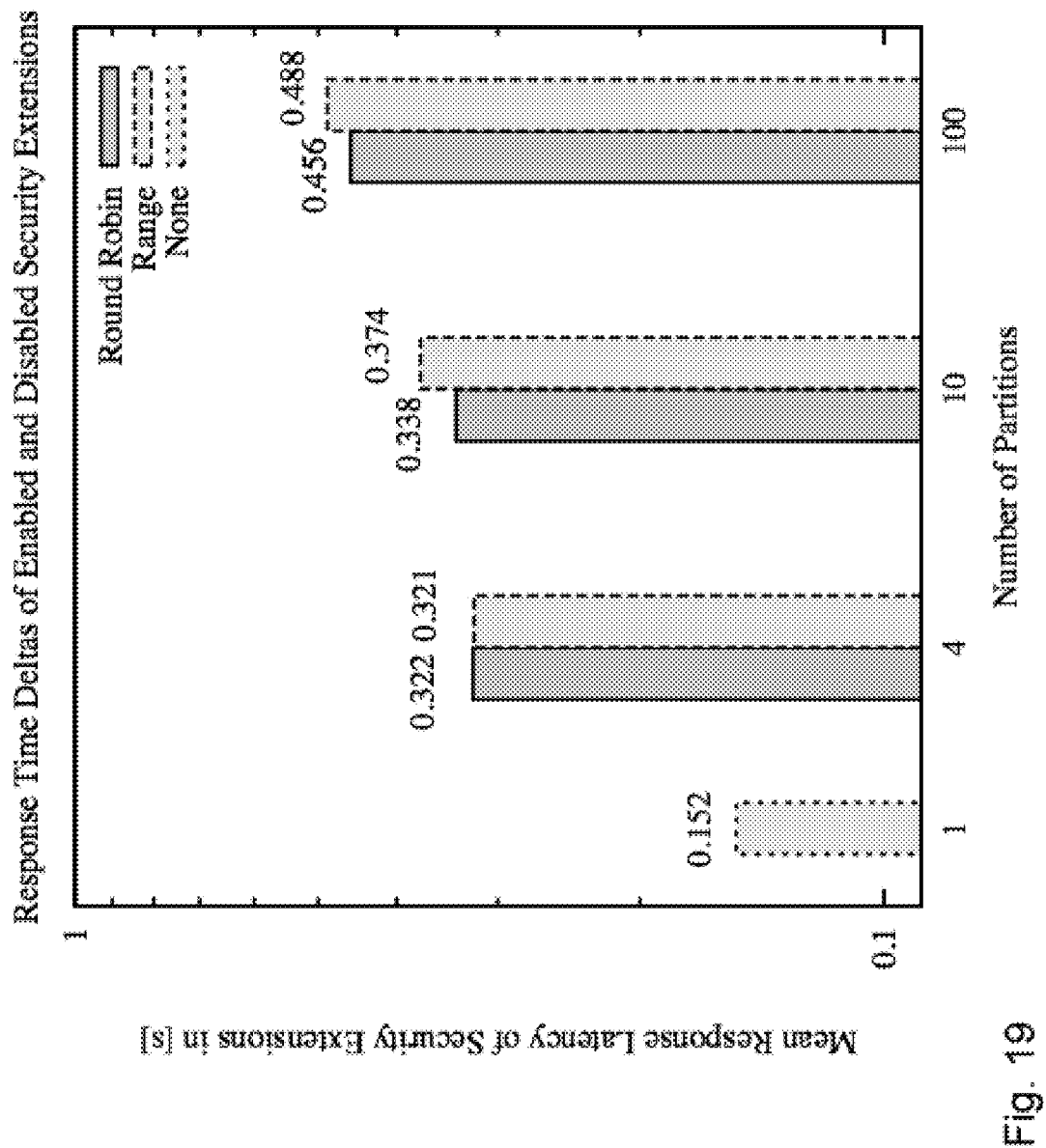

FIG. 19 shows a summary of mean HBAC response times for 10 k inquirers based on the results shown in FIG. 18.

DETAILED DESCRIPTION OF THE INVENTION

FIG. 8 shows an interaction of history based access control (HBAC) actors to combine RBAC and RuBAC for decision taking. The actors are an inquirer A, an Access Control Client ACC, a repository EPCIS comprising an Event repository and a Trust Relationship Server TRS (also referred to as trust server). According to the invention, HBAC may be implemented as business-level extensions for event repositories, as shall be explained next.

Business-level Extensions for Event Repositories

We refer to HBAC as all access control mechanisms that store a complete history of queries, analyze it, and perform decision taking based on its evaluations. HBAC according to an aspect of the invention is designed for extension of current EPCIS implementations. With respect to Hypothesis 2, the following requirements are considered to control data access:

User Authentication: Identify the inquirer and protocol, who is querying data from the EPCIS repository, Access Rights: Enforce, which portion of data are allowed to be accessed by whom, and Secured Data Exchange: Prevent manipulation of data during its exchange between client and EPCIS repository.

From our perspective, combining event data with semantic information can lead to exposure of sensitive business secrets. Consider a pharmaceutical manufacturer and one of the competitors querying the EPCIS repository of the manufacturer. The competitor, i.e. the inquirer A in FIG. 7 sends a query for details of a guessed EPC of one product's ingredients. Even if the default access rule prohibits returning any details to unknown parties, the fact that an empty message instead of no message is returned indicates the existence of further data for the given EPC, which exposes the relationship with the supplier as defined by threat T2 in the section Vulnerable Environments, as explained above. In real life, nobody would provide supplier details to competitors. Let us assume further, the competitor continues to query details of a second, third, etc. supplier. The existence of further details in your EPCIS repository can be combined to derive ingredients of your pharmaceutical goods.

In addition to the exposure of event data its combination can lead to exposure of business secrets. Recording the complete query history and its analysis, build the basis for adaptation of access rights to prevent exposure of sensitive business secrets. With respect to Hypothesis 1, the security extensions are analyzed regarding their response time characteristics in a section Benchmarks, further below.

The given embodiments for the business-level security extensions are presented in context of RFID-aided supply chains. However, they are designed for EPCglobal networks, i.e. also other techniques for product identification, such as barcode scanner, can build their technology foundation. Therefore any reference to RFID shall be considered as a non-limiting example of means of tracing products, hence providing traceable products, when attached to a product.

We followed a SoD approach during the design process of the architecture according to FIG. 7. Thus, dedicated components per task are present forming the architecture of the business-level security extensions. It is to be understood that the components displayed in FIG. 7 may form a system according to the third embodiment of the invention and/or perform the method of granting access according to the first embodiment. These components are:

The inquirer A is a querying party asking for details about a certain good, for example a manufacturer, or any other party of a supply chain. The Access Control Client ACC is present at the inquirer and enables transparent security extensions for existing repositories EPCIS. The access control client ACC is present at the inquirer and enables transparent security extensions for existing repositories EPCIS. The access control client may be implemented for example, as a piece of software installed at the inquirer. The repository EPCIS contains captured event data and processes incoming queries for certain EPCs. The access control Server ACS comprises access control rules and applies them for a certain query and inquirer. The trust relationship server TRS is an optional component that combines information about specific business partners, and a certificate authority CA adapted to perform validation of client certificates in context of the PKI.

FIG. 7 depicts the interaction of the aforementioned architecture components via the Internet. ACC and ACS are responsible for secured data exchange and filtering; TRS provides additional information for decision taking.

FIG. 8 depicts the involved entities of the ACS and their relationships. It shows that the basic access control mechanisms as discussed in the section Access Control Mechanisms are combined in HBAC. RBAC is implemented through user entities that are grouped to role entities and acl entities, which are assigned to roles instead of users extracted from the history. RuBAC builds on rule entities that contain predicates based on acls, which are assigned to role entities. In the following, we define the functionality of the aforementioned components in further detail.

Inquirer

The inquirer can either be a natural person, e.g. a customer or a business partner, which bought a product. This entity is interested in gathering information about a certain product identified by its EPC or about a reading location identified by its Serialized Global Location Number (SGLN) to validate the product's authenticity. The inquirer is typically neither part of the queried company nor known beforehand. Inquirers communicate with the EPCIS via public interfaces. For example, Simple Object Access Protocol (SOAP) is used to query details of products via the web service of the EPCIS.

EPCIS Repository

The EPCIS repository stores event data captured by a reader device within a certain company or department. It implements standardized interfaces for querying event data defined by EPCglobal (see EPCIS 1.0.1). We consider it as a standard software component and its implementation is not considered in further detail.

Access Control Client (ACC)

The Access Control Client (ACC) is responsible for enforcement of access rights and filtering of event data at the inquirer's site. The ACC relays the inquirer's queries via a SSL tunnel to the corresponding ACS of the event owner as depicted in FIG. 7. An encrypted result set is received by the ACC from the ACS. Afterwards, rights for accessing data of the result set are requested from the ACS. The ACC performs decryption and filtering of the result set in accordance to the retrieved access rights. As a result, the ACC is responsible to create a client-specific view on the data before returning the filtered event set to the inquirer. With respect to the XACML model, the ACC acls as a PEP (see OASIS 2.0).

Access Control Server (ACS)

The Access Control Server ACS is the pendant of the ACC and a dedicated instance for rights management on server site. It decouples access control from data contained in the EPCIS repository as depicted in FIG. 7. As a result of this design decision, it is possible to change access rights at any time without affecting involved event data. Additionally, the ACS keeps the EPCIS software unmodified since it extends its functionality.

In terms of the XACML model, the ACS acls as PDP (OASIS 2.0). The ACS is the extension point to include external information that influences the decision taking process. For example, the ACS interacts with optional information sources, such as the TRS, when no sufficient decision information for the given inquirer is locally available. In other words, information provided by other PIPs is combined for decision taking by the ACS.

Consider an unknown business partner that queries event data from an repository EPCIS for a certain SGLN. With respect to the functional requirement F5 defined in section Security Requirements, the event owner is interested to exchange a minimum of details, i.e. about products sold to the unknown business partner. Instead of providing all event data, the event owner filters and returns only EPC and timestamp of goods that were shipped to the inquirer. This way, the event owner hides the majority of details from the querying business partner. The event owner decides to share additional details about intermediate business steps associated with products shipped to this party after some time. Thus, the inquirer's access rights are updated while the event data remains unchanged.

Tab. 6 summarizes entities of the ACS database and their respective function, as is reproduced below.

TABLE 6

| Table | Description |
| --- | --- |
| acls | Complete history of assets and requested actions |
| acls_roles | Mapping of assets, actions and roles |
| history | Complete history of all ACS requests |
| identities | All individual identities |
| identities_requests | Mapping of identities and requests |
| identities_users | Mapping of identities and users |
| keys | Complete history of all encryption keys |
| keys_users | Mapping of keys and users |
| roles | List of roles |
| roles_rules | Mapping of roles and rules |
| roles_users | Mapping of roles and users |
| rules | List of rules |
| users | Complete history of users |

The database schema was designed to be applicable for both traditional SQL databases, such as MySQL, and in-memory databases, such as SAP's in-memory database. The table acls holds entities that were extracted from incoming queries, which are relevant for access control. To the history table all incoming requests of inquiring parties are appended. Any querying party, e.g. a company, is mapped to a concrete user. A user is an abstraction for a certain inquirer of the EPCIS identified by an X.509 certificate subject. Users can have multiple identities, e.g. departments of the same company with individual ACCs that perform individual queries. An identity is a certain ACC identified by its certificate fingerprint. For encryption of event data, user-specific keys are stored. The table roles builds the basis for the implementation of RBAC as described in section Access Control Mechanisms above. Rules are used to specify a combination of business secrets that needs to be protected. A rule consists of a list of permissions and/or prohibitions. One or multiple rules are assigned to user groups. Users are assigned to one or multiple groups. Access rules are used for HBAC. Remaining database tables exist for schema normalization.

Configuration Tool

A security administrator is responsible for configuration of the security extensions. This requires configuration of the policy base, which defines the system behavior. Through a web interface the security administrator can access the policy base from a variety of devices, e.g. desktop PC or smart phone. This configuration tool is referred to as PAP in terms of the XACML model (OASIS 2.0). The configuration tool is used to create new rules, check current system functionality, and to analyze the history of queries to detect possible data leakages, which was defined as part of the functional requirements in the section Security Requirements, further up. With its help, the security administrator is able to specify rules to protect business information. Rules consist of regular expressions that define information that need to be protected. If multiple rules match, the HBAC adapts the current access decision individually by analyzing the query history of the specific inquirer. The configuration tool addresses the non-functional requirement N3 defined above in the section Security Requirements to minimize configuration time of the HBAC.

Trust Relationship Server

FIG. 9 shows a possible implementation of the optional entity of the trust relationship server TRS. In FIG. 9 the TRS of a manufacturer B connects to remote TRSs of predefined business partners to acquire additional information about new inquirers.

In the context of this application trust shall be referred to as the absence of complete certainty. The trust relationship server TRS is implemented to provide a client-specific scoring algorithm. With the help of rules, the reputation of an unknown inquirer is evaluated and a specific score is derived. The interaction with remote TRSs is depicted in FIG. 9. With reference to the XACML model, the TRS acls as a PIP (OASIS 2.0).

Let us assume an unknown inquirer A that requests details for one of your products. With respect to functional requirement F5 it is a risk to provide arbitrary information to A. Thus, the ACS involves the TRS component in the decision taking process. The TRS connects to a predefined list of TRSs of known business partners and queries for any details about A. If any of the known business partners has performed business actions with A behavioral data is stored. The remote TRS evaluates the behavioral data of A and returns a specific scoring. If any suspicious business behavior is recorded for A, the specific score is low, whereas positive business experiences result in a positive score. The TRS of manufacturer B applies company-specific trust rules to all received scores. As a result, a single score for the unknown inquirer is returned to the ACS, which influences the initial negotiation of access rights or decision taking for known inquirers. We refer to this collaborative approach that acquires a specific trust scores for unknown supply chain parties as federated trust. It builds a basis for addressing the function requirement F5 as defined in the Security Requirements, above. Thus, the ACS is able to filter event data for new and unknown inquirers accordingly to business experiences recorded by other business partners. Similar approaches exist for evaluating the payment morale of customer, e.g. SCHUFA score (SCHUFA Holding AG. Dept Compass: Empirical Indicators of Private Debt and Overindebtedness. www.schufa.de/en/media/en/teamenglisch/downloads_11/schufa_debtcompass_2008_englishinternet.pdf, 2008).

Since the TRS operates as part of a globally interconnected network, suspicious clients or malicious behavior recognized by any supply chain party are logged. Depending on the detected activities, a client-specific score is calculated. The TRS consists of a local and a global scoring engine. The local engine is company-specific and contains details about suspicious behavior of clients that interact with the local company only. The global engine contacts a list of TRSs of predefined business partners, which process the query locally.

Certificate Authority

The Certificate Authority (CA) is required for establishing a PKI. The CA issues certificates for trusted clients and maintains Certificate Revocation Lists (CRLs), e.g. to revoke certificates when keys have been compromised.

Clients holding a valid certificate can use the CA to verify their identity or to protect queries against manipulation by using digital signatures. The ACS verifies the identity of certain clients by checking the validity of the inquirer's certificate with the help of the CA. With respect to the functional requirement F4 defined in the Security Requirements section, above, the certificate is used for identification of the inquirer.

Extended Process Steps

In the following, process steps of the security extensions are outlined. With its help, the requirements of real-word scenarios are analyzed and subsequent benchmarks are performed. Recording each querying party and its queries $q_u$ is performed to build a history of requests and to adapt access rights individually as will be described in sect. Enforcement of Access rights, further below.

New Inquirer

We refer to inquirers as all kinds of business partners, e.g. wholesalers, retailers, any kind of company. An inquirer u for a given EPCIS epcis, is referred to as new unless the ACS does contain any record identifying u. The first time a new inquirer is performing a query, a user u is created within the ACS, which results in a single insert operation to database table users. Another insert operation is performed to map the newly created user to the default rule in database table roles_users. A new inquirer is referred to as default as long as it is not assigned to any business role $r_u$ in the ACS of the business partner. In other words, a default user is known by the ACS but does not hold access rights other than specified by the default role.

New Identity

We refer to an identity as concrete actor of an inquirer that performs queries, e.g. an ACC installed of certain department. The first time an ACC of an unknown inquirer is performing a query, its corresponding identity $i_u$ is created within the ACS. Creating a new identity results in insert operations to the database tables identities and identities_users in order to map the new identity to the corresponding user.

Key Creation

If there is no encryption key $enc_u$ for a certain user, a new offset for the AES 256 CBC cipher is generated using the rand_bytes PRN generator of the Python M2Crypto library. The $enc_u$ is stored in the database of the ACS and mapped to the user during a protocol step 450 of generating a symmetrical key SymKey of a method and/or a communication protocol according to the invention as will be explained for the communication protocol with reference to FIGS. 11 and 12. Key creation and mapping requires two insert operations (keys, keys_users).

Existing Inquirer

An existing user u and its identity $i_u$ needs to be retrieved from the database tables users, identities, and identities_users. One of the following alternatives applies:

If u exists, but $i_u$ is missing, a new $i_u$ is created or
If u and $i_u$ exist, a current $enc_u$ is retrieved.

Key Retrieval

Result sets need to be encrypted with the user-specific encryption key $enc_u$. The key is created during user creation and needs to be renewed periodically to prevent attacks against the key itself. The corresponding $enc_u$ is looked up using the user performing a single join operation on the database tables keys and keys_users.

Role-Based Access Control in the ACS

Predefined access rights are assigned to users via roles to implement RBAC. Roles are used as an abstraction for one or multiple users. To obtain the set of access rights, i.e. rights and prohibitions, the user's role is identified via a join operation and the associated access rights need to be joined additionally. As a result, two join operations are required to obtain access rights, i.e. a mapping between users and roles and corresponding access rights. In FIG. 11, RBAC is used to derive the basic access rights for a certain user during a method and/or communication protocol step 700.

Rule-Based Access Control in the ACS

RuBAC is used to implement access rules. Rules are grouped to rule sets, which are assigned to certain roles. Retrieving access rules is performed using a single join operation to obtain rules and corresponding rights. Prohibitions are derived from analyzing the complete query history of an inquirer. In other words, a complete scan of the query history of a specific inquirer is performed and associated rule sets are evaluated. All rules of a rule set are combined using the logical OR operation. If two or more rules of one rule set match, a specific prohibition for the inquirer is automatically derived. Thus, defined rules need to be mutual exclusive. Resulting access rights prohibit access to data that are specified by rules of the matching rule set, which ensures protection of data specified by the rule set. In FIG. 14, RuBAC processes access rules to adapt basic access rights retrieved via RBAC during step 700 of the method and/or the communication protocol according to the invention.

Classification of Process Steps

We refer to the process steps for new inquirer, new identity, and key creation as atomic. In contrast, we refer to the process step for an existing inquirer as composed since it combines one or more of the atomic process steps.

Tab. 7 compares required database operations of atomic process steps and its access patterns.

TABLE 7

| Cat. | Process Step | DB Ops. | Occurence |
|---|---|---|---|
| A | New Inquirer | 3 Inserts | Once for every new user |
| A | New Identity | 2 Inserts | Once for every new user |
| A | Key Creation | 2 Inserts | Once for new users/when key renewal occured |
| B | Key Retrieval | 1 Joins | For every query |
| B | Rule-based Access Control | 2 Joins | For every query |
| B | Access Rule Set | 1 Joins | For every query |

Two categories of process steps can be distinguished. Category A consists of process steps that occur mostly once when a new inquirer contacts the ACS. The corresponding database operations are performed during the migration towards security extensions and rarely during regular operation. Category B consists of process steps, which are repeatedly performed every time an inquirer is querying event data.

Communication Protocol

In the following an embodiment of the present invention pertaining to a communication protocol is disclosed. The person skilled in the art will readily appreciate that the steps forming the communication protocol may in part or in their entirety disclose a method of granting access to an inquirer according to a further aspect of the present invention.

An extension of the standardized EPCglobal communication protocol is taught to underline specific security features according to an aspect of the invention.

FIG. 10 displays a traditional client-server communication protocol also defined by EPCglobal (EPCIS 1.0.1) between an inquirer A and a Manufacturer B as UML sequence diagram depicting a traditional communication protocol for client-server applications, e.g. FOSSTRAK query client and EPCIS repository.

FIG. 11 depicts the communication protocol of security extensions between the inquirer A and the repository EPCIS of the product's manufacturer B. In contrast to the EPCglobal protocol, our communication protocol is two-divided in event and license data communication as depicted in FIG. 12 and FIG. 14, respectively.

Event Data Communication

We refer to event data communication, when a client contacts the repository EPCIS to retrieve a set of event data for a certain QueryQ. This is a query response conversation between ACC and the EPCIS of the event owner as depicted in FIG. 12.

We restrict EPCIS communication to be performed via SSL links only. Firstly, securing the communication between ACC and ACS prevents eavesdropping of clear text queries and responses. Secondly, the X.509 certificate CertA of client A is required to establish the encrypted communication channel while sharing public information of the inquirer with the repository EPCIS. During communication setup the ACC's certificate is verified by contacting the responsible CA as depicted in FIG. 13.

CertA is used by the ACS to identify the ACC and to associate its queries for logging the query history. The ACC performs the same steps to verify the EPCIS' authenticity since the public X.509 certificate of the ACS is also exchanged during SSL handshake. All X.509 certificates are generated with a default key length of 2,048 bits for the RSA public key. This key length was selected with respect to the recommendation of the EPCglobal CP as discussed in the section Components of EPCglobal Networks. As can be taken from FIGS. 11 (upper part) and 12, in a step 100 a query of the inquirer is forwarded to the access control client ACC. After the successful authentication of the ACC, the EPCIS fetches the relevant set of event data from its repository and creates the response RspR. The event set is symmetrically encrypted using an AES 256 CBC SymKeyR in an encrypting step 460. The encrypted event set {RspR}SymKeyR is sent via the SSL connection to the ACC in a forwarding step 500. The interested reader may ask, why event data are encrypted although they are transmitted via a SSL connection. The owner of the event data encrypts it to prevent the client from accessing it unfiltered. To clarify, in response to its query, the client's ACC receives a symmetrically encrypted event set. However, SymKeyR is not shared with the ACC itself.

If the ACC holds the valid certificate used for SSL session, she/he is able to decrypt the response in the encrypting step 460 and ends up with the encrypted data set {RspR}SymKeyR.

The design decision to use a symmetric encryption technique was taken with respect to Hypothesis 1. Symmetric encryption can be performed faster than asymmetric encryption for a variable length response. The size of the RspR depends on the selected event types, EPCs, and supply chain specific factors such as number of involved parties. The decision to incorporate symmetric encryption was taken to have a stable encryption/decryption time for a varying size of RspR. The symmetric key is user-specific to prevent expose of mass data in case of a compromised shared key with reference to Hypothesis 3. In other words, each ACC receives the event data encrypted by its specific key. For subsequent decryption attempts, the ACC needs to contact the ACS to retrieve the latest symmetric key for decryption. For HBAC, the minimal key length of the symmetric key was set to 64 Bits to prevent brute force attacks against the key within a shorter timeframe than the key's validity period.

License Data Communication

License data communication refers to the acquisition of access rights, its enforcement, and the filtering of the result set. FIG. 11 (lower part) and FIG. 14 depict the communication that is required to receive access rights and to filter results from the encrypted RspR.

The ACC specifies an ODRL 2.0 request to retrieve access rights with reference to a certain QueryQ (ODRL). It includes a list of desired permissions that are sent via the SSL connection to the ACS in protocol step 600 as depicted in FIG. 14. These permissions describe the subset of data the inquirer wants to access and that therefore needs to be extracted from {RspR}SymKeyR. After performing authenticity checks of the client's ACC, the ACS optionally contacts the TRS to evaluate the trust level of querying party A during a protocol step of consulting 705 the TRS and a step 710 of receiving a trust score. The trust score can be used to adapt access rights for the querying party A specifically in a step 700 of generating the permission. The ACS responds during a protocol step 715 with an ODRL response containing details for SymKeyR.

Once the ACC received the details for the symmetric key, it derives SymKeyR. With the help of SymKeyR, it decrypts RspR during a protocol step 720. Then, the ACC has full access to RspR. Before returning the data to the querying party A, access rights are applied in a step 800 and the result set is filtered during protocol step 900. Finally, only the filtered event set is returned to the querying party.

Enforcement of Access Rights

We define access rights as a set of rules that contain permission or prohibitions for a certain entity to perform certain operations with a set of data. We incorporated the XML-based ODRL 2.0 standard for our security extensions since it is a very lightweight language to express basic access control entities as described the vulnerable Environments section, above. More expressive languages, such as XACML, can be used as an alternative replacement for ODRL. XACML is more expressive than ODRL. However, the transmitted payload is also larger than the payload for a similar ODRL request/response pair. Due to the larger message size, encryption and decryption of access rights require additional processing time. We incorporated ODRL to minimize communication overhead and to optimize processing time with reference to Hypothesis 1.

```
1    <o:request type="o:request" uid="urn:policy:1296649173"
         xmlns:o="http://ordl.net/2.0">
2        <o:permission>
3            <o:action name="o:display"/>
4            <o:asset
                uid="urn:epc:id:sgtin:1318661593.003.000269655103
                "/>
5        </o:permission>
6    </o:request>
```

The above listing depicts an ODRL request for the right to display (line 3) related information about a concrete item identified by SGTIN 1318661593.003.000269655103 (line 4). The first line contains a unique policy identifier, which is stored by the ACS to protocol granted access rights per inquirer. As a result, the ACS is able to reconstruct the complete history of queries for a certain querying party. The corresponding ODRL response is given in a listing below.

```
1    <o:policy type="o:set" uid="urn:policy:1296649173" xmlns:o="
         http://ordl.net/2.0">
2        <o:permission>
3            <o:action name="o:display"/>
4            <o:asset uid="urn:epc:id:sgln:1318661593.26806353"/>
```

```
5        </o:permission>
6        <o:permission>
7            <o:action name="o:display"/>
8            <o:asset uid="urn:epc:id:sgln:12"/>
9        </o:permission>
10       <o:prohibition>
11           <o:action name="o:display"/>
12           <o:asset uid="T1[0-5]:"/>
13       </o:prohibition>
14   </o:policy>
```

It consists of two permissions (lines 2-5, 6-9) and one prohibition (lines 10-13). The ACC interprets the asset UID as a regular expression, i.e. a partial matching is sufficient to satisfy either a permission or a prohibition of an ODRL response. For example, the prohibition uid="T1[0-5]" in line 12 restricts access to events with times-tamps from 10h00 to 15h59. Multiple permissions or prohibitions are combined via a logical OR operation, i.e. a single matching rule of a rule set is sufficient for filtering.

For filtering, prohibitions are firstly and permissions are secondly applied, i.e. white listing is performed to ensure that explicitly assigned permissions are not impeded by HBAC. Enforcement of access rights is two-folded: a) calculation of a trust score and b) evaluation of the query history.

The client-specific trust score is the outcome of the mathematical function trust that assigns a concrete business partner p a numeric representation from interval [0, 1] with the interpretation [low, high] as given in Eq. 4.

$$\text{trust}(p) \rightarrow [0,1] \qquad (4)$$

Based on company-specific experiences with a certain business partner, a specific trust score is maintained by the TRS. If an unknown inquirer contacts the first time, the TRSs of predefined business partners are contacted to include their potential experiences with the new inquirer and to derive a global trust score. Thus, a specific trust score for each inquirer can be calculated by combining local and global trust scores using company-specific trust rules.

The ACS records the history by logging all incoming ODRL requests. Minutes, days, or weeks after the first query, a second query can be used for combination of sensitive data. Thus, it is mandatory to keep a complete history of queries without deletion. During creation of the corresponding ODRL response, the history is evaluated using access rules to detect potential exposure of business secrets. Once a rule is violated, access rights are adapted correspondingly to prevent further exposure of data.

Security Evaluation

In the following, architecture components and actors of the HBAC are evaluated regarding their capability to resist certain threats and attacks. The evaluation addresses information security aspects individually.

Query/Response Between ACC and ACS

Why is confidentiality of EPCs important although the EPC is considered as the successor of the EAN and the latter was not treated confidentially? In contrast to the traditional EAN that identifies a group of products, an EPC identifies a concrete product instance. In other words, event data are more fine-grained than EAN data. This unique identifier can be used for tracking and tracing of products as well as individuals to exposure customer relationships and customer profiles as defined by threat T3 or T4 respectively. In terms of information security, customer profiling by third parties must be prevented to increase the acceptance for EPCglobal networks. We consider customer's privacy worthy of protection.

Due to the Internet connection between inquirer and queried EPCIS repository, confidentiality of queries needs to be considered separately. We make use of asynchronously encrypted SSL connections between ACC and ACS. The use of SSL connections guarantees the integrity of data between communication peers. Securing further actors of EPCglobal networks, such as the ONS, is addressed by related work (see Jing Sun, Huiqun Zhao, Huibing Xiao, and Gongzhu Hu. Lightweight Public Key Infrastructure and Service Relation Model for Designing a Trust-worthy ONS. In *Proceedings of the International Conference on Computer and Information Science*, pages 295-300. IEEE Computer Society, 2009).

From the EPCIS's perspective, it is important to identify querying parties, e.g. the querying ACC. Firstly, result sets are filtered specifically for each ACC.

For example, an unknown querying party receives only information that a certain product was handled or manufactured. In contrast, well-known business partners also receive details about the manufacturing time, the inventory location or involved supply chain parties. Secondly, the EPCIS wants to identify each ACC to keep track of shared data as motivated by Hypothesis 2. From the inquirer's perspective, it is also important to know who performed which queries and received corresponding result sets. For example, confidentiality of queries need to be guaranteed to prevent exposure of customer relationships as defined in threat T4 in the vulnerable Environments section, discussed above.

We incorporate a dedicated PKI for authentication purposes, i.e. each supply chain party holds a unique X.509 certificate as depicted in FIG. 13. The X.509 standard defines the format of digital certificates of PKI and its operation. EPCglobal does not recommend the use of X.509 certificates for authentication purposes specifically. The CP contains recommendations about how to include locations, devices, and service information only Global Standards 1. EPCglobal Certificate Profile Specification Version 2.0. www.gs1.org/gsmp/kc/epcglobal/cert/cert_2_0-standard-20100610.pdf, June 2010). For authentication purposes, we incorporate a dedicated PKI including a trusted CA. Clients need to authenticate its identity using an X.509 certificate containing personal information.

| 1  | Certificate: |
|----|--------------|
| 2  |   Data: |
| 3  |     Version: 3 (0x2) |
| 4  |     Serial Number: 9999 (0x270f) |
| 5  |     Signature Algorithm: sha1WithRSAEncryption |
| 6  |     Issuer: C=DE, ST=Brandenburg, L=Potsdam, O=HPI, OU= EPIC, CN=HBAC-CA |
| 7  |     Validity |
| 8  |       Not Before: Feb 20 07:32:58 2012 GMT |
| 9  |       Not After : Feb 19 07:32:58 2013 GMT |
| 10 |     Subject: C=DE, CN=Pharma9999, L=Potsdam, O=HPI, ST= Brandenburg, OD=EPIC |
| 11 |     Subject Public Key Info: |
| 12 |       Public Key Algorithm: rsaEncryption |
| 13 |       RSA Public Key: (2048 bit) |

The above listing shows an excerpt of an X.509 certificate in textual format, which contains attributes, such as Issuer, Validity, or Subject as depicted in FIG. 13. Before creating a Certificate Signing Request (CRS), an asymmetric RSA key pair is created. The requester of the certificate only knows the private key of the key pair. The public key is part of the certificate can be used by any third party to exchange encrypted data with the owner of the certificate. In contrast to symmetric encryption, which requires the knowledge of a shared secret by all communication partners, asymmetric encryption does not require the exchange of a shared secret before communication. X.509 certificates are piggy packed during setup of the SSL connection, i.e. the ACC and the ACS need to hold a valid certificate issued by the trusted CA or any delegate to setup a communication channel. The X.509 certificates are verified during connection setup, i.e. the CRL of the responsible CA and certificate attributes are checked, e.g. Subject, Not Before, and Not After. The exchange of data starts only after successful verification of both connection peers, which addresses the functional requirement F3 as defined in the above security requirements section.

Access Rights

The functional requirement F2 as defined in the above security requirements section addresses access control. Thus, access rights specify, which portion of data to filter before returning to the inquirer (Matthieu-P. Schapranow, Alexander Zeier, and Hasso Plattner. Security Extensions for Improving Data Security of Event Repositories in EPC-global Networks. In *Proceedings of the 9th International Conference on Ubiquitous Computing*, 2011, referred to in the following as Schapranow IV).

Confidentiality of access rights and authenticity of communication partners are protected in HBAC by design. Access rights are only exchanged via a secured SSL connection. Thus, the integrity of exchanged messages is guaranteed since both communication peers are directly connected via the encrypted channel. The interception of exchanged messages is not possible.

Event Data

We separated data retrieval and enforcement of access rights from each other. The proposed architecture incorporates the functionality of an ACS that implements access control in a transparent way. Access rights are enforced at the latest possible point in time by the ACC on the client site. On the one hand, the late enforcement of access rights introduces potential threats On the other hand, this separation comes with major advantages. For example, updated access rights are directly populated to the ACS. The next time the ACC queries the ACS they are enforced without any latency, e.g. marshaling within the network stack. Even when the event set was retrieved before the client's access rights were updated the event set is filtered accordingly to the latest valid access rights.

Event data are exchanged through SSL connections and additionally encrypted using a symmetric key. In other words, even the ACC receives encrypted event data. As a result, the ACC cannot decrypt the message unless the ACS is contacted and returns details to derive the decryption key. Due to the separation of event data and enforcement of access rights, the entire result set needs to be sent to the ACC. The latter performs data decryption and enforces access rights. However, compromising the ACC must not result in exposure of event data. Therefore, the symmetric key is only sent after the ACS was contacted. Once the key has been sent to the ACC, event data are decrypted and filtered accordingly to the access rights. During this phase of the communication the entire event data resides in an unencrypted format in the main memory of the server running the ACC software.

The interested reader may understand the presence of the completely unencrypted data set as a potential attack vector. The design decision to perform decryption and rights enforcement on the client site is taken due to load considerations with respect to the non-functional requirement N1 as defined in the security requirements section. Enforcing access rights on the server site requires additional computational power. As a result, manufacturers and wholesalers, which handle most of the goods within the supply chain, would need to invest in a more powerful IT landscape. The given security extensions were designed to keep server-site computational power at a minimum. As a result, decryption of event data and enforcement of access rights was moved to the ACC. Furthermore, the need for revoking access rights after event data have been exposed requires a very late enforcement of access rights. For example, once a client acquired event data and potentially caches the result set for further processing, the event owner still has full control over exposed event data. Since every decryption of event data requires acquisition of ODRL access rights, the owner of the event data may change access rights even when data were already returned to the ACC. It restricts data leakage, e.g. the exposure of the ACC certificate or attacks against the ACC software. Data leakages might be detected either on the client site by intrusion detection systems or on the server site, e.g. by monitoring the queries per client and hour ratio. The very late enforcement of access rights is the foundation of restricting further access to sensitive business data. The late enforcement of access rights addresses the requirements of our Hypothesis 3. For example, the user-specific symmetric key SymKeyR is rotated regularly to limit the success of brute-force attacks against the key, ACC, or ACS.

However, the decision to incorporate symmetric instead of asymmetric encryption was taken with respect to encryption and decryption performance. From a performance's point of view, symmetric encryption is preferable since asymmetric encryption requires more time to process long data chunks. However exchange of the changed key is challenging. We focused on minimizing the impact of an exposed symmetric key with respect to Hypothesis. 3. Individual keys per user, which are rotated hourly, reduce the impact of exposed encryption keys. If a single ACC was compromised, the attacker is only able to decrypt data received by the ACC within the last hour of its operation. Once data leakage is recognized, either the operator of the ACS or the client notifies the CA. As a result, the certificate of the affected party is added to the CRL and a new certificate will be issued.

Software Components

The presented security extensions introduce additional software components, which need to be considered as new attacks. The ACC is a software component located on the client site. As a result, it cannot be controlled directly by the event owner and can be attacked without the knowledge of the event owner. Furthermore, attackers could create faked ACC software and run them instead of the verified piece of code. Additionally, attackers can try to attack ACCs instead of the event owner's EPCIS to access the content of the main memory during the decryption phase.

All these examples are attacks against the software code, which have in common that the attacker requires access to the IT system the ACC is running on. Thus, a strict control of the networking layer and the physical hardware prevents most of these attack scenarios. These attacks are identical for existing enterprise systems. As a result, these issues are already addressed by existing company-wide IT policies. Furthermore, it is possible to prevent most of these issues by integration in existing business processes. For example, the event owner does not grant access to event data for all existing ACCs. More realistic, an unknown supply chain party needs to negotiate about business relationships initially. In context of this initial negotiation of their mutual business relationship, the ACC of the new business partner is added to the list of known ACCs that are allowed to connect to the ACS. This enables a matching of supply chain parties and corresponding uniquely identified ACCs.

With respect to the non-functional requirement N1 the ACS was designed with minimal server-side load in mind. As a result, the availability of event data in the EPCIS is ensured since the impact of attacks on this software component is reduced. The ACS is exposed to supply chain parties comparable to any other kind of Internet services today. As a result, this service suffers from typical Internet attacks, such as DDoS attacks. We consider Internet attacks as well understood and existing protection mechanisms, such as firewall rules, VPNs, and high availability of service, can be applied for ACS in a comparable way. These security mechanisms are out of scope of this application.

Applicability to Existing Event Repositories

The architecture presented in the Architecture section above, is designed for enhancing existing EPC-global networks. To verify its applicability in real-world scenarios, we applied them to the open source EPCIS repository of the Free and Open Source Software for Track and Trace (FOSSTRAK) project (FOSSTRAK). FOSSTRAK provides an EPCglobal-certified open-source EPCIS repository developed in Java2Enterprise Edition, which is hosted by an Apache Tomcat Web Application Server (Apache Software Foundation. Apache Tomcat 7.0.16. hxxp://apache.org/tomcat-7.0-doc/index.html1, June 2011). In the following, We share the extension points for the FOSSTRAK EPCIS repository with respect to the security extensions.

FIG. 15 depicts the integration of our security extension in the FOSSTRAK EPCIS repository. To integrate them in FOSSTRAK, We developed the FOSSTRAK ACC and ACS. We decided to apply a communication proxy design pattern instead of a direct integration of the security extensions in existing FOSSTRAK code to keep the FOSSTRAK implementation unchanged (E. Gamma. *Design Patterns: Elements of Reusable Object-oriented Software*. Addison-Wesley, 1995). Thus, there is no need for code recompilation of existing code. The FOSSTRAK implementation offers a query client, which is used to specify queries for the EPCIS repository with the help of a graphical user interface. The URL of the EPCIS repository to query is specified in the client software. Exchanging the URL of the EPCIS by the URL of the FOSSTRAK ACC activates security extensions therefore. This is the only integration effort on client site to activate the transparent security extensions. With respect to the non-functional requirement N4 defined above, the transparent design reduces required integration efforts on the client site. The FOSSTRAK query client uses SOAP as the communication protocol to exchange data with the EPCIS repository. Incoming client queries are received by the FOSSTRAK ACC and forwarded via a SSL tunnel to the FOSSTRAK ACS in protocol step 200 as depicted in FIG. 15. The incoming SOAP message is forwarded without modifications to the assigned FOSSTRAK EPCIS repository in a forwarding step 300. The ACS extracts control data, such as querying party and queried EPCs, and appends them to the query history. The FOSSTRAK EPCIS repository returns in step 400 the result set encoded as a SOAP message, which is encrypted during protocol step 460 and forwarded to the FOSSTRAK ACC in step 500. The FOSSTRAK ACC requests proper access rights by creating an ODRL request in protocol step 600. The FOSSTRAK ACC derives the ODRL request by parsing the SOAP message and extracting access control data. The ODRL request is sent via the SSL tunnel to the FOSSTRAK ACS. Its response contains an ODRL response and details of the key for decryption of the retrieved result set in step 715.

The seamless integration of the security extensions within the FOSSTRAK SOAP to ODRL architecture requires deriving access control requests from the existing communication protocol between inquirer and EPCIS repository.

```
1   <soap:Envelope xmlns:soap="http://schemas.xmlsoap.org/soap/
            envelope/">
2       <soap:Body>
3           <ns3:Poll xmlns:ns2="http://www.unece.org/cefact/
                    namespaces/StandardBusinessDocumentHeader" xmlns:ns3="
                    urn:epcglobal:epcis-query:xsd:1" xmlns:ns4="
                    urn:epcglobal:epcis:xsd:1" xmlns:ns5="
                    urn:epcglobal:epcis-masterdata:xsd:1">
4               <queryName>SimpleEventQuery</queryName>
5               <params>
6                   <param>
7                       <name>GE_eventTime</name>
8                       <value xmlns:xs="http://www.w3.org/2001/XMLSchema"
                                xmlns:xsi="http://www.w3.org/2001/XMLSchema-
                                instance" xsi:type="xs:dateTime">2010-04-10
                                T00:00:00Z</value>
9                   </param>
10                  <param>
11                      <name>EQ_action</name>
12                      <value xmlns:xsi="http://www.w3.org/2001/XMLSchema-
                                instance" xsi:type="ns3:ArrayOfString">
13                          <string>OBSERVE</string>
14                      </value>
15                  </param>
16                  <param>
17                      <name>MATCH_epc</name>
18                      <value xmlns:xsi="http://www.w3.org/2001/XMLSchema-
                                instance" xsi:type="ns3:ArrayOfString">
19                          <string>urn:epc:id:sgtin:1301757845.008.000133753170
                                </string>
20                      </value>
21                  </param>
22              </params>
23          </ns3:Poll>
24      </soap:Body>
25  </soap:Envelope>
```

The above listing shows a Simple Event Query embedded in a SOAP message. The query consists of three attribute-value pairs enclosed in a param section (lines 6-9, 10-15, 16-21), which are combined via the logical AND operation. The result set consists of events that are greater or equal a certain time (GE_eventTime) with a certain action (EQ_action) and match with a certain EPC code (MATCH_epc). The following listing shows an excerpt of the corresponding result set.

```
1   <soap:Envelope xmlns:soap="http://schemas.xmlsoap.org/soap/
            envelope/"><soap:Body><ns3:QueryResults xmlns:ns2="http://
            www.unece.org/cefact/namespaces/
            StandardBusinessDocumentHeader" xmlns:ns3="
            urn:epcglobal:epcis-query:xsd:1" xmlns:ns4="
            urn:epcglobal:epcis:xsd:1" xmlns:ns5="urn:epcglobal:epcis-
            masterdata:xsd:1">
2       <queryName>SimpleEventQuery</queryName>
3       
4           <EventList>
5               <ObjectEvent>
6                   <eventTime>2010-10-04T00:11:39.000+01:00</eventTime>
7                   <recordTime>2010-10-04T00:12:02.930+01:00</recordTime>
8                   <eventTimeZoneOffset>+01:00</eventTimeZoneOffset>
9                   <epcList><epc>urn:epc:id:sgtin:1301757845
                            .008.000133753170</epc></epcList>
10                  <action>OBSERVE</action>
11                  <bizStep>urn:epcglobal:epcis:bizstep:fmcg:observe</
                            bizStep>
12                  <readPoint><id>urn:epc:id:sgln:1301757845.66446365.2</id
                            ></readPoint>
13                  <bizLocation><id>urn:epc:id:sgln:1301757845.66446365.2</
                            id></bizLocation>
14              </ObjectEvent>
15              <ObjectEvent>
16                  <eventTime>2010-10-04T16:01:53.000+01:00</eventTime>
17                  <recordTime>2010-10-040T16:04:22.586+01:00</recordTime>
18                  <eventTimeZoneOffset>+01:00</eventTimeZoneOffset>
19                  <epcList><epc>urn:epc:id:sgtin:1301757845
                            .008.000133753170</epc></epcList>
20                  <action>OBSERVE</action>
21                  <bizStep>urn:epcglobal:epcis:bizstep:fmcg:observe</
                            bizStep>
```

```
22           <readPoint><id>urn:epc:id:sgln:549132542.340339831.2</id
                 ></readPoint>
23           <bizLocation><id>urn:epc:id:sgln:549132542.340339831.2</
                 id></bizLocation>
24        </ObjectEvent>
25      </EventList>
26   </ns3:QueryResults></soap:Body></soap:Envelope>
```

It consists of events for action OBSERVE, i.e. observe events.

Table 8 gives an isomorphism to extract relevant rights information from the Simple Event Query and to map them to the corresponding ODRL 2.0 XML dialect, depicting the developed isomorphism to map operators and values from SOAP to ODRL messages and vice versa. The mapping is of interest for the extended communication protocol as described herein.

TABLE 8

| Category | SOAP [44. Sect. 8.2.7.1] | | ODRL [86] |
|---|---|---|---|
| Values | param.name.MATCH_epc.value | ↔ | permission.asset.uid |
| | param.name = [SOAP Operator]_[attribute] | ↔ | permission.constraint.Operator = [ODRL Operator]. |
| | | | permission.constraint.name = [attribute] |
| | param.value = 2010-10-04T00:00:00 | ↔ | permission.constraint.rightOperand = 2010-10-04T00:00:00 |
| Operators | GE | ↔ | gteq |
| | LT | ↔ | lt |
| | EQ | ↔ | eq |

It builds the basis for the corresponding XSLT performed by the FOSSTRAK ACC.

Performance Analysis

On the one hand, increasing security of data is desirable. On the other hand, any kind of security extension has an individual impact on the overall response time behavior of the extended system. With respect to the functional requirements defined with the security requirements, we consider response time characteristics as a major factor to investigate for the presented security extensions. In the following, performance characteristics of the presented business-level security extensions are analyzed. A formal analysis of throughput factors is performed in the following section. Benchmarks addressing the response time behavior of the security extensions are conducted and evaluated in a subsequent section.

Formal Throughput Characteristics

In the following, we define performance aspects of the business-level security extension for event repositories.

Response Time Requirements

Referring to Hypothesis 1 the processing of access rights must not exceed a two second threshold. As a result, the ACS is equipped with a constant monitoring of response time performance. Processing of every query is monitored in terms of response time. After returning the result set to the inquirer, the ACS analysis the timing results. A hysteresis threshold defines the upper threshold for the threshold response time. In the developed system this threshold is set per default to 0.5 s to satisfy the desired overall response time behavior. Every time the measured response time exceeds the desired, a hysteresis counter is incremented. Once a configurable limit of 300 subsequent queries was not processed in the desired response time the ACS explicitly triggers a database optimization and the security administrator is notified. The concrete database optimization operation depends on the incorporated database system. For example, the in-memory database performs a merge operation to build a read-optimized main storage, which is triggered by a dedicated SQL statement (see Plattner et al., Sect. 5.4.2). Additionally, a splitting of data into several parts or the activation of additional ACS and database instances can be initiated. The implemented response time monitoring builds the basis for various kinds of signalling and optimization tasks. Thus, either automatic or semi-automatic countermeasures can be performed to improve response time. However, database optimizations are not part of this application and are not discussed in further details.

Formal Database Growth and Access Patterns Considerations

Keeping a complete query history for decision taking results in a constantly increasing database size. Clearly, the size of the developed history affects the overall response time of the security extension. We consider the growth of the database as the primary source for an increase in response time. From an engineering perspective, the following operational factors of the security extensions are considered in a formal way and their impact is evaluated.

$q$ describes the number of queries,
$q_u$ describes the number of unique queries,
$i$ describes the number of unique identities,
$u$ describes the number of unique users,
$k$ describes the number of encryption keys,
$r$ describes the number of unique roles in the system, and
$c$ describes the number of rules.

The following inequations are derived from the concrete requirements of the pharmaceutical industry outlined in the section dealing with Challenges in pharmaceutical Supply Chains:

$q_u < q$, i.e. if a certain good is queried once, subsequent queries for this product can be expected, e.g. the are performed by all supply chain parties that handled the good during goods receipt, $u < i$, i.e. identities are used to distinguish individual ACCs of a user $u$, e.g. departments of a single company, $k = u$, i.e. users need encryption keys for secure exchange of data, and $r < u$, i.e. users are assigned to roles to abstract from the amount of unknown inquirers.

We assume a relatively small number of roles to be in place, e.g. dedicated roles for suppliers, customers, and unknown parties.

A summarization is given in Ineg. 5, which can be used to estimate database size increases.

$$r<u<i, q_u<q \tag{5}$$

Tab. 9 shows the expected growth of database tables and access patterns incorporated by HBAC. It shows that readings are the dominant access pattern.

TABLE 9

| Table | Growth | Access Pattern |
|---|---|---|
| history | increases with n | WORM, for logging and archiving only |
| identities | increases with i | 1 × INSERT per identity, multiple readings |
| identities_users | i entries | 1 × INSERT per identity/user, multiple readings |
| keys | k entries | 1 × INSERT per user or key rotation, multiple readings |
| keys_users | k entries | 1 × INSERT per pair of key and user, multiple readings |
| roles_users | r entries | 1× INSERT per user, updates possible, multiple readings |
| users | u entries | 1 × INSERT per user, multiple readings |
| acls | a entries | 1 × INSERT, multiple readings |
| acls_roles | a entries | multiple ACLs inserted for a single role, updates possible, multiple readings |
| identities_requests | n entries | 1 × INSERT per unique query |
| roles | r entries | 1 × INSERT during role creation, multiple readings |
| roles_rules | ≤max(c, r) | 1 × multiple rules inserted for a single role, updates possible, multiple readings |
| rules | c entries | 1 × INSERT per rule creation, updates possible multiple readings |

Most database tables are updated once, e.g. for a new user, inquirer, key, etc. However, the majority of data is read, e.g. to evaluate the query history, access rules, etc. These access characteristics fit best for the incorporated in-memory technology. It improves database readings compared to traditional database systems (Plattner et al., Sect. 5.4.).

We present concrete growth estimations for the database volume with the help of concrete assumptions for the European pharmaceutical supply chain. The following example shows the growth estimation for one pharmaceutical manufacturer. The supply chain length is l=4, i.e. goods pass one manufacturer, two wholesalers, and one retailer with the sizing assumptions for the European pharmaceutical supply chain as given in Tab. 10

TABLE 10

| Entity | Quantity |
|---|---|
| Manufacturers | 2.2k |
| Wholesalers | 50k |
| Retailers | 140k |
| Goods | 30 billion/yr. |

With the help of the manufacturer's role, we exemplarily outline the complexity in handling sensitive business data in the correct way. Let us assume a fully mashed supply chain, i.e. each of the involved supply chain parties has potential business relationships with each of the remaining parties. Each supply chain party has a maximum of approx. 192 k inquirers querying event data for manufactured or handled goods. Furthermore, let us assume that all manufacturers produce equal amounts of the yearly 30 billion items per manufacturer and year. For anti-counterfeiting, the manufacturer's EPCIS repository is queried by each of the three succeeding supply chain parties at least once, which results in a total of approx. 40.5 million queries per year as defined in Eq. 6 or 111 k queries per day when assuming 24/7 production. Each of the incoming queries can be originated from one of the u=192 k unique business partners.

$$q_u=13.5 \text{ M}, q=(l-1)q_u=40.5 \text{ M} \tag{6}$$

For anti-counterfeiting, all involved parties are expected to verify their goods during good's receipt by querying event data from all preceding supply chain parties to reconstruct the virtual product history. Pharmaceutical manufacturers do not have direct business relationships with all supply chain parties that handle their pharmaceutical goods. However, all of them query the manufacturer's EPCIS repository to retrieve product details. For example, a concrete pharmacy buys their pharmaceutical products from a pharmaceutical wholesaler. Although the pharmacy does not have direct business relations with the manufacturer, it contacts the manufacturer when a new product is received to verify the product's authenticity.

The variety of unknown inquirers results in the need for initial access rights assignment. Its administrative overhead is time-consuming and requires dedicated personnel to maintain access rights. With respect to the non-functional requirement N2 defined in the Security Requirements section the administrative overhead for managing access rights should be minimized. An automatic exchange of event data is the basis for establishing anti-counterfeiting. However, exchanged event data must not expose business secrets. A combination of the aforementioned requirements motivates an automatic decision taking for access control of event data while enabling automatic data exchange.

The presented security extension introduces various ways to reduce the administrative complexity. For example, RBAC is incorporated to abstract from individual inquirers with identical requirements and reduces the need for assignment of individual access rights. Multiple users are assigned to individual roles and access rights are applied to roles instead of individual users. Once a small set of roles is established, new business partners are assigned to roles while corresponding access rights are automatically assigned to them.

Query History

A complete history of incoming queries needs to be stored by the ACS for granting individual access rights. For every incoming query, the complete query history of a certain client is scanned and checked whether access rules match as implementation of RuBAC. Storing the entire query history results in increasing storage requirements. However, keeping only a partial history results in incomplete facts for decision taking.

For a reference regarding in-memory technology we refer to European Patent application EP 2040180 A1 entitled "ETL-less zero-redundancy system and method for reporting OLTP data", the contents of which is incorporated herein by reference. The following in-memory building blocks are incorporated in context of our application and enable the processing of the complete query history in real-time.

Columnar Store: The columnar store is the basis for lightweight compression and partitioning. As a result, selected database columns can be assigned to individual CPU cores or blades systems.

Insert-only: We assume queries to arrive in chronological order. As a result, they are appended in a sorted way to the end of the query history. Since the complete history needs to be stored, new data are appended while none of the existing entries is deleted.

Lightweight Compression: We assume queries that mainly differ in the queried EPC, i.e. queries are similar in terms of complexity and content. Because of this similarity, lightweight text compression techniques, such as dictionary encoding, can be applied to reduce storage requirements of the history. Data are automatically compressed by the in-memory database, which reduces the total storage demands.

Partitioning: Due to the steadily increasing length of the history, splitting the complete history in partitions located on different cores or servers results in smaller portions of data to process. Each of the portions of the history can be accessed individually, which is a basis for parallel executions of database scan operations.

Multi-core and Parallelization: Parallel execution of search queries is possible when a complete table scan is required, e.g. a certain predicate needs to be checked against all entries. Performing a parallel search on similar long chunks instead of a single long database table reduces the total traversal time compared to a single traversal.

Benchmarks

In the following, we present the results of the performed benchmarks to evaluate the applicability of the developed security extensions to the pharmaceutical supply chain discussed. Since the developed security extensions are designed for a transparent use, we focus on the impact on the overall response time when querying event data from an EPCIS repository.

Benchmark Setup

FIG. 16 depicts a benchmark Setup for HBAC. Accessing the FOSSTRAK EPCIS requires one network round trip for both: A) disabled and B) enabled security extensions. Enabled security extensions require additional network round trips to the ACS database server depending on the incorporated partitioning approach. Protocol steps A1 . . . A2 refer to FIG. 10 and B1 . . . B11 refer to steps 100 to 900 in FIG. 15. All database benchmarks were conducted on a SAP NewDB database install.50.00.353798s (dev) built on Sep. 1, 2011. In addition, benchmarks for MySQL were performed with MySQL 5.1.49 built on Jul. 9, 2010. The operating system was openSuSE 11.2 installed from the official DVD ISO image. The underlying hardware systems are Fujitsu PRIMERGY BX924 S2 blades equipped with two Intel Xeon X5670 CPUs running at 2.93 GHz clock speed. Each of the 64-bit CPUs is equipped with 64 kB L1, 256 kB L2, 12 MB L3 cache size, six CPU cores, 12 CPU threads per CPU, and two QPI links forming a total of 24 available CPU threads per blade [Intel Corporation. An Introduction to the Intel Quick-Path Interconnect. hxxp://www.intel.com/content/dam/doc/white-paper/quick-path-interconnect-introduction-paper-.pdf, January 2009, Sect. 1.1]. Each QPI link represents a double-pumped data bus, which is operated at CPU frequency up to 3.2 GHz in unidirectional mode and has a payload bandwidth of 16 bits. As a result, main memory or cache content can be theoretically accessed in a single direction at a throughput rate of 11.72 GB/s independently from the associated memory controller and CPU for the given benchmark system as defined by Eq. 7. Twice the throughput can be achieved due to the unidirectional mode. However, additional protocol overhead needs to be considered specifically. Blades are equipped with 18×8 GB DDR3 RDIMM running at a maximum frequency of 1,333 MHz forming a total of 144 GB main memory capacity per blade. The network connectivity is achieved through 4-port mezzanine Ethernet network interface cards with a max. bandwidth of 1 GB/s. Benchmarks across multiple blades were performed on instances of identically configured blade systems connected via unmanaged 1 GB/s network switches.

$$2.93 \text{ GT/s} \cdot 16 \text{ bit} \cdot 2(\text{double-pumped}) = 93.76 \text{ Gb/s} = 11.72 \text{ GB/s} \quad (7)$$

The FOSSTRAK EPCIS repository version 0.5.0 build on Dec. 28, 2010 was used for the benchmarks (FOSSTRAK). Its Hibernate implementation, i.e. the object relational mapper, was adapted to make use of a dedicated instance of the in-memory database in the aforementioned version and settings. A discrete supply chain simulator was used to generate realistic event data for a 1,000:1 and a 2,000:1 model of the European pharmaceutical supply. Both models were simulated for a time span of 30, 180, and 360 days of manufacturing. For individual benchmark results the identical event set within the FOSSTRAK EPCIS repository was used.

To capture the response time, a benchmark script written in Python 2.6.2. was executed from a dedicated benchmark server running Linux. The benchmark script loaded a subset of 1,000 predefined EPCs from the FOSSTRAK EPCIS repository into its main memory as benchmark query set. It performed repeatedly the same queries with randomly chosen EPCs out of the benchmark query set. Each query was sent to the FOSSTRAK EPCIS repository either a) directly or b) via security extensions as depicted in FIG. 16. The response times for disabled and enabled security extensions were measured using python's time. time( ) implementation. The delta of both response time measurements is captured to derive the impact of the security extensions on the overall response time. The precision of the response time measurement depends on the blade's on-board clock's precision. With reference to the Python documentation the precision of the time( ) function depends on the precision provided by the operating system. Python Software Foundation, Python V.2.7.2 Documentation, <docs.python.org/index.html1> (February 2012). An exemplarily output of the time( ) function on the benchmark system is 1328021714.6912911. As a result, we assume a clock precision of at least $1 \cdot 10^{-6}$ s in the remainder of this work. The captured response time deltas were cleansed by filtering out values outside the interval sq0.9985, q0.0015 [with q0.9985 defining the 99.85 percent quartile, i.e. 99.85 percent of all response times are greater than this value. As a result, the interquartile range contains 99.7 percent of the recorded values.

Benchmark Configurations

To proof the required real-time response time to satisfy Hypothesis. 1, we varied the following benchmarks parameters:

History Length: We postulate that the total length q of the query history impacts the overall response time behavior. Thus, the response time was recorded for an increasing history length.

Inquirers: The number of inquirers was varied to proof the lookup time for a small set of relevant queries out of the total history.

Partitioning: To show scalability and extension points of the security extension, range and round robin partitioning policies were selected to measure impact on overall response time behavior.

Tab. 11 compares benchmark setups and shows the response time deltas of enabled and disabled security extensions in a multi-user environment with four clients querying 1,000 random queries in parallel (H=Hosts, MRT=Mean response time, P=Partitions, Ra=Range partitioning, RR=Round robin partitioning) in detail.

TABLE 11

| Setup | Policy | P | H | Inq. | b | d | MRT [s] | Fig. |
|---|---|---|---|---|---|---|---|---|
| A | None | 1 | 1 | 4 | 0.0001 | 0.6158 | 0.1914 | A.1 |
| B | None | 1 | 1 | 10k | 0.0113 | 0.2168 | 0.1523 | A.2 |

TABLE 11-continued

| Setup | Policy | P | H | Inq. | b | d | MRT [s] | Fig. |
|---|---|---|---|---|---|---|---|---|
| C | Ra | 4 | 4 | 4 | 0.0007 | 0.5145 | 0.3625 | A.3 |
| D | RR | 4 | 4 | 4 | 0.0003 | 0.5762 | 0.3613 | A.4 |
| E | Ra | 4 | 4 | 10k | 0.1916 | 0.0434 | 0.3214 | A.5 |
| F | RR | 4 | 4 | 10k | 0.1784 | 0.0496 | 0.3224 | A.6 |
| G | Ra | 10 | 4 | 10k | 0.0831 | 0.1257 | 0.3738 | A.7 |
| H | RR | 10 | 4 | 10k | 0.1799 | 0.0529 | 0.3381 | A.8 |
| I | Ra | 100 | 4 | 10k | 0.0424 | 0.2037 | 0.4879 | A.9 |
| J | RR | 100 | 4 | 10k | 0.0902 | 0.1355 | 0.4561 | A.10 |
| K | Ra + idx | 100 | 4 | 10k | 0.0993 | 0.1231 | 0.4324 | A.11 |
| L | MySQL | 1 | 1 | 10k | 0.7314 | 0.3422 | 19.1447 | A.12 |

The column partitioning describes the policy used for partitioning of the history. For example, partitioning by 4 ranges across 4 hosts with 4 inquirers results in a single range for each inquirer on each of the four hosts. In contrast, partitioning using round robin 100 across 4 hosts with 10 k inquirers results in 100 equally long partitions distributed across 4 hosts. The incorporated partitioning policy affects the reconstruction of the history for a certain inquirer. We configured the total number of partitions less or equal to the total number of available CPU threads, i.e. one CPU thread processes one history partition, which ensures that the system is never fully loaded.

FIG. 17A shows Delta of response times of FOSSTRAK capture client over length $l_h$, 4 inquirers, without partitioning.

An identical configuration setup of the security extension was chosen for all benchmarks. It consists of a black list role for unknown clients and a default role for known clients. New clients are randomly assigned to the known clients' role with an 80 percent ratio. Black list clients do not receive any details for their queries. Four static ACLs are specified for the default role using RBAC. One access rule with ten statically defined rules is processed using RuBAC.

Automatic database optimizations of the in-memory database system were disabled. They were triggered by the security extensions if required, i.e. when the hysteresis threshold was exceeded. All data stored in the database were accessed directly without using index structures. As a result, We consider these benchmark results as upper thresholds for the response time. When applying database-specific optimizations, e.g. indexes on the search attribute, the response time behavior can be additionally improved. For example, applying indexes on attributes identities and requests improves mean response by approx. ten percent and the oscillation of response times is lower as depicted in FIG. 17K. However, index structures consume additional main memory capacity and during its creation and update additional processing time is required. We consider index structures as a database-specific optimizations, which are not considered in context of our work and left open for field-test evaluation of the system.

We recommend setting the hysteresis level of the security extensions to a response time that equals the response time after performing the database optimization the first time. Thus, the database optimization is only performed when the response time of the current data layout exceeds the more constant response time of the optimized schema. The concrete hysteresis level is system-specific and needs to be determined per hardware and landscape setup specifically.

Analysis of Response Times

We applied an approximation function given in Eq. 8 to derive formal parameters for the comparison of response times. With respect to functional requirement F1 individual approaches are evaluated regarding their response time t for a given length of the query history $l_h$. Specific parameters b, d are given in Tab. 11. Parameter b defines the aspect ratio on the y-axis, whereas parameter d influences the turning point of the graph when the slope turns to less than one. Corresponding approximation functions are plotted for comparison in FIG. 18 and FIG. 19. FIG. 19 gives a summary of HBAC access times for 10 k inquirers based on the detailed results in FIG. 18.

FIG. 18 shows a comparison of HBAC response times over for 10 k inquirers using approximation functions. Range partitioning shows better response time behavior in a multi-user system than round robin partitioning due to the lower CPU resources required for analyzing the query history. The benchmark results show that the performance impact of using either round robin or range partitioning is marginal. Local partitioning performs up to 0.2 s better due to the absence of latency introduced by network communication and data marshalling required for network transmission.

$$rsp(l_h) = b \cdot l_h^d \qquad (8)$$

Parallelization can be used to speed-up the time required to reconstruct the query history for a specific inquirer. The optimal lookup time for a query history that is partitioned across p partitions is defined by Eq. 9 when the complexity of its individual lookups equals Ineg. 10.

$$t = \max(t_1, \ldots, t_p), t_i = \frac{t_{table}}{p} \qquad (9)$$

$$O\left(\sum_{i=1}^{p} O(process(table_{part_i}))\right) \leq O(process(table)) \qquad (10)$$

Round robin partitioning consumes a mean response time of 338 ms in bench-mark setup H and 456 ms in benchmark setup J respectively while range partitioning consumes 374 ms in benchmark setup I and 488 ms in benchmark setup J for 10 or 100 partitions respectively as given in Tab. 11. This is a comparable low difference of 32 ms to 36 ms. Increasing the number of partitions results in smaller data portions per partition that can be scanned faster.

However, FIG. 18 shows that 100 partitions perform slower than ten partitions regardless of the partitioning schema. The development team of the in-memory database confirmed that this is an issue while pruning the set of data to search. In case of partitioning the query is split across partitions. After completing the query, the separate result sets are merged to form the total response. Even if one result set is empty the merge operations is performed in used database version. Thus, an increased number of partitions result in processing overhead due to the increased number of result set to merge. The expected behavior is that the response time improves when increasing the number of partitions unless the number of partitions exceeds the number of available physical CPU threads. Due to the smaller data portion to search per partition, the time to process the complete query is also reduced.

The measured increase in mean response time between 10 and 100 partitions for the round robin policy is about 118 ms whereas for range partitioning it is only 114 ms. Round robin and range partitioning for four parts show very similar mean response times of 361 ms in benchmark setup D and 363 ms in benchmark setup C. In the benchmark setup D, round robin is configured to work comparable to range partitioning since only a single partition per hosts is available, which prevents parallelization within a single host. For comparison, the mean response time without partitioning in benchmark setups A and B are approx. 170 ms faster than any partitioning schema.

This improvement of response time is mainly because of the absence of any network latency. By implication, the scalability of HBAC across multiple hosts results only in approx. 170 ms of latency.

The benchmarks show that round robin partitioning performs slightly faster than range portioning for all lengths of the query history. On the one hand, incorporating round robin policy guarantees maximum usage of CPU resources. On the other hand, scanning all partitions requires an individual thread per partition to perform the scan. If all queries of a certain client c are equally distributed across p round robin partitions. Its processing time is dominated by the full table scan of the history of all queries within $t_{table}$. For a single query, each of the p partitions is scanned by a dedicated thread. The optimal processing time t for a single query and p partitions is given in Eq. 9. However, for a multi-user system, which processes multiple queries simultaneously, round robin partitioning reduces the overall throughput. Due to the high CPU load—a single CPU thread per partition—parallel processing of queries for multiple inquirers have to be queued. In this case, we consider the high usage of CPU threads as an adversely effect for multi-user systems.

We assume client queries to appear in a random order. As a result, queries of a certain inquirer are not stored equally distributed across all partitions. For example, let us assume only two of ten partitions contain queries of a certain inquirer. A round robin partitioning requires the processing of all ten partitions for reconstruction of the complete history, i.e. a processing overhead of 80 per-cent. In other words, round robin partitioning results in additional processing overhead when incoming queries are not equally distributed. Thus, the power consumption of round robin partitioning is high due to the need for scanning all partitions even when no relevant data is contained.

Range partitioning shows very similar response time behavior like round robin partitioning for all benchmark setup. When inserting data to a rage partitioned database table, individual partitions suffer from uneven length with respect to the distribution of inserted values and the amount of queries per inquirer. Similarly to round robin, a single CPU thread processes individual ranges of the partition. If a certain inquirer performs a query, range partitioning benefits from the knowledge, which partition holds the required data. We assume equally distributed queries with increasing history length. As a result, the individual length of range partitions is also balanced. In contrast to round robin partitioning, only a single CPU thread processes the query since only one partition is required to scan for identification of all queries of a certain inquirer. However, this does not improve the response time. In other words, range partitioning performs better than round robin partitioning for multi-user systems due to a reduced need in CPU resources. Furthermore, range partitioning benefits from a better power efficiency of the algorithm since only relevant partitions are scanned to process a query.

In contrast to the incorporated in-memory database, MySQL was used to measure the impact of a traditional database system on the response time of the security extensions. The incorporated database for MySQL is identical to the one used for the in-memory database. Furthermore, it does also not contain any schema optimization, e.g. indexes. It shows that the mean response time of approx. 19 s is about 34-times slower than any of the benchmark results of the in-memory database. Due to the bad response time behavior, benchmarks for MySQL were only performed for the interval [1,40000] of history length. The response time for a very small query history is fast, but it increases exponentially due to the required join and union operations. The benchmarks for MySQL were performed without partitioning due to the missing support of the database system. A possible alternative is implementing partitioning policies within the application scope of the security extensions. However, a partitioning management in the application is not part of this work and is left open for further investigations.

FIG. 17L depicts a two-divided graph. For the first interval [0, 11500], the approximation shows a positive d, i.e. exponential growth. In this interval, new users for the individual 10,000 inquirers are created in the ACS. For the second interval [11500,40000], the approximation function is comparable to its in-memory database pendants with d<1.

The length of individual partitions is equally long when using round robin partitioning policy while range partitioning ensures history entries of the same inquirer to be stored within the identical partition. Round robin partitioning requires a scan of all partitions of the history for a certain inquirer since they can be distributed across all partitions. Range partitioning requires only a scan of a single partition since all portions of the history of a single inquirer are stored within the same partition. From a parallelization's point of view, a single CPU thread scans a single partition while multiple CPU threads can scan multiple partitions in parallel. Thus, round robin partitioning results in using a maximum of available computational resources. In contrast, range partitioning consumes less computational resources because only relevant partitions are scanned. Due to the postulated high amount of parallel queries in real-world scenarios as discussed in the Formal Throughput Characteristics section, security extensions need to process multiple inquirers in parallel. As a result, range partitioning is preferable in a multi-user system to keep overall load low. The response time behavior of range partitioning is comparable to round robin and therefore an adequate alternative for real-world scenarios. In contrast to traditional databases, the database processing time of an in-memory database is no limiting factor for HBAC. Moreover, partitioning and parallelization are essential scalability factors to analyze the steadily increasing query history and to guarantee a stable response time threshold.

Table 12 Comparison of partitioning policies to meet $t_{max}=2$ s, no automatic database optimizations ($l_h$=Max. history length for $l_h \le t_{max}$).

TABLE 12

| Setup | Policy | P | H | Inq. | $l_h | t\ t_{max}$ |
|---|---|---|---|---|---|
| A | None | 1 | 1 | 4 | 9.6485e+06 |
| B | None | 1 | 1 | 10k | 2.3376e+10 |
| C | Ra | 4 | 4 | 4 | 5.2128e+06 |
| D | RR | 4 | 4 | 4 | 4.3294e+06 |
| E | Ra | 4 | 4 | 10k | 2.9569e+23 |
| F | RR | 4 | 4 | 10k | 1.4521e+21 |
| G | Ra | 10 | 4 | 10k | 9.7699e+10 |
| H | RR | 10 | 4 | 10k | 5.9311e+19 |
| I | Ra | 100 | 4 | 10k | 1.6456e+08 |
| J | RR | 100 | 4 | 10k | 8.5561e+09 |
| K | Ra + idx | 100 | 4 | 10k | 3.9235e+10 |
| L | MySQL | 1 | 1 | 10k | 1.8909e+01 |

We used the function given in Eq. 8 with the derived parameters from Tab. 11 as approximation for the response time. Tab. 8 compares benchmark setups with respect to the maximum history length $l_h$ derived from Ineg. 11 to meet the response time requirements $t_{max}=2$ s as stated in Hypothesis 1. Comparing 100 and ten partitions of individual policies shows that ten partitions process more than eleven orders of magnitude more entries within $t_{max}$. For 100 partitions the high amount of operating system tasks to manage parallelization and to transfer relevant data via network has a considerable impact on the processing speed. Range partitioning for four partitions has the best processing throughput with a theoretical history length of more than $2*10^{23}$ entries for $t \leq t_{max}$. Round robin performs for increasing number of partitions better than the corresponding range partitioning. This is due to the full CPU used by round robin to scan all partitions and the need to merge the results. If the number of partitions exceeds the number of total cores, the high impact of the greedy round robin algorithm will result in a degradation of performance.

With respect to Eq. 6, a maximum of q=40.5 M queries per supply chain party needs to be considered. The approximation functions of all benchmarks indicate at least $10^6$ queries to be processed within $t_{max}$. Furthermore, they show that a longer history per inquirer results in longer processing time. The approximation functions for 10 k clients are representatives of real-world supply chain with 192 k participants in a ratio of approx. 1:20. Their maximum history length when keeping the response time less than $t_{max}$ is at least two orders of magnitude higher than for four clients.

For benchmarking, the automatic database optimization of the in-memory database was explicitly disabled to eliminate its impact on the results. For example, data compression was not applied to event data. The reduction of data volume when working on compressed data has a beneficial impact on the response time and storage requirements. As a result, we consider the given benchmark results as an upper threshold for the expected response time. In a real-world scenario, we expect database optimizations to be performed on regular basis to constantly optimize access times.

A benchmark considering a high number of distributed clients remains open for real-world field tests. Due to hardware limitations, we were not able to address it in the course of this application.

Traditional database systems store tuples in rows, i.e. all attributes for a certain row are stored side by side followed by the next row. In contrast, a columnar store holds data of a certain attribute side by side. On the one hand, querying a complete row from a columnar store requires reconstruction of a virtual row, i.e. retrieving individual attributes of the row and link them together as a row. On the other hand, querying only a subset of attributes benefits from a columnar layout since only data involved in the result set need to be accessed. With respect to FIG. 8 the following entities are stored in columnar format: acls, history, identities, identities_requests, keys, roles, rules, users.

The insert-only or append-only database table is the implementation of the WORM storage concepts. The latter was developed for archiving purposes. French values WORM devices as high capacity storages, e.g. CD-R, with lower access speed than magnetic disks, but less prone to data loss than magnetic disks" (C. S. French. Computer Science. Letts Higher Education List Series. Cengage Learning, 1996, Sect. 7.18.). Data stored in this storage is neither updated nor modified. As a result, this kind of database tables fits for bookkeeping purposes since recorded bookings are not allowed to be updated (L. Pacioli and P. Crivelli. *An Original Translation of the Treatise on Double-entry Bookkeeping.* The Institute of Bookkeepers, Ltd., 1924). In context of bookkeeping, data needs to be modified by recording a correction booking. In an insert-only database table, storing a new entry invalidates the existing one but the former value remains stored, i.e. the newest entry for a certain attribute indicates its latest value (Schapranow III, Sect. 7.1). For HBAC there is no need to update access logs once they were recorded. Either an inquirer has sent a certain query or not. Once a new query was processed, the history for the inquirer contains the corresponding record. Even if the inquirer did not receive the result, the query was processed and the inquirer might have detailed knowledge about the response. From a security's perspective, this is a properly processed and returned result set for the given query, which has to be recorded in the inquirer's history.

We decided to use a WORM storage to guarantee a) a persistent history that b) cannot be modified and c) modification attempts that are recorded by design, i.e. modifications can be reconstructed if needed.

The incorporated in-memory database incorporates compression in a transparent way. It is applied to the raw data when the database optimization is triggered. Tab. 13 gives a snapshot of database tables used by the security extensions with respect to compression. Storage requirements of column database tables ordered by compression factor desc. Database table history compresses best (U=Uncompressed table size, C=Compressed table size, CF=Compression factor).

The storage requirements were measured as follows: the automatic database optimization was disabled, the database schema was cleared, database tables were created, and data were inserted. After completing the benchmark, the storage requirements of the uncompressed data (U) were recorded. The compressed data requirements (C) were recorded after triggering an explicit database optimization by the SQL statement UPDATE <TABLE> MERGE DELTA INDEX for the given tables. The compression factor (CF) describes the fraction of storage demands U divided by C. For example, a CF of six describes that the uncompressed data set requires six-times the storage of the compressed data.

TABLE 13

| Table | Records | U [KB] | C [KB] | CF U/C |
|---|---|---|---|---|
| history | 520,000 | 44,536 | 7,401 | 6.0176 |
| acls | 1,004 | 189 | 41 | 4.6098 |
| identities | 10,000 | 1,757 | 399 | 4.4035 |
| identities_requests | 520,000 | 29,894 | 6,915 | 4.3231 |
| users | 10,000 | 2,164 | 557 | 3.8851 |
| keys | 10,000 | 2,277 | 825 | 2.7600 |
| roles | 2 | 12 | 14 | 0.8571 |

Most database tables given in Tab. 13 show a CF of four or more. The history table shows the best CF of 6.02. In other words, an in-memory database is capable to handle six-times the history that can be stored by a traditional database management system with the same storage requirements. We consider this as an important scalability factor. The results show that lightweight compression is one technology aspect that makes our contribution applicable for real-world requirements in context of multi-user systems.

Evaluation

In the following, we evaluate this contributions with respect to the pharmaceutical supply chain. In addition, their applicability to further industries is evaluated. As a result, our specific research results are evaluated from a holistic point of view and the social relevance of these contributions is underlined.

Applicability to Further Industries

This section provides a broader perspective of this contribution and its applicability. Hence a broader applicability of the embodiments of the invention is described.

We abstract from the concrete pharmaceutical scenario given above to discuss the applicability of the present application and its security extensions in context of further industries. Tab. 14 (as reproduced below) gives an empirical evaluation of this work's applicability to industries specified by the International Standard Industrial Classification (ISIC) defined by the United Nations (United Nations. International Standard Industrial Classification of All Economic Activities Rev. 4. Technical Report 4, Department of Economic and Social Affairs, 2008). Table 14 shows an empiric evaluation of applicability of security extensions to industries classes (Aff.=Affinity, Constr.=Constraint, H=high, L=Low, N=None).

TABLE 14

| JSIC | Description | Aff. | Constr. |
|---|---|---|---|
| A | Agriculture, forestry and fishing | H | C4 |
| B | Mining and quarrying | N | C1,2 |
| C | Manufacturing | H | C4,5 |
| D | Electricity, gas, steam and air conditioning supply | N | C1,2,7 |
| E | Water supply; sewerage, waste management and re-mediation activities | N | C2,7 |
| F | Construction | N | C6 |
| G | Wholesale and retail trade; repair of motor vehicles and motorcycles | H | C4,5 |
| H | Transportation and storage | N | C6,7 |
| I | Accommodation and food service activities | N | C6 |
| J | Information and communication | N | C3,6 |
| K | Financial and insurance activities | N | C3,6,8 |
| L | Real estate activities | N | C6,8 |
| M | Professional, scientific and technical activities | L | C6 |
| N | Administration and support service activities | N | C6 |
| O | Public administration and defense; compulsory social security | L | C3,6 |
| P | Education | N | C6 |
| Q | Human health and social work activities | H | C6,7 |
| R | Arts, entertainment and recreation | L | C6,8 |
| S | Other service activities | N | C6 |
| T | Activities of households as employers; undifferentiated goods- and services-producing activities of households for own use | N | C3,6 |
| U | Activities of extraterritorial organization and bodies | N | C6 |

The relevance column is classified by the inventor's opinion and builds on personal empirical experiences.

Tab. 15 provides a list of personal constraints for industries, which focuses on the kind of handled goods, the potentials for product counterfeits and its impacts. Each industry of the ISIC is assigned to one or multiple constraints given in Tab. 15 to indicate the applicability of the invention according to the embodiments described herein.

TABLE 15

| Cat. | Constraint Description |
|---|---|
| C1 | Closed supply chain, i.e. restrictions to enter the market exist |
| C2 | A relatively fixed number of participants within |
| C3 | Missing use of product ingredients |
| C4 | Use of standardized ingredients supplied by various vendors |
| C5 | Supply relationships are considered as sensitive information |
| C6 | Service sector misses traceable products; service is the product |
| C7 | Goods cannot be tracked individually |
| C8 | Only unique products are exchanged, thus they cannot be exchanged |

We consider constraints C4 and C5 as indicators for industries that suffer from a high rate of counterfeits. The remaining classes indicate criteria, which do not allow introduction of counterfeits or prevent the use of EPCglobal components for anti-counterfeiting. For example, constraint C1 considers closed supply chain, which makes it impossible for external suppliers to participate.

As a result of the constraint classification, ISIC classes A, C and G need to be considered as potential targets with the risk of counterfeit activities due to the handled goods and the supply chain structure. In the following, we discuss selected industry examples, which might benefit from the use of HBAC.

Retail Trading Industries

Due to standardization, product characteristics, such as weight, ingredients, functionalities, etc., are precisely defined. Standardization enables multiple vendors to manufacture products following certain specifications while leaving the internals open to their specific design. As a result, comparable products of different vendors become interchangeable. Formally, products become functions with a clearly defined reaction to a set of input values. On the one hand, the opportunity to switch vendors reduces dependability on a certain supplier. On the other hand, vendors are forced to optimize manufacturing costs since cheaper products are more likely chosen. We consider high costs of competitors' products as a potential entry point for cheap counterfeiters [Ernst & Young. Piraten des 21. Jahrhunderts-Angriff auf die Konsumgüterindustrie. www.markenverband.de/publikationen/studien/StudievonErnst-YoungPiratendes21.Jahrhunderts.pdf[1], 2008, Sect. 2.3].

With reference to the motivation of this work, standardization is present in the pharmaceutical industry. Medicines with equivalent ingredients are referred to as multi-source pharmaceuticals or generic pharmaceuticals [World Health Organization. WHO Expert Committee on Spezifications for Pharmaceutical Preparations. Technical Report 929. World Health Organization, 2005., Sect. 12]. Pharmaceuticals are part of a global retail market. The following list depicts a brief selection of industries and products suffering from counterfeits [R Fe. *The Economic Impact of Counterfeiting and Piracy*. Organisation for Economic Co-operation and Development, 2008]:

Pharmaceuticals: Party drugs, Viagra, etc.,
Cloths: Brand name clothes, luggage, leather articles, shirts, suites, etc.,
Entertainment Electronics: Telephones, discs, computers, etc., and
Spare Parts: Car accessories (breaks), aircraft components (tires), electronic equipment (batteries), etc.

It exemplarily shows the variety of industries that already suffer from or may suffer in future from product counterfeits. Products of the given examples are exchanged via more or less open supply chains. Tracking individual goods with the help of EPCglobal networks should be considered to verify the product's authenticity. We consider EPCglobal networks as an additional market restriction for counterfeiters preventing injection of faked products into open supply chains. The need for security extensions in this context arises from the wish to automatically exchange product-relevant data with known and unknown business partners without exposing confidential business internals as described in certain sections above (Vulnerable Environments, Threats of RFID-aided Supply Chains, Attacks Scenarios, and Security Requirements).

Human Health Industries

In a cooperation project with the Charité—Universitätsmedizin Berlin, we were confronted with data security and privacy aspects of medical records. The following groups of employees are working at Charité: medical doctors treating patients and medical researchers deriving new scientific knowledge. Personalized medicine requires various departments to perform analysis on patient samples, e.g. blood, tissue, biopsy, etc. to generate more and more fine-grained results. Specialized departments generate the latter with limited knowledge about the concrete patient. The combination of the analysis by medical doctors is an essential source of information for decision taking, e.g. to select appropriate medial treatments. Each of the individual medical processes results in data processed by IT systems across various clinical departments. A centralized access control is preferable to minimize administrative overhead and to guarantee a holistic and consistent view on patient data.

In the course of the cooperation project, we contributed to the iPad application Oncolyzer. It provides medical doctors and researchers all relevant tumor data of a certain patient. It combines data from various data sources and departments in real-time. In addition, in-memory technology supports researchers by providing flexible real-time analysis of patient cohorts on the iPad. This supports the war on cancer disease by reducing the time to identify and combine relevant data.

From the data protection's perspective, sensitive patient data displayed on the iPad needs to be protected. As a result, access control is an essential aspect of preventing data leakage. In addition to existing user authentication based on username and password, the presented HBAC ensures that combinations of sensitive data are only accessible by authorized personnel while they are involved in the treatment process. The existing user authentication is used for identification of users accessing the application. Due to the defined access rules, medical doctors are able to see detailed information of patients to treat. In contrast, medical researchers do not need to access all patient data for their work, e.g. to perform statistical analysis. As a result, aggregations of fine-grained data reduce its granularity, e.g. to prevent patient profiling. Since medical researchers are also involved in the treatment process of certain patient cohorts, e.g. for clinical studies, they have limited access to fine-grained patient data. HBAC can be used to prevent the exposure of fine-grained patient data by monitoring the complete query history. The transparent design of HBAC reduces integration efforts within existing IT infrastructures. Thus, there is no need for code modifications of the Oncolyzer iPad application. Sensitive data are filtered and replaced by default values by the security extensions instantly during data exchange. The business-level security extension requires a specific filter for the exchanged data format: in this case the human readable JavaScript Object Notation (JSON).

This example shows, how access to sensitive data can be controlled without the need for concrete control on per-user basis. The transparent design of the security extensions supports the integration process within existing IT landscapes and reduces setup efforts.

Energy Supplying Industries

In the course of this research work, we were also confronted with smart grids. We refer to a smart grid as an energy network that can react to actions of different users, e.g. suppliers or consumers. In a smart grid, households are equipped with smart meters, which record the energy consumption in intervals and can be read-out remotely (Matthieu-P. Schapranow, Ralph Kühne, and Alexander Zeier. Enabling Real-Time Charging for Smart Grid Infrastructures using In-Memory Databases. In *Proceedings of the 1st Workshop on Smart Grid Networking Infrastructure*, 2010). From a data protection point of view, meter readings need to be considered as sensitive data. By acquiring meter readings, attacker can derive customer profiles including individual working hours, holiday times, and the presence of characteristic devices in the household. The EC currently investigates the data protection aspect in smart grids. For example, the working party recommends the prevention of unauthorized disclosure of personal data, guaranteed data integrity, appropriate access control and aggregation of smart metering data whenever appropriate (Data Protection Working Party. Opinion December 2011 on Smart Metering. hxxp://idpc.gov.mt/dbfile.aspx/WP_183.pdf. April 2011).

HBAC can be applied to smart grids for improving protection of sensitive metering data as recommended by the EC. Metering data can be automatically exchanged while individual access rules specified by customers that control access to personal meter readings. Access rules are used by HBAC to prevent combination of meter readings with external data, such as location-based data. In other words, HBAC prevents the combination of metering data to derive customer profiles depending on the receiver's business role. Furthermore, it enforces the principle of data minimalism (Federal Office for Information Security. BSI Standard 100-1: Information Security Management System V. 1.5, 2008). Thus, certain business partners, e.g. energy suppliers, analytical service providers, etc., only receive the portion of data in the granularity that is relevant for their tasks. Since most of the attack scenarios for smart grids require access to fine-grained metering data, a higher level of data granularity eliminates these attacks. For example, exchanging aggregated consumption readings on a daily or a weekly basis instead of as fine-grained 15-minute intervals of metering data impeded the derivation of customer in-house times since peak times cannot be detected. The presented access control mechanisms also raise flexibility in applying access decision. In contrast to existing access control mechanisms that support only bivalent decision taking, HBAC enables the use of a continuous spectrum of access decision. For example, metering data are only available during a certain time window of the day, e.g. from 8 p.m. to 8 a.m., to prevent surveillance of inhabitants living in a flat or house.

Impact on Business Processes

We evaluate the impact of the presented security extensions on existing business processes in the following. The aspects of migrating towards security extensions and their regular usage are considered. The migration to a security standard or a new IT system is also challenging for IT experts since productive environments cannot be replaced instantly. Thus, the productive IT environment is modelled in certain test or laboratory environments where updates and changes can be tested before migrating productive systems. For productive environments the planned downtime for upgrades is considered as the key indicator of the complexity and the feasibility of a migration to new software or release. From a business point of view, the down-time needs to be minimized and must not exceed business closing times, e.g. weekends. However, for certain 24/7 manufacturing industries, such as pharmaceutical manufacturers, even a downtime of two days during weekends is not acceptable. Thus, certain updates cannot be processed due to the need for data migration that takes multiple days or weeks.

From a system's engineering point of view, the migration process needs to be considered during design phase of the new IT component. Keeping the requirements of future business users in mind supports its adaption. We consider the migration to security extensions as a critical factor for upgrading enterprise systems. Thus, we focused on developing transparent security extensions that can be enabled in parallel to existing IT systems without the need for an interruption.

As a result, a second IT landscape incorporating the security extensions can be established step-by-step while the current IT landscape remains unchanged. A step-wise switch towards security extensions can be performed and the new landscape can be tested and verified. Once security extensions are fully installed and configured to support the existing EPCIS repository, the existing landscape without security extensions can be turned down to restrict access via security extensions only. The transparent design of the security extensions addresses the non-functional requirement N4 defined above. It does not involve any kind of time-consuming data migration and the EPCIS configuration remains unchanged. We consider the transparent integration of security extensions as the basis for a high adoption rate. In contrast to traditional upgrade processes, which result in downtime, the outlined side-by-side integration eliminates the need for downtime of existing IT systems. As a result, involved business processes are not affected during migration phase.

The regular use of security extensions has the major aim to reduce the risk of data attacks and to prevent exposure of sensitive business secrets. From a system engineering point of view, the required infrastructure components as part of the security extension discussed in Chap. 3 need to be installed and configured once. Afterwards, the only difference in existing business process is that data communications are adapted to use the enhanced communication protocol via a secured channel instead of the unsecured one. In addition, the ACC software component needs to be installed and supervised to work on the client site.

From a business point of view, the analysis of tracking data needs to be integrated into existing business process. For example, querying an anti-counterfeiting service provider needs to be implemented by pharmaceutical wholesalers or pharmacies to check product authenticity. We consider adaption of existing business processes as tasks that are part of the RFID-enablement process and not as part of migration towards the given security extensions.

From the application's perspective, there is no difference if the security extensions do not detect any violated access rule since event data pass without any modifications. If there is a need for adapting filtering the result set is required. All applications that process event data work with the only difference that filtered values are replaced by default values or empty values instead of its sensitive pendant.

The presented security extensions were designed with transparency in mind. As a result, existing business processes are only minimally affected. From a technical point of view, a one-time installation of the required software components is the major effort.

Social Relevance

Ultimately, We discuss the many-folded relevance of our contributions. The establishment of data protection is a challenging task since it is rarely considered during the design of IT systems. As a result, the IT system is already in place when considerations about IT security arise, e.g. due to a concrete hacker attack. The title of the work stresses this fact, since we focus on security extensions and not security mechanisms only. The given dissertation showed how to apply security mechanisms in a transparent way to existing IT systems focusing on components of EPCglobal networks. Thus, existing IT systems do not need to be modified. The chosen design approach supports its fast adoption. Therefore, increased data security in EPCglobal networks within companies and between business partners can be applied with minimal efforts and downtimes.

The depicted pharmaceutical scenario showed the impact of counterfeits. Furthermore, it showed the still open liability issue in context of faked medicines. A reliable process for verification of the product's authenticity enables all supply chain participants to distinguish between authentic and faked products. As a result, the future introduction of a dedicated service provider for anti-counterfeiting shifts liability for detecting and removing counterfeits from manufacturers to all supply chain parties handling a certain product. Our contribution as disclosed in this application supports the future introduction of a service provider in EPCglobal networks by providing a reliable basis for exchanging confidential event data in vulnerable environments while keeping business secrets closed.

With respect to Hypothesis 1 the response time of the developed security extensions is valued as the major acceptance criteria for industry-wide usage. The conducted benchmarks showed promising results for response time results to meet this hypothesis.

For identification and authentication of involved supply chain parties a PKI was integrated in the architecture of the security extension. Nowadays, a central PKI for identification purposes in supply chains exists neither on national nor on international basis. However, the experience of national projects exist and can be reapplied to this concrete application scenario, e.g. the introduction of a PKI for the electronic identity card in Germany (see BSI TR-03128). With respect to Hypothesis 2 certificate identifiers are stored within the in-memory database of the ACS. They are used for identification of inquirers, which builds the basis for authentication within the security extensions.

Furthermore, our designed IT artefact with respect to the design science methodology showed that the ACS successfully manages individual shared keys per user for specific encryption of event data. The fine-grained key management approach was chosen with respect to Hypothesis 3. On the one hand, it comes with an additional key management overhead. On the other hand, it enables revocation of encryption keys for specific users. Thus, the impact of key exposure is drastically reduced in context of the presented security extensions. In contrast to a single shared key that is used for encryption of data for all parties, the use of individual keys per user enables individual revocation. Moreover, regular updates of the individual encryption key limit the amount of data that can be decrypted by an attacker that obtained a valid key.

As a result, we value EPCglobal networks incorporating additional security extensions as a valid foundation of protection of fast-moving consumer goods, such as pharmaceuticals, without significantly delaying existing business processes, such as goods receipt and goods shipment. As a result, EPCglobal networks also provide a competitive advantage in goods processing.

The presented contributions are not limited to EPCglobal networks and its use in the pharmaceutical industry in combination with RFID technology. Moreover, it can be applied to further industries and scenarios in a world driven by increased globalization as described in the Applicability to further Industries section. The social aspect of our contributions can be broadened to industries that suffer from counterfeits and for use with other tracking and tracing technologies, such as two-dimensional barcodes or data matrices. Further approaches for protection of goods, such as components of EPCglobal networks. Thus, existing IT systems do not need to be modified. The chosen design approach supports its fast adoption. Therefore, increased data security in EPCglobal networks within companies and between business partners can be applied with minimal efforts and downtimes.

The depicted pharmaceutical scenario showed the impact of counterfeits. Furthermore, it showed the still open liability issue in context of faked medicines. A reliable process for verification of the product's authenticity enables all supply chain participants to distinguish between authentic and faked products. As a result, the future introduction of a dedicated service provider for anti-counterfeiting shifts liability for detecting and removing counterfeits from manufacturers to all supply chain parties handling a certain product. This contribution as disclosed in this application supports the future introduction of a service provider in EPCglobal networks by providing a reliable basis for exchanging confidential event data in vulnerable environments while keeping business secrets closed.

With respect to Hypothesis 1 the response time of the developed security extensions is valued as the major acceptance criteria for industry-wide usage. The conducted benchmarks showed promising results for response time results to meet this hypothesis.

For identification and authentication of involved supply chain parties a PKI was integrated in the architecture of the security extension. Nowadays, a central PKI for identification purposes in supply chains exists neither on national nor on international basis. However, the experience of national projects exist and can be reapplied to this concrete application scenario, e.g. the introduction of a PKI for the electronic identity card in Germany (BSI TR-03128). With respect to Hypothesis 2 certificate identifiers are stored within the in-memory database of the ACS. They are used for identification of inquirers, which builds the basis for authentication within the security extensions.

Furthermore, our designed IT artefact with respect to the design science methodology showed that the ACS successfully manages individual shared keys per user for specific encryption of event data. The fine-grained key management approach was chosen with respect to Hypothesis 3. On the one hand, it comes with an additional key management overhead. On the other hand, it enables revocation of encryption keys for specific users. Thus, the impact of key exposure is drastically reduced in context of the presented security extensions. In contrast to a single shared key that is used for encryption of data for all parties, the use of individual keys per user enables individual revocation. Moreover, regular updates of the individual encryption key limit the amount of data that can be decrypted by an attacker that obtained a valid key.

As a result, we value EPCglobal networks incorporating additional security extensions as a valid foundation of protection of fast-moving consumer goods, such as pharmaceuticals, without significantly delaying existing business processes, such as goods receipt and goods shipment. As a result, EPCglobal networks also provide a competitive advantage in goods processing.

The embodiments according to the invention are not limited to EPCglobal networks and their use in the pharmaceutical industry in combination with RFID technology. Moreover, it can be applied to further industries and scenarios in a world driven by increased globalization as described in section Applicability to further Industries. The social aspect of the embodiments according to the invention can be broadened to industries that suffer from counterfeits and for use with other tracking and tracing technologies, such as two-dimensional barcodes or data matrices. Further approaches for protection of goods, such as optical marking, holograms, watermarks, etc. can be found in related work (IMPACT Secretariat at AIFA, editor. IMPACT—The handbook. International Medical Products Anti-Counterfeiting Taskforce, January 2011, Sect. 6.2). Introducing any kind of fine-grained tracking and tracing technology on item level is the key-enabler for unique product identification. However, the more fine-grained the tracking data are, the higher the risk of customer profiling and exposure of business secrets is.

We stress the use of fine-grained tracking and tracing techniques for protection of products as an additional aspect of the social relevance of our work. We showed that transforming the current pharmaceutical supply chains towards an RFID-aided supply chain, for example, could be amortized by less than ten percent product surcharges within a timeframe of five years. This underlines two aspects. Firstly, it underlines the applicability of RFID technology to enable automatic anti-counterfeiting. Secondly, it shows that operating costs of a service provider for anti-counterfeiting are driven by the network costs for exchanging event data.

Moreover, we stress the social relevance of the embodiments according to the invention for applications running on mobile devices. The variety of devices, services, and user accounts makes it hard to identify users beyond borders of devices and IT systems. Although various open approaches, such as openID, exist, there is no single point of truth for meta identification of users (IMPACT Secretariat at AIFA, editor. IMPACT—The handbook. International Medical Products Anti-Counterfeiting Taskforce, January 2011). However, with the help of HBAC the combination of behavioral observation data with queries results in criteria for controlling access of individual users to a variety of systems.

In other words, next generation identification can be formally considered as a function that incorporates various kinds of sensors as input values and adapts access rights specifically depending on the analyzed behavior, e.g. history of queries and actions. We consider an adaptive access control mechanisms, such as HBAC, as a possible basis for implementing next generation identity.

One of the challenging aspects of the increasing use of IT systems in supply chain management is the fact that more and more fine-grained enterprise data are captured and need to be processed in an automated manner. Data processing needs to be performed in real-time, e.g. to improve goods receipt or goods shipment. Anti-counterfeiting techniques in the pharmaceutical supply chain drive the motivation of Our research activities since pharmaceutical counterfeits potentially harm or even kill human beings. consider protecting human beings from pharmaceuticals with inappropriate ingredients as the social motivation of our work. The analysis of related work and EPCglobal definitions showed an insufficient consideration of data protection aspects within EPCglobal networks. As a result, the given application analyzes specific attacks for EPCglobal networks and evaluates their business impacts. Thus, we considered device-level and business-level security extensions.

From the device-level perspective, RFID tags are one technical basis for tracking and tracing of goods. Mutual authentication protocols for passive RFID tags are one possible extension of device-level security. The use of RFID tags is a concrete technical assumption, but further tracking and tracing techniques exist, e.g. data matrix, holograms. The analysis of related work showed that extensions for business-level security are rarely considered. This was the motivation to engineer a concrete transparent measure to protect EPCglobal components. We consider fine-grained product meta data as sensitive business secrets in EPCglobal networks, which can be misused to derive company-specific knowledge. This work contributes by enhancing data security in EPCglobal networks. It shows a proof-of-concept for a secured tracking and tracing scenario for the pharmaceutical industry. We showed that security extensions for EPCglobal networks could improve data protection of product meta data. Furthermore, this work introduces a transparent software design that minimizes the integration efforts. The developed access control mechanisms define a new understanding of control. In contrast to traditional access control mechanisms that either grant or decline access to a certain resource in a bivalent way, the given access control mechanisms are able to grant access within an interval from complete grant to complete decline. This continuous spectrum of control supports the inquirer, who receives always a semantically valid result set, and the owner of event data, who is able to decide, which potion of data to exchange. Access decisions are taken at the latest point in time just before data is returned to the querying application. The late enforcement of access rights embarks data leakages by revoking access rights, which results in ad-hoc prevention of further data leakage. The usage of a PKI enables identification of business partners and reconstruction of attack paths.

The key-enabler for performing HBAC analysis in real-time is the in-memory technology. From the storage's perspective, keeping the complete history of queries is a challenging task. Performing real-time analysis on top of the en-tire history is an analytical challenge. In-memory technology addresses both requirements. Partitioning data across multiple blade systems and parallel processing of queries reduce the overall response time below the empirical threshold of two seconds. In addition, the columnar database layout supports the use of lightweight compression techniques to store the history in a compressed format. As a result, the storage demands for storing the complete history are reduced while the efficiency of data processing is improved.

With the help of the benchmark results, we verified the applicability of the developed security extensions for EPCglobal networks for an industrial real-world use. Furthermore, the results have proved our research hypothesis, which stated that security extensions should not delay existing business processes significantly. However, the current database layout of the ACS is designed to fit for traditional and in-memory databases equally. Since the benchmark results proved the in-memory database to perform better, an optimized database layout is left open for further research. Designing a de-normalized database schema for the incorporated in-memory databases would result in less join operations and might improve response time additionally.

From the system engineering's perspective, we performed a qualitative and quantitative discussion of RFID-aided supply chains as technology basis for EPCglobal networks. we showed that an amortization of initial investments for RFID-enablement of the pharmaceutical supply chain is possible by moderate product surcharges within a timeframe of five years. Other tracking and tracing technologies, such as two-dimensional barcodes, are also applicable. The evaluation of the research results showed that HBAC could also be applied to further industries and business scenarios, e.g. to protect sensitive patient data in hospitals or fine-grained metering data in smart grids. w do not want to limit the applicability of our research results to a concrete research area or industry. In contrast, we want to indicate the broader applicability of the research results.

With developing tag capabilities, competitive advantages of RFID-aided supply chains will dominate. For example, active RFID tags will provide sensor data or location-based information. Their continuous integration in business processes builds the basis for gapless monitoring of goods and ingredients inside the supply chain. Individual supply chain parties will have specific access rights to gather specific product meta data relevant for their tasks. From our perspective, supply chains will converge to complex decentralized IT systems placed in a vulnerable environment with the need to interact with hundred of thousands of users, sensors, and goods.

We motivate the interested reader to use the understanding of the presented concepts and concrete examples as a basis to identify further business scenarios, where the presented security extensions are applicable.

Although the invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

For example any embodiments disclosed herein may without any limitation be implemented as an apparatus. Alternatively any embodiments disclosed herein may without any limitation be implemented as one or more software modules having the functionality of the corresponding embodiment.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing detailed description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the detailed description, with each claim standing on its own as a separate embodiment.

The invention claimed is:

1. A method for granting access to a repository for use in a supply chain, a product tracking system, a medical care environment or a power grid, the repository storing data, the data being sensitive business data pertaining to one or more supply chains, event data pertaining to one or more traceable products, medical data pertaining to one or more patients, or measurement data pertaining to one or more measurements, and wherein an access control server (ACS) is connected to the repository via a link; the access control server (ACS) performing the steps of:
- receiving (200) from an individual one of a plurality of inquirers a query regarding a set of data, including receiving (100) from an access control client (ACC) connected to the access control server (ACS) via a network the query submitted by the individual inquirer;
- transmitting (500) an encrypted result set (Rsp R) to the individual inquirer, including:
  - generating (450) a key, the key being a symmetrical key (SymKey), the key being unknown to the access control client (ACC), and
  - encrypting (460) the result stet (Rsp R) using the symmetrical key (SymKey);
- receiving (600) a request for permission to view the result set (Rsp R);
- generating (700) a permission;
- forwarding (715) the key (SymKey) and the permission to the access control client (ACC); and
- filtering (800) the result set (Rsp R) according to the permission, the filtering step being performed by the access control client (ACC) and comprising removing and/or replacing selected content from the result set (Rsp R) while maintaining an integrity of the result set (Rsp R).

2. The method for granting access according to claim 1, wherein the step of generating (700) the permission comprises adding the query to a database holding a history of queries submitted by the inquirers; and
  a comparing step of comparing the database holding the history of queries to a set of rules defining content of the repository to be protected.

3. The method for granting access according to claim 2, wherein the comparing step comprises comparing multiple queries submitted by the individual inquirer, the multiple queries being all queries submitted by the individual inquirer, to the set of rules defining content of the repository to be protected.

4. The method for granting access according to claim 2, wherein the database holding the history of queries is implemented using an in-memory technology.

5. The method for granting access according to claim 1, wherein the step of generating (700) the permission further comprises:
  evaluating a set of roles the individual inquirer is assigned to, and/or
  evaluating a set of rules the individual inquirer is assigned to.

6. The method for granting access according to claim 1, further comprising:
  requesting (300) a result set (Rsp R) from the repository; and
  receiving (400) the result set (Rsp R) from the repository corresponding to the query.

7. A system for controlling access of one or more inquirers to a repository for use in a supply chain, a product tracking system, a medical care environment or a power grid, the repository storing data, the data being sensitive business data pertaining to one or more supply chains, event data pertaining to one or more traceable products, medical data pertaining to one or more patients, or measurement data pertaining to one or more measurements, the system comprising:
  an access control server (ACS) connected to the repository via a link and adapted to receive from an access control client (ACC) a query submitted by an individual inquirer of a plurality of inquirers regarding a set of data,
  the access control server (ACS) further adapted to request and receive a result set (Rsp R) from the repository corresponding to the query,
  the access control server (ACS) is further adapted to transmit an encrypted result set (Rsp R) to the access control client (ACC),
    wherein the access control server (ACS) is further adapted to generate a key, the key being a symmetrical key (SymKey), the key being unknown to the access control client (ACC), and
    wherein the access control server (ACS) is further adapted to encrypt the result stet (Rsp R) using the symmetrical key (SymKey),
  the access control server (ACS) is even further adapted to receive a request for permission to view the result set (Rsp R) from the access control client (ACC),
  the access control server (ACS) is adapted to generate a permission in response to the request for permission,
  the access control server (ACS) is adapted to forward the key (SymKey) and the permission to the access control client (ACC), and
  the access control client (ACC) is adapted to filter the result set (Rsp R) according to the permission, the filtering comprising removing and/or replacing selected content from the result set (Rsp R) while maintaining an integrity of the result set (Rsp R).

8. The system according to claim 7, wherein the access control server (ACS) is adapted to add the query to a database holding a history of queries submitted by the inquirers and further adapted to generate the permission based on a comparison of the history of queries to a set of rules defining content of the repository to be protected.

9. The system according to claim 7, wherein the access control server (ACS) is adapted to generate the permission based on a comparison of multiple queries submitted by the individual inquirer, the multiple queries being all queries submitted by the individual inquirer, to the set of rules defining content of the repository to be protected.

10. The system according to claim 7, wherein the access control server (ACS) is adapted to generate the permission based on a set of rules the individual inquirer is assigned to and/or
  based on a set of roles the individual inquirer is assigned to.

11. The system according to claim 7, wherein the access control client (ACC) is connectable to the access control server (ACS) via a network, and
  the access control client (ACC) is adapted to forward queries from the individual inquirer to the access control server (ACS), and adapted to receive the encrypted result set (Rsp R) and the permission from the access control server (ACS).

12. The system according to claim 8, wherein the database holding the history of queries is a database according to the in-memory technology.

13. A communication protocol between a client being an access control client (ACC) and a server being an access control server (ACS) connected via a link to a repository for use in a supply chain, a product tracking system, a medical care environment or a power grid; the repository storing data, the data being sensitive business data pertaining to one or more supply chains, event data pertaining to one or more traceable products, medical data pertaining to one or more patients, or measurement data pertaining to one or more measurements; the communication protocol comprising the steps of:
  receiving (200) from an individual one of a plurality of inquirers a query regarding a set of data, including receiving (100) from the access control client (ACC) connected to the access control server (ACS) via a network the query submitted by the individual inquirer, wherein the access control client (ACC) and the access control server (ACS) each including a memory that stores a computer program that implements the communication protocol and a processor that executes the computer that implements the communication protocol;

transmitting (500) an encrypted result set (Rsp R) from the server to the client corresponding to the query, including:
generating (450) a key, the key being a symmetrical key (SymKey), the key being unknown to the access control client (ACC), and
encrypting (460) the result stet (Rsp R) using the symmetrical key (SymKey);

receiving (600) at the server a request for permission to view the result set (Rsp R) from the client, generating (700) a permission, forwarding (715) the key (SymKey) for decrypting the encrypted result set (Rsp R) and the permission to view the result set (Rsp R) from the server to the client, and filtering (800) the result set (Rsp R) according to the permission, the filtering step being performed by the access control client (ACC) and comprising removing and/or replacing selected content from the result set (Rsp R) while maintaining an integrity of the result set (Rsp R).

14. The communication protocol according to claim 13, further comprising steps of securing communication between the client and the server.

15. The communication protocol according to claim 13, wherein the step of generating (700) the permission comprises adding the query to a database holding a history of queries submitted by the inquirers; and
a comparing step of comparing the database holding the history of queries to a set of rules defining content of the repository to be protected.

16. The communication protocol according to claim 15, wherein the comparing step comprises comparing multiple queries submitted by the individual inquirer, the multiple queries being all queries submitted by the individual inquirer, to the set of rules defining content of the repository to be protected.

17. The communication protocol according to claim 15, wherein the database holding the history of queries is implemented using an in-memory technology.

18. The communication protocol according to claim 13, wherein the step of generating (700) the permission further comprises:
evaluating a set of roles the individual inquirer is assigned to, and/or
evaluating a set of rules the individual inquirer is assigned to.

19. The communication protocol according to claim 13, further comprising:
requesting (300) a result set (Rsp R) from the repository; and
receiving (400) the result set (Rsp R) from the repository corresponding to the query.

* * * * *